US012609849B2

(12) United States Patent
Doney et al.

(10) Patent No.: US 12,609,849 B2
(45) Date of Patent: Apr. 21, 2026

(54) METHOD, APPARATUS, AND COMPUTER-READABLE MEDIUM FOR TRANSACTION MANAGEMENT SPANNING MULTIPLE HETEROGENEOUS COMPUTING NETWORKS

(71) Applicant: Securrency, Inc., Annapolis, MD (US)

(72) Inventors: George Daniel Doney, Riva, MD (US); Dennis O'Connell, Garden City, NY (US)

(73) Assignee: DTCC DIGITAL (US) INC., Jersey City, NJ (US)

(*) Notice: Subject to any disclaimer, the term of this patent is extended or adjusted under 35 U.S.C. 154(b) by 420 days.

(21) Appl. No.: 18/369,499

(22) Filed: Sep. 18, 2023

(65) Prior Publication Data

US 2024/0007329 A1 Jan. 4, 2024

Related U.S. Application Data

(63) Continuation-in-part of application No. 17/876,139, filed on Jul. 28, 2022, now Pat. No. 12,244,437, (Continued)

(51) Int. Cl.
*H04L 12/46* (2006.01)
*G06F 16/23* (2019.01)
(Continued)

(52) U.S. Cl.
CPC ...... *H04L 12/4633* (2013.01); *G06F 16/2379* (2019.01); *G06F 16/9024* (2019.01); (Continued)

(58) Field of Classification Search
CPC ... H04L 12/4633; H04L 45/14; H04L 9/3218; H04L 2209/56; H04L 9/50; (Continued)

(56) References Cited

U.S. PATENT DOCUMENTS

| | | | |
|---|---|---|---|
| 10,193,696 B2 | 1/2019 | Struttmann et al. | |
| 11,194,837 B2 | 12/2021 | Vo et al. | |

(Continued)

*Primary Examiner* — Cheikh T Ndiaye
(74) *Attorney, Agent, or Firm* — Neo IP

(57) ABSTRACT

A method and system for interfacing heterogenous computing networks to accomplish a cross-network that spans at least two networks and has a source node and a destination node. A graph structure is traversed to define a transaction path. The graph structure includes transaction nodes within transfer networks and bridges that span networks. Each node in the graph structure exists on a network and has an associated set of attribute variables that specify supported tokens. A bridge path defined by two nodes spanning two logical networks is determined. The source node and the destination node are also connected via one or more out of band network paths which are separate from the bridge path. Disclosed implementations link the speed and convenience of peer-to-peer conversion models with business-to-business trading channels using a ledger-agnostic overlay and computing architecture to enable value transfers and conversion spanning dissimilar digital communication networks.

20 Claims, 25 Drawing Sheets

Related U.S. Application Data which is a continuation-in-part of application No. 17/174,529, filed on Feb. 12, 2021, now abandoned, which is a continuation of application No. 16/861, 315, filed on Apr. 29, 2020, now Pat. No. 11,038,718.

(60) Provisional application No. 63/226,204, filed on Jul. 28, 2021, provisional application No. 62/839,971, filed on Apr. 29, 2019.

(51) Int. Cl.

| | |
|---|---|
| *G06F 16/901* | (2019.01) |
| *G06Q 20/36* | (2012.01) |
| *G06Q 30/0283* | (2023.01) |
| *H04L 45/00* | (2022.01) |

(52) U.S. Cl.
CPC ......... *G06Q 20/36* (2013.01); *G06Q 30/0283* (2013.01); *H04L 45/14* (2013.01)

(58) Field of Classification Search
CPC . G06F 16/2379; G06F 16/9024; G06Q 20/36; G06Q 30/0283; G06Q 2220/00; G06Q 20/223; G06Q 20/381; G06Q 20/02; G06Q 20/065
See application file for complete search history.

(56) References Cited

U.S. PATENT DOCUMENTS

| | | | |
|---|---|---|---|
| 11,301,460 | B2 | 4/2022 | Rich et al. |
| 11,488,147 | B2 | 11/2022 | Sheng et al. |
| 11,488,161 | B2 | 11/2022 | Soundararajan et al. |
| 11,551,191 | B2 | 1/2023 | McNamara et al. |
| 2015/0286997 | A1* | 10/2015 | Zimmerman ........ G06Q 20/367 |
| | | | 705/39 |
| 2017/0085545 | A1* | 3/2017 | Lohe ...................... G06Q 20/10 |
| 2017/0103385 | A1* | 4/2017 | Wilson, Jr. ......... G06Q 20/3825 |
| 2017/0177334 | A1* | 6/2017 | Chou ......................... G06F 8/76 |
| 2018/0262327 | A1 | 9/2018 | Jain et al. |
| 2019/0028276 | A1* | 1/2019 | Pierce .................. G06Q 20/401 |
| 2019/0095995 | A1* | 3/2019 | Rohlfs .................. G06Q 40/04 |
| 2019/0104413 | A1* | 4/2019 | Cidon ................. H04L 12/4679 |
| 2019/0199617 | A1 | 6/2019 | Kalyanasundharam et al. |
| 2020/0183859 | A1 | 6/2020 | Johns et al. |
| 2020/0258153 | A1* | 8/2020 | Tilfors ................... G06Q 40/04 |
| 2021/0042735 | A1 | 2/2021 | Majidi et al. |
| 2021/0097530 | A1* | 4/2021 | Chang ................... H04L 9/0643 |
| 2021/0192501 | A1 | 6/2021 | McNamara et al. |
| 2022/0270080 | A1 | 8/2022 | Yantis et al. |
| 2022/0385499 | A1 | 12/2022 | Doney et al. |

* cited by examiner

Payment Provider

User Y Account or Wallet (Provider)

Presentation & Bus Logic

Transaction Service Bus

User X Account or Wallet (Provider)

1

2

3

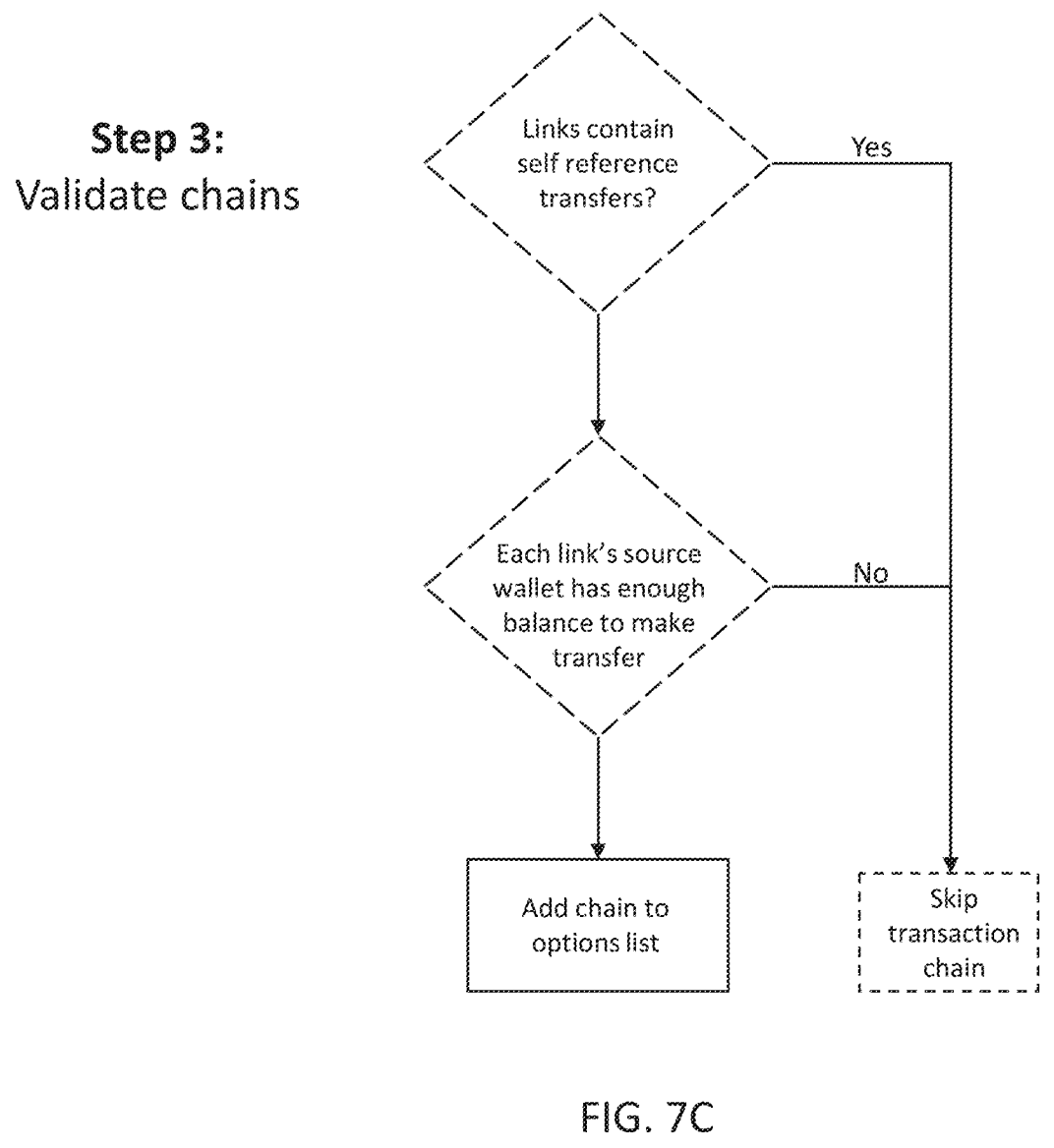

Step 3:
Validate chains

Links contain self reference transfers?

Yes → Skip transaction chain

No ↓

Each link's source wallet has enough balance to make transfer → Add chain to options list

FIG. 7C

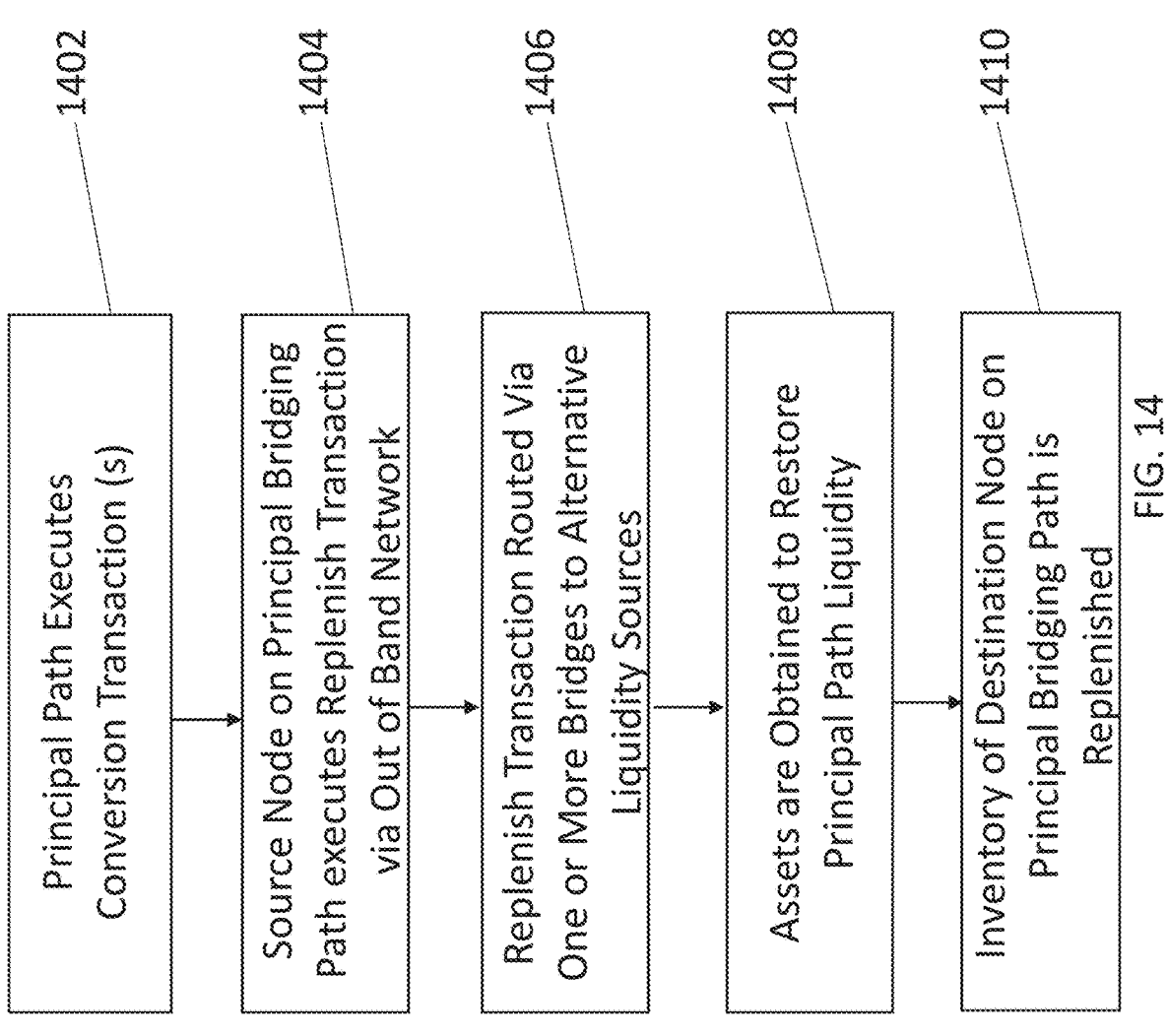

1402 Principal Path Executes Conversion Transaction (s)

1404 Source Node on Principal Bridging Path executes Replenish Transaction via Out of Band Network 1406 Replenish Transaction Routed Via One or More Bridges to Alternative Liquidity Sources 1408 Assets are Obtained to Restore Principal Path Liquidity 1410 Inventory of Destination Node on Principal Bridging Path is Replenished

FIG. 14

METHOD, APPARATUS, AND COMPUTER-READABLE MEDIUM FOR TRANSACTION MANAGEMENT SPANNING MULTIPLE HETEROGENEOUS COMPUTING NETWORKS

CROSS REFERENCES TO RELATED APPLICATIONS

This application is related to and claims priority from the following U.S. Patents and Patent Applications. This application is a continuation-in-part of U.S. application Ser. No. 17/876,139, filed Jul. 28, 2022, which claims priority to and the benefit of U.S. Provisional Application No. 63/226,204, filed Jul. 28, 2021, and is a continuation-in-part of U.S. application Ser. No. 17/174,529, filed Feb. 12, 2021, which is a continuation of U.S. application Ser. No. 16/861,315, filed Apr. 29, 2020, which claims priority to and the benefit of U.S. Provisional Application No. 62/839,971, filed Apr. 29, 2019 and is a continuation-in-part of U.S. application Ser. No. 15/416,202, filed Jan. 26, 2017, which claims priority to and the benefit of U.S. Provisional Application No. 62/388,333, filed Jan. 27, 2016, each of which is incorporated herein by reference in its entirety.

COPYRIGHT NOTICE

BACKGROUND OF THE INVENTION

1. Field of the Invention

The present invention relates to management of data using decentralized computing networks, and more specifically to transaction management for value transfers and conversions transacted over multiple heterogenous decentralized computing networks.

2. Description of the Prior Art

It is generally known in the prior art to provide networking computing systems for data management on a decentralized computer network.

Prior art patent documents include the following:

US Patent Publication No. 2021/0192501 for Network computing system implementing on-demand liquidity to facilitate direct cross-medium transactions by inventors McNamara et al., filed Feb. 21, 2020, and published Jun. 4, 2021, is directed to a computing system that can provide on-demand liquidity for cross-medium transactions using direct wallet-to-wallet transfers of digital currency. The system can acquire exchange rate information from multiple sources and generate a guaranteed exchange rate and trade instructions to the originating and recipient clients to execute the transaction.

US Patent Publication No. 2021/0042735 for System and method for controlling an application programming interface endpoint for transferring funds by inventor Majidi et al., filed Aug. 6, 2019 and published Feb. 11, 2021, is directed to a system and method for controlling anomalous access to tables. A call including a source token and a destination token is received from a caller. A first type of token and a first type of wallet corresponding to the source token are identified. A second type of token and a second type of wallet corresponding to the destination token are further identified. A transaction is determined based on the first type of token, the first type of wallet, the second type of token, and the second type of wallet. A response quote is sent to the caller. The response quote includes details about the transaction and a request for confirmation.

US Patent Publication No. 2022/0270080 for Authenticating physical items in a tokenization workflow by inventor Yantis et al., filed May 13, 2022, and published Aug. 25, 2022, is directed to methods for authenticating items in part of a tokenization workflow. In embodiments, the method includes receiving a photograph of, and information relating to, an item, and generating a virtual representation of the item. The item may be authenticated by making an authentication request via a portal to subject-matter authentication experts, wherein the portal displays the virtual representation of the item in the portal. An authentication report may be received from the experts, and a non-fungible digital token having a unique token identifier may be generated. The non-fungible token may be cryptographically linked to the virtual representation of the item on a cryptographic ledger and ownership data of the non-fungible token is updated to associate an account of an owner of the item with the digital token on the cryptographic ledger.

U.S. Pat. No. 11,551,191 for Network computing system executing programmatic adapters to implement asynchronous communications by inventors McNamara et al., filed Jan. 2021, and issued Jan. 10, 2023, is directed to a computing system that can establish asynchronous network communications with exchanges to facilitate cross-medium transactions between originating and recipient clients. Such communications can result in filtering out errant responses that would otherwise cause an open transaction to fail.

U.S. Pat. No. 11,488,161 for Systems and methods for providing transaction provenance of off-chain transactions using distributed ledger transactions with secured representations of distributed ledger addresses of transacting parties by inventors Soundararaj an at al., filed Jul. 31, 2018, and issued Nov. 1, 2022, is directed to proving and creating on a distributed ledger a verifiable transaction record of a transaction between a user associated with user device and an agent associated with agent system, where the identities of the user and agent are hidden.

U.S. Pat. No. 11,488,147 for the Computationally efficient transfer processing and auditing apparatuses, methods and systems by inventors Sheng at al., filed Apr. 12, 2017, and issued Nov. 1, 2022, is directed to the Computationally Efficient Transfer Processing, Auditing, and Search Apparatuses, Methods and Systems ("SOCOACT") which transforms smart contract request, crypto currency deposit request, crypto collateral deposit request, crypto currency transfer request, crypto collateral transfer request inputs via SOCOACT components into transaction confirmation outputs. Also, SOCOACT transforms transaction record inputs via SOCOACT components into matrix and list tuple outputs for computationally efficient auditing. A blockchain transaction data auditing apparatus comprises a blockchain recordation component, a matrix Conversion component, and a bloom filter component. The blockchain recordation component receives a plurality of transaction records for each of a plurality of transactions, each transaction record comprising a source address, a destination address, a transaction amount and a timestamp of a transaction; the source address comprising a source wallet address corresponding to a source digital wallet, and the destination address comprising a destination wallet address corresponding to a destination virtual currency wallet; verifies that the transaction amount is available in the source virtual currency wallet; and when the transaction amount is available, cryptographically records the transaction in a blockchain comprising a plurality of hashes of transaction records. The Bloom Filter component receives the source address and the destination address, hashes the source address using a Bloom Filter to generate a source wallet address, and hashes the destination address using the Bloom Filter to generate a destination wallet address. The Matrix Conversion component adds the source wallet address as a first row and a column entry to a stored distance matrix representing the plurality of transactions, adds the destination wallet address as a second row and column entry to the stored distance matrix representing the plurality of transactions, adds the transaction amount and the timestamp as an entry to the row corresponding to the source wallet address and the column corresponding to the destination wallet address; and generate a list representation of the matrix, where each entry in the list comprises a tuple having the source wallet address, the destination wallet address, the transaction amount and the timestamp.

U.S. Pat. No. 11,301,460 for Platform for creating and using actionable non-fungible tokens (KNFT) by inventors Rich at al., filed Jan. 23, 2020, and issued Apr. 12, 2022, is directed to a distributed computing platform and method for creating actionable digital assets and tokens incorporating influence and outreach ("KNFT"). A KNFT application server may be configured to receive, over a distributed computing network from a remote computing node, a request for a new non-fungible token wherein the KNFT comprises a unique KNFT identifier, at least one metadata element, and least one social vector. A blockchain proxy server may be operatively connected to the KNFT application server and to a distributed blockchain ledger. Social actions may comprise user comment, connection, direct message, like, or favorable rating, and a change in ownership of the KNFT may be written to the social vector by a KNFT API. The social vector may comprise social vector data from at least one prior owner, and the KNFT may further comprise a circulation trail vector that incorporates the ownership history of the KNFT.

U.S. Pat. No. 11,194,837 for Blockchain implementing cross-chain transactions by inventors Huang Tam Vo et al., filed May 1, 2018, and issued Dec. 7, 2021, is directed to an example operation may include one or more of receiving a request to execute a cross-chain transaction, identifying disparate locations of two or more different blockchains that have stored therein data for the cross-chain transaction, retrieving data from data blocks of the two or more different blockchains, respectively, based on the identified disparate locations, executing the cross-chain transaction which takes the retrieved data from the two or more different blockchains as inputs to generate a cross-chain result, and storing the cross-chain result via a data block of a distributed ledger.

U.S. Pat. No. 10,193,696 for Using a tree structure to segment and distribute records across one or more decentralized, acrylic graphs of cryptographic hash pointers by inventors Struttman at al., filed Mar. 10, 2018, and issued Jan. 29, 2019, is directed to a process including: receiving with one or more processors, a first request to store a record from a computing entity; encoding, with one or more processors, the record in a first plurality of segments; arranging, with one or more processors, the first plurality of segments in respective content nodes of a first content graph, wherein at least some content nodes of the first content graph have two or more content edges of the first content graph pointing to two or more respective other content nodes of the first content graph; and storing, with one or more processors, the content nodes of the first content graph in a verification graph.

SUMMARY OF THE INVENTION

The present invention relates to computer platforms for facilitating transfer or conversion of assets by connecting dissimilar networks via an exchange bridge and, further, linking a bridge node of a secondary peer-to-peer network to a bridge node of a primary business-to-business network via anchor bridges to provide liquidity from a primary market if the liquidity of the exchange bridge is challenged.

It is an object of this invention to link primary business-to-business market transactions with secondary peer-to-peer transactions in order to provide liquidity for cross ledger transactions. This allows for rapid, on-demand liquidity for cross ledger transmutation transactions and multi-ledger transformations.

In one embodiment, the present invention includes a method of transferring tokenized assets over heterogenous computer networks, the steps including a user device implementing a computer platform, the user device including a processor and a memory with a database, the computer platform executing an in-band transfer process, the steps including the computer platform routing a path between a first bridge node of a first distributed ledger and a second bridge node of a second distributed ledger, the computer platform creating an exchange bridge between the first bridge node and the second bridge node along the routed path, wherein the bridge includes an inbound bridge wallet and outbound bridge wallet, the computer platform executing a command to transfer at least one asset token of a first asset type from a client wallet on the first distributed ledger to an inbound bridge wallet, the bridge transferring the at least one asset token of a first asset type from the inbound bridge wallet to the outbound bridge wallet, a decentralized exchange conversion algorithm (DEX-AMM) equivalating the at least one asset token of the first asset type to at least one asset token of a second asset type, the exchange bridge converting the at least one asset token of the first asset type to the at least one asset token of the second asset type and simultaneously transferring the at least one asset token of the second asset type to the outbound bridge wallet of the exchange bridge, the exchange bridge executing a command to transfer at least one asset token of the second asset type from an outbound bridge wallet to a client wallet on the second distributed ledger, the computer platform executing an out-of-band replenish process, the steps including transferring the at least one asset token of the first asset type from the inbound bridge wallet of the bridge to a first custody wallet, redeeming the value of the at least one asset token of the first asset type, wherein the value is converted into at least one additional asset token of the second asset type, wherein the at least one additional asset token of the second asset type is assigned to a second custody wallet, transferring the at least one additional asset token of the second asset type from a second custody wallet to the outbound bridge wallet.

In another embodiment, the present invention includes a A system for transmutation of tokenized assets using peer-to-peer secondary transactions and business-to-business primary transactions including, a computer platform and a remote server including a remote memory with a remote database, wherein the computer platform is stored on the remote database, wherein the server is in network communication with at least one user device including a processor and a memory with a database, wherein the computer platform is implemented by the at least one user device, wherein the client account of the computer platform initiates a transfer of a first asset token from a client wallet on a first distributed ledger to a client wallet on a second distributed ledger, wherein a route planning service of the computer platform graphs at least one route between a bridge node of the first distributed ledger and a bridge node of the second distributed ledger, wherein the route planning service builds an exchange bridge along the at least one route, wherein the computer platform transfers the first asset token from the client wallet on the first distributed ledger to an inbound wallet on the exchange bridge, wherein a decentralized exchange conversion algorithm (DEX-AMM) of the exchange bridge equivalates a value of the first asset token from a value in terms of a first asset type to a value in terms of a second asset type, wherein the exchange bridge accesses at least one lending pool containing an accumulation of assets of the second asset type, wherein the exchange bridge withdraws a second asset of the second asset type from the accumulation of assets of the second asset type, wherein the value of the second asset is equivalent to the value of the first asset, wherein the second asset is transferred from the at least one lending pool to an outbound wallet on the exchange bridge, wherein the exchange bridge transfers the second asset to the client wallet on the second distributed ledger.

In yet another embodiment, the present invention includes a method of transmutation of tokenized assets using peer-to-peer secondary transactions and business-to-business primary transactions, the steps including a user device implementing a computer platform, the user device including a processor and a memory with a database, the computer platform executing an in-band transfer process, the steps including the computer platform routing at least one potential path between a first bridge node of a first distributed ledger and a second bridge node of a second distributed ledger, the computer platform displaying the at least one potential path to a graphic user interface of the device (GUI), the GUI receiving a selection of a path, the computer platform creating an exchange bridge between the first bridge node and the second bridge node along the path, wherein the bridge includes an inbound bridge wallet and outbound bridge wallet the computer platform executing a command to transfer a first asset token from a client wallet on the first distributed ledger to an inbound bridge wallet, wherein the first asset token is a first asset type, a decentralized exchange conversion algorithm (DEX-AMM) equivalating a value of the first asset token from a value in terms of a first asset type to a value in terms of a second asset type, the exchange bridge accessing an asset pool, the exchange bridge withdrawing a second asset token from the asset pool, wherein the second asset token is a second asset type, wherein the value of the second token is equivalent to the value of the first asset token, the exchange bridge transferring the second asset token from the asset pool to the outbound wallet of the exchange bridge, the computer platform executing an out-of-band replenish process, the steps including the computer platform transferring the second asset token from the outbound wallet of the exchange bridge to the client wallet on the distributed ledger, depositing the first token to an inbound custody wallet of an institutional bridge, the institutional bridge converting the value of the first asset token into a value in terms of the second asset type, the institutional bridge issuing a third token, wherein the third asset token is a second asset type, wherein the third asset token is assigned to an outbound custody wallet, the exchange bridge withdrawing the third asset token from the outbound custody wallet, wherein the third asset token is transferred to the outbound wallet of the exchange bridge.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 2 illustrates a schematic diagram of a computer architecture for providing communications between dissimilar networks according to one embodiment of the present invention.

FIG. 7C illustrates the steps of a transaction chain building process according to one embodiment of the present invention.

FIG. 14 illustrates the reference process for a network transaction involving 2 or more linked paths wherein the speed and efficiency of the principal path is enhanced by the alternative path according to one embodiment of the present invention.

DETAILED DESCRIPTION

Figure 1:
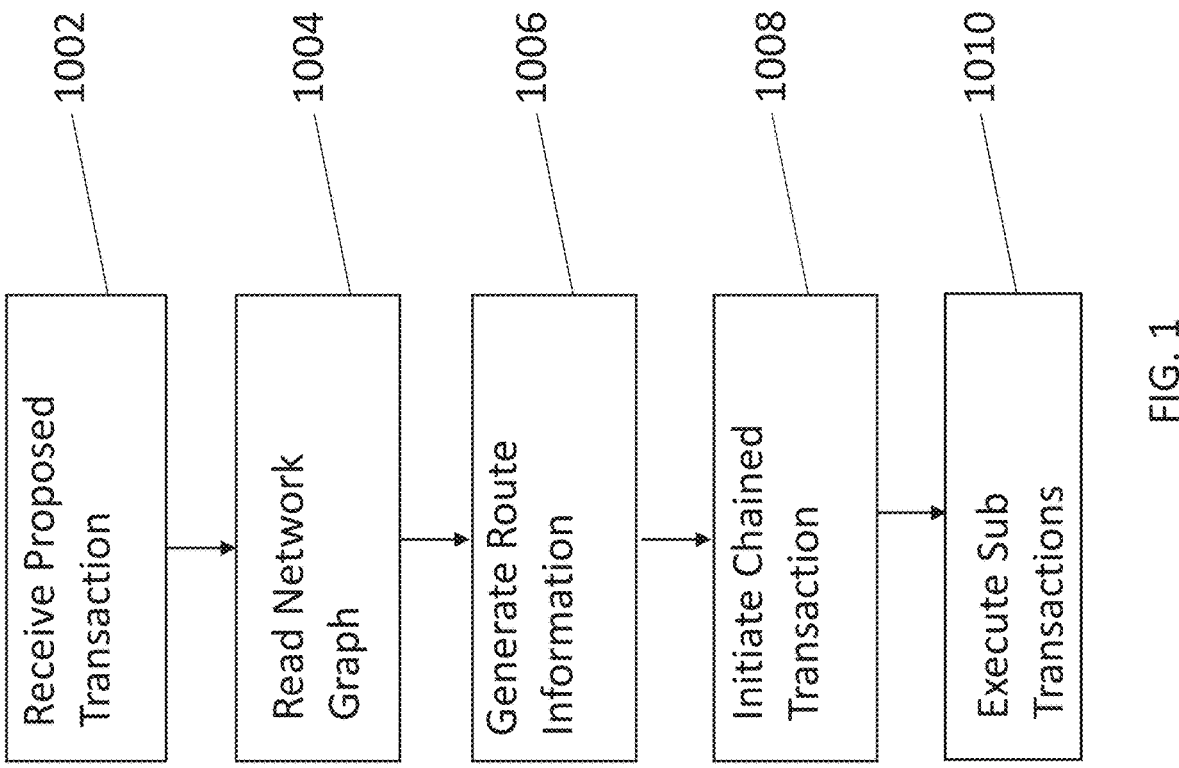
FIG. 1 illustrates a flow chart of a method for providing communications between dissimilar networks according to one embodiment of the present invention.

The present invention is generally directed to a computer platform for facilitating transfer or conversion of assets by connecting dissimilar networks via an exchange bridge and, further, linking a bridge node of a secondary peer-to-peer network to a bridge node of a primary business-to-business network via anchor bridges to provide liquidity from a primary market if the liquidity of the exchange bridge is challenged.

In one embodiment, the present invention includes a method of transferring tokenized assets over heterogenous computer networks, the steps including a user device implementing a computer platform, the user device including a processor and a memory with a database, the computer platform executing an in-band transfer process, the steps including the computer platform routing a path between a first bridge node of a first distributed ledger and a second bridge node of a second distributed ledger, the computer platform creating an exchange bridge between the first bridge node and the second bridge node along the routed path, wherein the bridge includes an inbound bridge wallet and outbound bridge wallet, the computer platform executing a command to transfer at least one asset token of a first asset type from a client wallet on the first distributed ledger to an inbound bridge wallet, the bridge transferring the at least one asset token of a first asset type from the inbound bridge wallet to the outbound bridge wallet, a decentralized exchange conversion algorithm (DEX-AMM) equivalating the at least one asset token of the first asset type to at least one asset token of a second asset type, the exchange bridge converting the at least one asset token of the first asset type to the at least one asset token of the second asset type and simultaneously transferring the at least one asset token of the second asset type to the outbound bridge wallet of the exchange bridge, the exchange bridge executing a command to transfer at least one asset token of the second asset type from an outbound bridge wallet to a client wallet on the second distributed ledger, the computer platform executing an out-of-band replenish process, the steps including transferring the at least one asset token of the first asset type from the inbound bridge wallet of the bridge to a first custody wallet, redeeming the value of the at least one asset token of the first asset type, wherein the value is converted into at least one additional asset token of the second asset type, wherein the at least one additional asset token of the second asset type is assigned to a second custody wallet, transferring the at least one additional asset token of the second asset type from a second custody wallet to the outbound bridge wallet.

In another embodiment, the present invention includes a system for transmutation of tokenized assets using peer-to-peer secondary transactions and business-to-business primary transactions including, a computer platform and a remote server including a remote memory with a remote database, wherein the computer platform is stored on the remote database, wherein the server is in network communication with at least one user device including a processor and a memory with a database, wherein the computer platform is implemented by the at least one user device, wherein the client account of the computer platform initiates a transfer of a first asset token from a client wallet on a first distributed ledger to a client wallet on a second distributed ledger, wherein a route planning service of the computer platform graphs at least one route between a bridge node of the first distributed ledger and a bridge node of the second distributed ledger, wherein the route planning service builds an exchange bridge along the at least one route, wherein the computer platform transfers the first asset token from the client wallet on the first distributed ledger to an inbound wallet on the exchange bridge, wherein a decentralized exchange conversion algorithm (DEX-AMM) of the exchange bridge equivalates a value of the first asset token from a value in terms of a first asset type to a value in terms of a second asset type, wherein the exchange bridge accesses at least one lending pool containing an accumulation of assets of the second asset type, wherein the exchange bridge withdraws a second asset of the second asset type from the accumulation of assets of the second asset type, wherein the value of the second asset is equivalent to the value of the first asset, wherein the second asset is transferred from the at least one lending pool to an outbound wallet on the exchange bridge, wherein the exchange bridge transfers the second asset to the client wallet on the second distributed ledger.

In yet another embodiment, the present invention includes a method of transmutation of tokenized assets using peer-to-peer secondary transactions and business-to-business primary transactions, the steps including a user device implementing a computer platform, the user device including a processor and a memory with a database, the computer platform executing an in-band transfer process, the steps including the computer platform routing at least one potential path between a first bridge node of a first distributed ledger and a second bridge node of a second distributed ledger, the computer platform displaying the at least one potential path to a graphic user interface of the device (GUI), the GUI receiving a selection of a path, the computer platform creating an exchange bridge between the first bridge node and the second bridge node along the path, wherein the bridge includes an inbound bridge wallet and outbound bridge wallet the computer platform executing a command to transfer a first asset token from a client wallet on the first distributed ledger to an inbound bridge wallet, wherein the first asset token is a first asset type, a decentralized exchange conversion algorithm (DEX-AMM) equivalating a value of the first asset token from a value in terms of a first asset type to a value in terms of a second asset type, the exchange bridge accessing an asset pool, the exchange bridge withdrawing a second asset token from the asset pool, wherein the second asset token is a second asset type, wherein the value of the second token is equivalent to the value of the first asset token, the exchange bridge transferring the second asset token from the asset pool to the outbound wallet of the exchange bridge, the computer platform executing an out-of-band replenish process, the steps including the computer platform transferring the second asset token from the outbound wallet of the exchange bridge to the client wallet on the distributed ledger, depositing the first token to an inbound custody wallet of an institutional bridge, the institutional bridge converting the value of the first asset token into a value in terms of the second asset type, the institutional bridge issuing a third token, wherein the third asset token is a second asset type, wherein the third asset token is assigned to an outbound custody wallet, the exchange bridge withdrawing the third asset token from the outbound custody wallet, wherein the third asset token is transferred to the outbound wallet of the exchange bridge.

None of the prior art discloses an exchange bridge for peer-to-peer currency exchange across heterogenous distributed ledgers via a secondary market and linking the exchange bridge to anchor bridges implementing a business-to-business currency exchange via a primary market such that the secondary market in real-time or near-real time supplements the conversion of asset tokens from a first asset type to a second asset type. Further, none of the prior art discloses such a system that enables the lending of asset types from a lending contract to supplement the inventory of a specific asset type and thereby facilitate real-time or near-real time conversion of assets.

Uniswap, Balancer, and Curve Finance are popular instantiations of Automated Market Makers (AMM), which are market making algorithms deployed on decentralized computing platforms, such as blockchain networks. AMMs provide network participants with a convenient mechanism to convert assets in one form into another. For most AMMs, asset conversion is performed using a pool of available assets which are traded for the asset which is to be converted and transferred to the counterparty desiring the conversion. AMM algorithms set the price and execute the conversion providing a network communication path to conduct transactions which convert one asset to another. However, these providers all struggle to provide high liquidity on a large scale or in the face of large one-way demand for conversions. The term "liquidity", as used herein, refers to the efficiency with which one asset can be converted to another. These prior art systems are inefficient for large scale asset conversion.

For AMMs, supporting liquidity requirements for larger transactions requires greater asset reserves which in turn increases both the cost of operations due to the cost of asset capital and the operational risk due to asset volatility. Providers of liquidity services relentlessly seek mechanisms to reduce the cost of operations, specifically mechanisms to become capital efficient by reducing the amount of capital required on hand to support a given market liquidity.

One mechanism to reduce the amount of capital required to support liquidity operations is to have a mechanism for replenishing depleted asset reserves to counteract the impact of a large trade or mismatched one-way flow of one asset to another by converting the asset in surplus to the asset in deficit. However, if insufficient demand for the reverse conversion isn't present in the same network, the pool must seek liquidity, through asset conversion, in a different network.

The present invention facilitates transfer or conversion of value by connecting dissimilar networks using a bridging mechanism such that alternative asset conversion is available to replenish liquidity. A bridging mechanism is made more capital efficient by linking the bridge node of a first network to the bridge node of dissimilar networks to provide additional liquidity from new sources if the liquidity of the principal bridge is challenged. This approach enables more capital efficient conversion operations by reducing the need for asset inventory by connecting dissimilar liquidity sources.

While convenient and fast, many peer-to-peer (P2P) conversion models, especially blockchain conversion tools like AMMs, provide limited liquidity when compared to institutional (i.e., business-to-business (B2B) or network-to-network) trading networks, operable to efficiently transact trillions of dollars of value daily. However, the efficiency of institutional trading networks is attributed to the transaction of large value amounts, wherein efficiency stems from a comparatively small fee and is not calculated based on the cost of an individual transaction. In fact, most institutional trading networks won't accept small orders, such as individual transactions. By linking the speed and convenience of P2P conversion models to B2B trading models using a value transfer framework for dissimilar networks according to the present invention, it is possible to create convenient, fast, scalable, capital efficient conversion networks.

The present invention provides a mechanism to enhance the liquidity of cross network value conversions using a set of linked network transfers connecting market platforms. For simplicity, the terms "transfer" or "network transfer" as used herein include any type of movement, conversion, or transformation of value. While distributed ledger technologies (DLT) simplify the transmission of value within a network, most transactions involve more than one ledger. There is therefore a need for a scalable, repeatable framework to record transactions that affect more than one ledger. The present invention advantageously orchestrates cross-ledger transactions, streamlines the hypothecation and transmission of value, tracks assets and obligations across heterogenous systems, simplifies regulatory oversight, and maintains necessary liquidity across the underlying ecosystems.

The present invention includes a ledger-agnostic overlay network designed to span the range of digital transfer networks including transaction only DLT networks (e.g., Bitcoin), smart contract based DLT networks (e.g., Ethereum), and traditional centralized computing systems. The ledger-agnostic overlay network enables value transfer within and across these types of networks and computing systems, traversing heterogeneous jurisdictional boundaries, payment networks, banking systems, public and private distributed ledgers, internal corporate accounting systems, exchanges, and more.

The present invention further includes a finance ontology. A finance ontology is a syntax-independent directory of the semantic rules governing financial transactions, including but not limited to value transfers, inter-network messaging, and translation between networks. The finance ontology includes a catalog of transfer messaging terms and associated items, and a translation schema to convert heterogeneous implementations to the applicant's syntax-independent model (i.e., rewrite data from a first network in such a way that it is operable to be processed by the second, dissimilar network).

The present invention also includes a transaction service bus (TSB) module that decouples the details of individual value transfer systems (e.g., DLTs, payment networks, banking systems) by providing global interfaces for the movement and reconciliation of value (and other financial transactions). This advantageously balances transaction loads to allows for large scale transactions (i.e., a large volume of individual transactions rather than a small volume of large transactions). Further, the decoupling of details of individual transfers advantageously provides an additional layer of security for data in value transfer systems, as the access of a first detail does not automatically grant access to a second, decoupled detail.

When a cross-network transaction is proposed, the TSB module inspects proposed transactions and engages a route planning service module to discover potential value transfer paths from source to ultimate recipient using a series of chained sub-transactions between and across transfer providers. The sender (or sender's representative, which may be an artificial intelligence engine) may then choose the preferred route based on preferences for speed, cost, or reliability. As used herein, the terms "sender" and "implementer" refer to the party responsible for sending the data via the implemented bridge. In one embodiment, the sender is a party that represents the sender. In one embodiment, the sender's representative party is an artificial intelligence engine.

The sender then authorizes the execution of the transaction on the preferred route and engages the chained transfer handler module to engage any wrapped transfer system, thereby managing the transmission of value through dissimilar networks. In one embodiment, the transaction is initiated by an external source sending value to the inbound source wallet with delivery instructions. A route planning service module is executed to determine an optimized transfer path including a chain of multiple sub-transactions and a chained transfer handler executes the transactions in a controlled manner.

Pairs of nodes in the graph structure and the corresponding sets of attribute variables define a bridge data structure providing a procedural linkage between the nodes in the pairs of nodes, wherein at least some of the pairs of nodes correspond to accounts in different networks. The bridge data structure specifies at least one source wallet, at least one destination wallet, supported units of value, and a transaction pricing model for transaction communication flowing between nodes in the pair of nodes. The bridge data structure specifies transformation logic to be attached to the logical interfaces.

The generation of transaction routing information includes traversing the graph structure in accordance with a node traversing algorithm and parsing the attribute variables. In one embodiment, transfer details for the overarching chain transfer with linkages to each sub-transaction are published on a distributed ledger. In one embodiment, the distributed ledger on which overarching chain transfer with linkages to each sub-transaction are published is separate from the transfer networks that are traversed.

In one embodiment, the present invention is directed to a method for interfacing heterogenous computing networks and transfer providers including a bridge data structure containing a source and destination bridge node, the source node managing value in its originating form and the destination node managing value in its delivery form the bridge managing value conversion rates for transactions that traverse the bridge. The method accomplishes a transformation transaction with enhanced liquidity. The phrase "transformation transaction" or "conversion transaction", as used herein, refers to a transaction where value starts in one form, such as a specific currency or asset, and changes form to a different currency or asset as it traverses one or more computing networks, and where the "transformation" or "conversion" from one form to another uses the traversal model of a cross-network transaction.

Network traversal transactions include hypothecation and settlement transactions. A hypothecation transaction (also known as a "deposit transaction") is a transaction in which assets from one network are transferred to another network by locking the value on the source network and replicating its ownership on another network. A settlement transaction (also known as a "withdrawal transaction") is essentially the opposite of a hypothecation transaction in that value on the source network representing the ownership right is returned, resulting in the release of the underlying value on the destination network. These transactions are referred to herein as "anchor transactions" since the network containing the value in its underlying form anchors transactions on the hypothecated network. Similarly, conversion transactions allow the traversal of networks by changing one form of value into another at a conversion rate or price. Conversions are achieved by maintaining an inventory of assets in nodes on each network that are released as part of a conversion transfer. In finance, a secondary market is one in which peer-to-peer (P2P) conversions are affected.

The present invention advantageously links and aggregates P2P conversion transactions with larger scale primary market transactions (i.e., business-to-business transactions) to sustain scalable secondary market operations efficiently and with minimal capital costs. This is accomplished by automating an "out-of-band replenish model", such as the model disclosed in U.S. Patent Publication No. 2017/0213289 incorporated herein by reference in its entirety, in which market liquidity requirements are met by replenishing pools of liquid assets in an automated manner. As disclosed herein, pools of liquid assets are replenished using one or more bridge transactions to maintain the inventory required to operate the secondary market. For example, if an imbalance occurs in the inventory of the market making pool of the secondary market due to significant demand for the conversion of one asset to another, the asset in excess is converted to its underlying asset. In one embodiment, this process includes the conversion of a tokenized asset to a digital, non-tokenized asset using the withdrawal bridge of the present invention. The term "withdrawal bridge" and "settlement bridge" as used herein refers to the conversion of a tokenized asset to a digital, non-tokenized asset. The resulting asset is converted in scalable and deep institutional markets via a primary market (business-to-business) transaction to the asset that is in deficit using a conversion bridge as disclosed. The resulting asset is then converted to the asset that is in deficit using the deposit (also known as hypothecation) bridge of the present invention. By linking markets such as primary and secondary markets) in this way, the liquidity of secondary (i.e., peer-to-peer) markets seeking convenient near-real time transactions can be maintained even if conversions are imbalanced without the requirement to maintain substantial and costly inventory.

The present invention further includes an order routing system as part of the TSB that routes proposed conversion transactions via the primary market path in the event secondary bridge liquidity is insufficient to support the transaction. The present invention incorporates lending functionality via a lending contract to provide alternative paths to supplement secondary market liquidity. By permitting long and/or short positions in bridge node asset management, this approach is used to reduce market exposure of bridge node operators who must maintain an inventory of liquid assets to support network conversions. The present invention leverages logistics and supply chain management logic to provide an optimal inventory system for capital efficiency. A dynamic pricing model is applied to manage transaction flows to maintain a desired level of liquidity.

Referring now to the drawings in general, the illustrations are for the purpose of describing one or more preferred embodiments of the invention and are not intended to limit the invention thereto.

FIG. 1 illustrates a method for providing interface for communications between heterogenous DLT systems in order to conduct a transformation transaction according to one embodiment of the present invention. At 1002, information is received describing a desired (i.e., requested) cross-ledger transaction that spans at least two dissimilar networks, such as two different DLT networks. In one embodiment, the transaction is a hybrid transaction, utilizing a hybrid blockchain and cloud-storage architecture. At 1004 a multi-network graph structure is read. In one embodiment, the graph structure is created by crawling nodes corresponding to bridges that span networks. In one embodiment, each node in the graph structure has an associated set of attribute variables as node metadata. Possible attribute variables include but are not limited to units of value (e.g., tokens) native to the corresponding network, identification of smart contracts implementing the tokens, wallets and/or accounts used for bridging, value sources available to the user, and/or application program interfaces (API) and network interfaces to other networks. At 1006, transaction routing information is generated for effecting the transaction based on the bridge nodes that facilitate the desired transaction, the bridge nodes having neem identified by the node traversing algorithm. At 1008, a transfer path is selected by the source based on preferences using the transaction routing information and the transfer is initiated. In one embodiment, the desired transfer path includes a chained set of sub-transactions that ensures proper execution of the requested cross-ledger transaction. At 1010, sub-transactions are executed using the specified interfaces to achieve the cross-network transaction. Sub-transactions are executed on heterogeneous networks using an ontology mapping that converts syntax-independent execution instructions to specific instructions recognized by the underlying transfer network.

In one embodiment, the overarching transaction and all sub-transactions are recorded on a ledger. In one embodiment, the ledger wherein the overarching transaction and all sub-transactions are recorded is independent from the ledgers involved in sub-transactions. In one embodiment, the independent ledger utilizes zero knowledge proofs to provide immutability while maintaining transaction privacy. In one embodiment, the chains of sub-transactions include transactions in the source network, the destination network and other networks that serve to as connections between the source network and destination network. The use of zero knowledge proofs advantageously prevents the unintentional spread of data over these networks by limiting the necessity of sharing the data.

Figure 2:
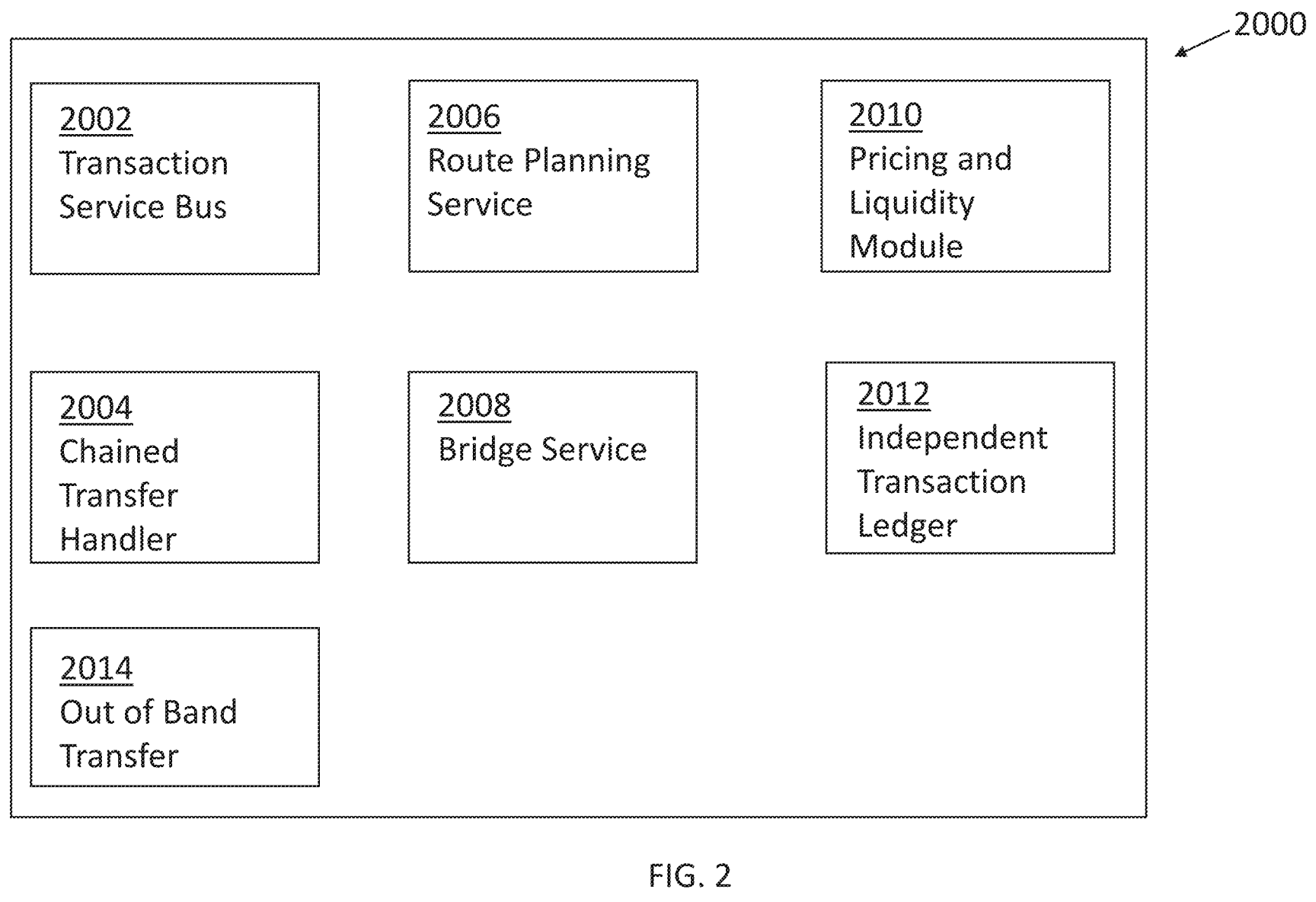

FIG. 2 schematically illustrates a computer architecture for providing communications between dissimilar networks according to one embodiment of the present invention. In one embodiment, the computer architecture of FIG. 2 accomplishes the method of FIG. 1 in addition to other transformation transfers. The architecture 2000 consists of transaction service bus module 2002, chained transfer handler module 2004, route planning service module 2006, bridge service module 2008, pricing and liquidity module 2010, independent transaction ledger module 2012, and out-of-band transfer module 2014, also referred to herein as the out-of-band replenish module 2014. Each module of architecture 2000 communicates with the others as necessary through a networked computing environment.

In one embodiment, the modules described herein are implemented as computer executable code within a single computer processing unit or multiple computer processing units. In one embodiment, one or more of the modules are implemented remotely from the other modules in a distributed architecture. The functionality of the different modules as disclosed herein is for illustrative purposes and is not intended to be limiting. In one embodiment, any of the modules provides less functionality than is described and some or all of the functionality of that module disclosed herein is provided by another module. In one embodiment, any of the modules provides more functionality than is described in associated with that specific module. In one embodiment, one or more of the disclosed modules is eliminated and some or all of its functionality is provided by another module of the present invention.

As described herein, automated execution of a transformation transaction, such as an inter-network (cross-ledger) transaction, is accomplished in response to receiving a transaction data structure specifying the details of a proposed cross ledger transaction, such as a value transfer. In one embodiment, the data structure includes transaction details (e.g., source, destination, amount, currency) and is created by a party with the authority to initiate the transfer. One example of a transaction data structure is (TransactionType=Transfer, TransactionCurrency=Ether, Source=[wallet 1 address], Destination=[wallet 2 address]).

Transaction service bus module 2002 parses the transaction data structure and determines, based on the graph, one or more viable paths (including expected pricing, fees, and transaction times) for traversing multiple networks to execute the specified transaction. The path determination is made based upon a modeled route of the networks determined by route planning service module 2006 and includes a transaction chain consisting of multiple sub-transactions, each sub-transaction having a source and a destination. If asset transformation is required on a path, the pricing and liquidity module 2010 specifies the ratio between the source and destination assets required for a bridge traversal based on bridge metadata. Chained transfer handler module 2004 executes the sub-transactions as a sequence of network transfers, confirmations, and bridge traversals specified by bridge service module 2008 to ultimately affect the value transfer of the specified transformation transaction. In one embodiment, the sub-transactions executed by the chained transfer handler module 2004 include zero knowledge proofs as desired to protect privacy. Out-of-band transfer module 2014 is used to include non-network (i.e., manual or un-instrumented) transfers. Out-of-band transfer 2014 module is used to rebalance account resources, as needed, based on the consumption of liquidity in the sub-transactions. In one embodiment, transaction records are recorded by the independent transaction ledger module 2012. In one embodiment, the present invention leverages the compliance framework disclosed in U.S. patent application Ser. No. 16/143,058, incorporated herein by reference in its entirety, to safeguard cross-ledger transactions and conduct compliance verification on dissimilar networks.

The modeled route of the networks is created by the route planning service module 2006 utilizing a multi-agent system that crawls various networks and bridge nodes to identify a viable path for the transfer of value between the source and destination. In one embodiment, the multi-agent system participates in a cross-ledger transaction to identify a viable path for the transfer of value between the source and destination. In one embodiment, the inter-network topology is stored as a graph structure of nodes. In one embodiment, the node attribute variables include descriptions of value units (i.e., tokens) native to the particular network, traversal methods, accounts used for bridging, fees and pricing methods, and associated API's and network interfaces for the purposes of communication with external sources.

Figure 3A:
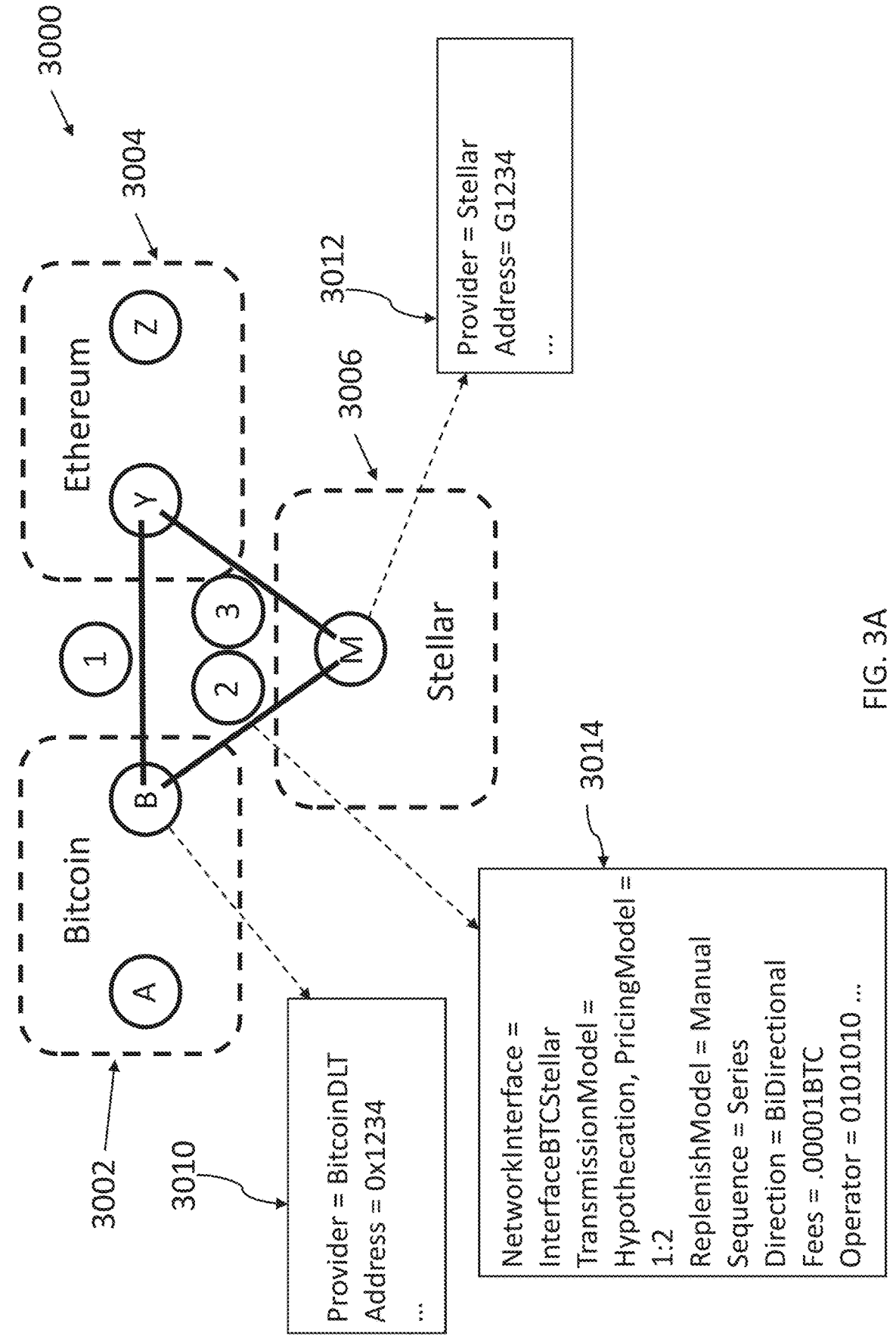
FIG. 3A illustrates a schematic illustration of a node graph according to one embodiment of the present invention.

FIG. 3A is a schematic diagram of a simple node graph structure 3000 traversed by the route planning service module 2006 of an inter-network topology according to one embodiment of the present invention. The network 3002 is a first DLT network (e.g., the Bitcoin blockchain) while the network 3004 is a second DLT network that is dissimilar from the first blockchain network (e.g., the Ethereum blockchain) and the network 3006 is a third DLT network that is dissimilar from the first and second blockchain networks (e.g., the Stellar blockchain). While only three dissimilar networks are disclosed in the present illustration, embodiments of the present invention include any number and/or any type of dissimilar networks. The network 3002, the network 3004, and the network 3006 include illustrated bridge node, each node representing one side of a bridge that provides communication between the networks. Node B is a bridge node in network 3002, node Y is a bridge node in network 3004, and node M is a bridge node in network 3006. Each bridge node corresponds to an account/wallet in the corresponding network. A pair of bridge nodes define a bridge. For example, node B and node M define a bridge between network 3002 and network 3006. Each bridge node has a corresponding metadata record indicating the set of attribute variables. Further, bridge characteristic data is stored as bridge metadata. Each pair of bridge nodes connected with a line in FIG. 3A, and the associated metadata (node metadata and bridge characteristic metadata) defines a bridge. In one embodiment, the graph includes at least a thousand nodes and/or bridge nodes. In one embodiment, the graph includes at least three thousand nodes and/or bridge nodes. In one embodiment, the graph includes at least five thousand nodes and/or bridge nodes. In one embodiment, the graph includes at least ten thousand nodes and/or bridge nodes.

The metadata record 3010 is stored in association with node B, metadata record 3012 is stored in association with node M and bridge characteristic metadata record 3014 is stored to define the connection between node B and node M. Therefore, a bridge is defined by metadata record 3010, metadata record 3012, and metadata record 3014 (collectively referred to as "bridge metadata") of graph structure 3000. In one embodiment, metadata record 3010, metadata record 3012, and metadata record 3014 are combined into a single record of bridge metadata. In one embodiment, metadata record 3010, metadata record 3012, and metadata record 3014 are divided over additional records based on the architecture of graph 3000. The metadata record 3010, metadata record 3012, and metadata record 3014 are further incorporated into the bridge functions.

Figure 3B:
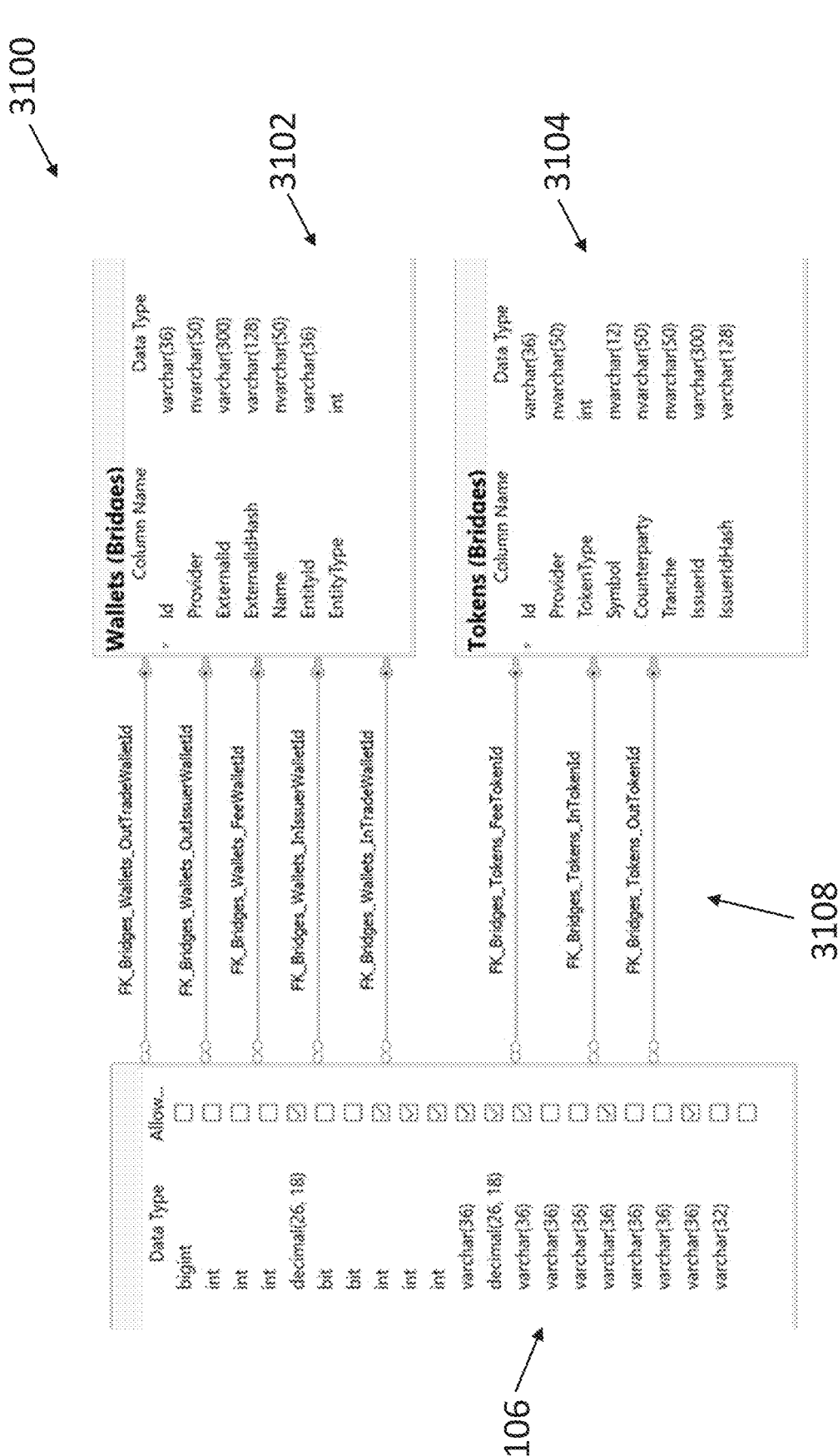
FIG. 3B illustrates a schematic illustration of a bridge metadata schema according to one embodiment of the present invention.

FIG. 3B illustrates a detailed bridge metadata schema 3100 according to one embodiment of the present invention.

The schema 3100 includes wallet attributes 3102, token attributes 3104, data type attributes 3106, and interfaces 3108. In one embodiment, wallet attributes are stored in the graph as node metadata. In one embodiment, token attributes are stored in the graph as node metadata. In one embodiment, data type attributes are stored in the graph as bridge characteristic metadata. In one embodiment, interfaces include pricing models and other logic. In one embodiment, interfaces are stored in the graph as bridge characteristic metadata. In one embodiment, the present invention use a standard schema for specifying the metadata. Bridges serve as connection paths between dissimilar networks. The graph allows transaction paths to locate and use bridges in cross-ledger transactions and/or intra-ledger transactions.

The data in graph 3000 is stored by the bridge service module 2008 and traversed by the route planning service module 2006. Transaction service bus module 2002 provides optimized transaction routing information, including sub-transactions required to effect the transformation transaction. When presented with the routes, the source account initiates a chained transaction, based on the graph and user preferences such as one or more of transaction time, conversion rates and fee load. Chained transfer handler module 2004 manages transaction execution including the proposed sub-transactions to ensure proper transfer execution (or rollback) through ultimate delivery. The present invention optimizes the route planning and path optimization for determining a bridge route.

The present invention advantageously discloses a computer platform with an architecture for routing and building a bridge between nodes of heterogenous distributed ledgers. The specific ability to build bridges using the present invention rather than outsourcing the bridge building to a third party platform allows for increased privacy and security of transactions conducted using the bridge. Further, this allows a user device to select the desired path. For example, to connect node B to node Y of FIG. 3A, a user device displays options for bridging the connection including the option to use bridge 1 and the option to use a combination of bridges 2 and 3. In one embodiment, the user device receives an input of the preferred route from a GUI of the user device. In one embodiment, the bridge route is selected and the bridge is constructed based on predetermined factors, including but not limited to the number and amount of fees involved with the route, the length of the route, the distributed ledgers associated with the bridge nodes along the route, and one or more policies associated with the bridge nodes along the route.

FIG. 3A further depicts the selection of paths and transaction chains. The graph 3000 has three DLT networks, each having at least one node. While transactions occur within a network (e.g., transferring from node A to node B, transferring to node Y to node Z), there is also a need to cross between networks. However, in order to cross between networks (i.e., transact between nodes that are in different DLT networks) a bridge must be used. Without bridges, no path exists for transfer between the nodes of the dissimilar networks, (e.g., nodes A and Z). To link the networks, bridging accounts (e.g., accounts at node B, node M, and node Y) are created. Bridges are then set up to link these accounts. Using bridge 1, a route between node A and node Z, exists via transferring from node A to node B, traversing bridge 1 to node Y, and transferring from node Y to node Z. A second route exists by linking through a third-party network via transferring from node A to node B, traversing bridge 2 to node M, traversing bridge 3 to node Y, and transferring from node Y to node Z. A route planner of route planning service module 2006 traverses the network graph and generates these routes as potential routes. In one embodiment, a user decides the best transfer path from the identified options based on preferences and other attributes. In one embodiment, an automated service decides the best transfer path from the identified options based on preferences and other attributes.

Transaction service bus module 2002 implements a finance ontology that serves as a syntax-independent model of value transfers, a catalog of transfer messaging terms and associated items, and a translation schema to convert heterogeneous implementations of the various networks to the syntax-independent model. A finance ontology is a syntax-independent directory of the semantic rules governing financial transactions, including but not limited to value transfers, inter-network messaging, and translation between networks. Chained transfer handler module 2004 executes sub-transactions on heterogeneous networks via the transaction service bus module 2002 which translates the proposed sub-transactions from the syntax-independent instructions to the network specific implementation.

The finance ontology is an abstraction layer that provides a common language for financial transactions. The ontology defines interfaces for the services, functions, and objects encountered in financial systems. The ontology provides an interoperability layer isolating the differences between the implementations of individual service providers providing for a flexible modular system where individual components are loosely coupled. The ontology advantageously enables the composition and compilation of individual financial services into complex financial systems even if individual services are not designed to work together. Since payment chaining is designed to connect any transfer network to any other transfer network, the common service definition reduces the complexity of the interconnecting N systems from N factorial (N!) to N. Thus, the ontology is designed to make large integrations tractable. Standard functions and interfaces of the technology are disclosed herein.

However, developing a common abstraction for each underlying provider in order to increase tractability reduces the expressivity (that is, special features that can be exposed by unique providers) of individual providers. The present invention includes two mechanisms to ensure that expressivity is not reduced for the sake of increased tractability. First, the use of "wrappers" exposes features that are unique to a specific provider/network or to a subclass of providers/networks. One of ordinary skill in the art will appreciate that the term "wrappers" as used herein refers to a function that is intended to call one or more other functions. A token of a first DLT is wrapped in a token wrapper of a second DLT in order to call one or more functions that are specific to the second DLT. Dependent clients interface directly with an implementation specific wrapper to leverage these unique features. However, this creates a direct dependency between the client and service implementation that tightly couples the client to the service implementation, which limits modularity and scalability. The modularity of the present invention enables an implementer to determine if the tradeoff to gain unique functionality is worth the increased dependency on a specific provider/network.

Additionally, the finance ontology of the present invention includes a data structure that enables additional data with a locally defined specification to be carried in a general-purpose interface. The core data structures include an OtherData field that has a specification that includes type and data information enabling parsers to inspect the data and parse it. In one embodiment, parsers are able to inspect the data and parse it only if the format of the data is recognized. This structure enables point-to-point communications between systems that require additional data to be carried in structures used by all parts of the system. As a result, coordinating functions, like those exhibited in the chained transfer handler module, can perform functions at global scope without sacrificing the unique features of specific transfer providers.

As noted above, bridge server module 2008 provides logical interfaces, bridges, between the various DLT networks and relays transactions and value between them. Bridges accommodate token types representing both similar and dissimilar assets and units of value. Bridge server module 2008 implements the bridges to create a logical cross-ledger connection based on the model and node metadata. Essentially a bridge is a data structure that defines the transfer behavior. Bridge server module 2008 reads the metadata record 3010, metadata record 3012, and metadata record 3014 of FIG. 3A and determines bridge type, assigns Vostro wallet(s), assigns Nostro wallets, identifies fees, determines pricing models, assigns out-of-band replenish as necessary, and identifies and attaches transformation logic in the manner disclosed herein. A bridge operator (i.e., an entity or system process with appropriate permissions to operate via both networks spanned by a bridge) is indicated in the metadata record 3014. Bridging accounts are created or assigned to link the source and destination networks. In one embodiment, the source account in a bridge is a custody account. In one embodiment, the source account in a bridge is active (i.e., containing authority to operate) for two-way bridge support. In one embodiment, the destination account is active. In one embodiment, the destination account requires a linked issuer for certain types of transfers.

Bridge service module 2008 creates and stores various classes of bridges, with a range of options in price discovery (e.g., pegs, floats, exchanges), accounting (e.g., translation, indenture), and transfer (e.g., in-band, out-of-band). These classes provide common interconnectivity patterns facilitating repeatable processes to execute and record the movement of value between networks. A bridge class is composed of options in areas such as price discovery, accounting, and transfer (e.g., in-band and out-of-band combinations), as specified by the metadata model. Dissimilar networks are connected together using bridges and thus bridges facilitate the flow of value between networks. In one embodiment, bridges further extract a toll for the service as specified by the metadata. Bridges create connections between networks or units of value that receive and relay value transfers across different transmission networks by controlling:

i. Transmission mode (e.g., hypothecation (by reference), settlement (by value), linkage, or trade—transformation (changing, splitting the assets))

ii. Pricing (e.g., exchange, algorithmic, pegging)

iii. Synchronicity (i.e., synchronous or asynchronous programming with hedging & risk management)

iv. Fee, capital supply logistics, and liquidity management

Each bridge includes an inbound account and an outbound account (associated with, for example, nodes B and M respectively in FIG. 3A). In one embodiment, the accounts are owned by the bridge operator with system permissions to be operated as part of a transaction chain. These accounts are provided as configuration parameters in the bridge metadata during the creation of the bridge. The value units supported by the inbound and outbound accounts defines the connections supported by the bridge. Supported connections are necessary for transfer routing. Using the example of FIG. 3A wherein a transaction originates in DLT network 3002 and crosses into the DLT network 3006, the inbound bridge account of the bridge (e.g., vostro account B in FIG. 3A) becomes the destination account for the initial sub payment in the transaction chain. This account does not need to be an "Active" account (i.e., an account containing authority to operate) unless "rollback" capability is required. The outbound account of the bridge (ex., nostro account M in FIG. 3A) is used to send value down the chain or to the final destination. In one embodiment, the outbound account of the bridge is active, meaning the processing thread has the authority to initiate a transaction from the account. For dark pool transactions (i.e., a transaction with prepositioned value) sufficient value must be present in the inbound bridge account prior to initiating the chained transaction. In one embodiment, bridges are loaded from bridge server module 2008 into a list used by chained transfer handler module for route planning and payment execution. In one embodiment, the class used to execute the bridge is determined by the configuration.

The list of possible routes from one wallet type to another wallet given the desired destination value unit is determined by evaluating the supported tokens, indicated in bridge metadata, for inbound and outbound wallets used by the available bridges. Route planning service module 2006 uses this list when mapping paths from source to destination. For example, graph 3000 of FIG. 3A shows two possible routes between DLT network 3002 and DLT network 3006. The first route is indicated by the use of bridge 2 and the second route is indicated by the combination of bridge 1 and bridge 3.

In addition to bridge configuration details, operational attributes of bridge classes are determined by dependency injected details and are stored as bridge metadata. Variations in bridge operations in the present invention are divisible into 6 attributes defined in the metadata: transmission model, pricing model, replenish model, sequence, direction, and fees. The transmission model defines how ledgers are linked together via bridging wallets. The present invention includes five types of transmission models: hypothecation (i.e., deposit), settlement (i.e., withdrawal), and transfer (i.e., transfer between inbound and outbound bridge accounts), transmute (i.e., changes between ledger networks), and transform (i.e., changes between more than two ledger networks). In one embodiment, the model to be used is determined based on the desired transfer mode, bridge operator's ability to perform issue/burn operations, the availability of custody wallets, and other business requirements.

The pricing model defines the ratio of the number of destination ledger tokens sent for every source token received by the bridge. The pricing model implementations include: a link (1:1), a peg (fixed ratio), algorithmic (dependency injected plugin), or external (taken from a third-party source such as an exchange). The replenish model defines the mechanism used to refill the outbound wallet when excessive unbalanced flow takes place and resources must be repositioned. Replenish model implementations include; none, manual, transfer, and exchange. Additionally, bridges have a sequence (Series/Parallel) and direction (Unidirectional/Bidirectional) indicating how the bridge is executed.

In cases of multi-ledger issuances, bridges implement cross-ledger transmutation. This is used when the official record of ownership is on a separate ledger than the one being used for transfer, or the official record is the sum of ownership records on affected ledgers. Transmutation permits tokens to be issued on multiple ledgers and/or provides a means by which tokens issued on one ledger "flow" to another. As tokens move from ledger to ledger, the total number of tokens in circulation remains constant while the ownership record moves from ledger to ledger.

For example, funds exiting a ledger are sent to a source ledger base wallet. In one embodiment, the transfer is also an escrow transaction placing a hold on the tokens without moving them. An equivalent number of tokens are issued into circulation on the destination ledger from the issuer (i.e., an issuing wallet, an issuing account, or an issuing smart contract) or cold wallet to the outbound wallet on Provider B for delivery to the destination. On successful delivery, the IIssuer.Destroy function called on the source ledger removes the tokens from circulation.

Figure 4:
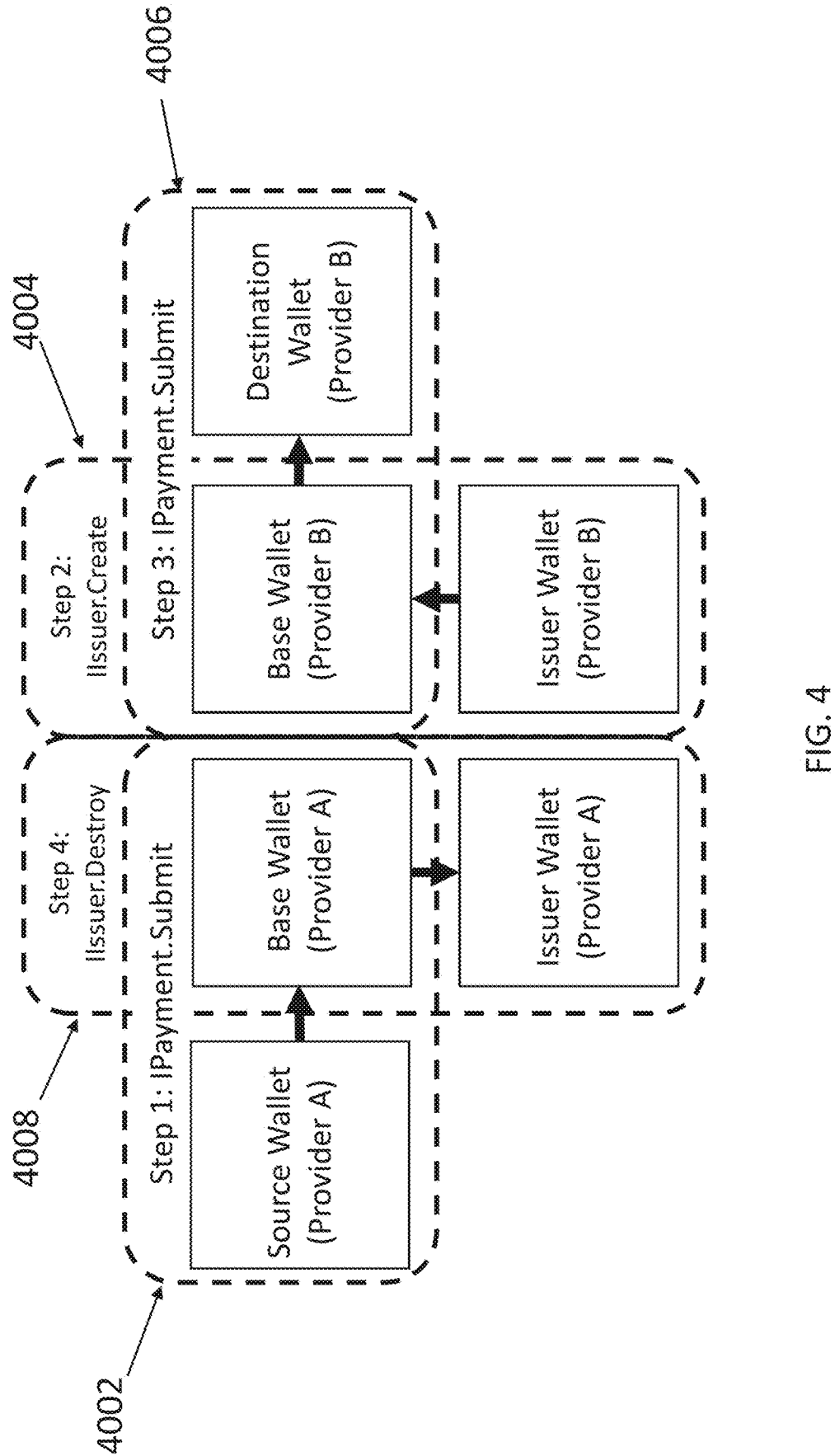
FIG. 4 illustrates a schematic diagram of an example of a chain of sub transactions for accomplishing a cross ledger mutation according to one embodiment of the present invention.

FIG. 4 is a schematic diagram of an example of a chain of sub-transactions for accomplishing a cross ledger mutation according to one embodiment of the present invention. Transmutation is the creation of one unit of value corresponding with the destruction of another (e.g., the movement of share representing beneficial ownership from one ledger to another). At 4002, a value is sent from the source wallet to a base wallet using Provider A. This wallet is the bridge inbound wallet. At 4004, tokens are issued from Provider B issuer wallet and sent to the base wallet on Provider B (the bridge outbound wallet based on bridge attributes). At 4006, base wallet on Provider B sends value to destination wallet on Provider B. At 4008, on transaction completion, equivalent number of tokens are destroyed from the base wallet of Provider A. The process of destroying tokens as used herein assumes that chained transfer handler module 2004 has a mechanism to detect and attribute transactions on the source and destination ledger and a mechanism to create tokens on Provider B and destroy tokens from the Base Wallet on Provider A. Access to these authorities can be indicated by bridge metadata. Also, it is possible to skip steps 4004 and 4008 by issuing and destroying tokens directly through the issuer wallet. The destruction of tokens as used herein refers to the process of removing tokens from circulation on a distributed ledger, also referred to herein as "burning" a token. This is accomplished by moving the tokens into an issuer wallet on the provider network, thus removing them from circulation in client wallets on the provider network.

In some cases, it is desirable to convert the rights represented in tokens from one form to another. For example, it may be desirable to convert the loan rights represented in a convertible note into an equity position. The present invention advantageously utilizes a fixed ratio transform (e.g. 1 share debt=1 share equity or 10 shares debt=1 share equity) using the earlier transmute function to convert the rights represented in tokens from one form to another. It may be further desirable to split rights in a common share into separate tokens that function differently with one representing voting rights and the other representing beneficial ownership of income or equity proceeds. In one embodiment, the present invention utilizes a custom transaction transform bridge. For each type of token delivered to the inbound wallet, more than one type of share is produced and delivered to the destination. The basic sequence of a transform transaction is the same as a transmute transaction, but the bridge executes instructions to issue two or more types of instruments on the outbound transaction and delivers each instrument to the desired destination wallet. In one embodiment, the reverse transaction is conducted to combine rights into a new composite right (e.g. combine voting and beneficial ownership into a common share). In one embodiment, a transform bridge is an intra-ledger bridge (i.e., need not span multiple networks).

Exchange bridges are a special kind of bridge where price discovery or movement of funds involves an exchange in-band or out-of-band (OOB). In this case, the amount of funds required for the source transaction depends on the current total volume price of the equivalent trade on an exchange. Funds are then replenished in-band or out-of-band in batch. In one embodiment, the inbound transfer is made to an exchange account for in-band transactions. In this case the outbound bridge account would also reside in the exchange. In one embodiment, outbound bridge accounts (i.e., nostro accounts) use the same provider as the inbound account of the bridge (i.e., vostro accounts) if exchange is not available via the provider network but different currencies are supported. Other types of bridges are discussed below with respect to FIGS. 10 and 11.

The present invention includes a transaction service bus (TSB) module 2002, an interface architecture that includes libraries that map and serve interfaces and data structures. In one embodiment, the transaction service bus is operable for DLT and traditional value transfer networks (e.g., Ethereum, PayPal, SWIFT) and value transfer models. In one embodiment, the interface or interfaces required by a bridge are specified in the bridge metadata. These interfaces expose the functions required to execute procedures used for transformation transactions. The TSB wrappers implement a hub and spoke model for integration, through which dependent services, like chained transfer handler module 2004, only need to integrate with the required interface once to orchestrate transactions across wrapped transfer networks.

In one embodiment, the TSB module 2002 is implemented as an abstraction layer that provides a common interface for intra-ledger transactions. In one embodiment, to participate in a cross-ledger transaction as either the source or destination ledger, a transaction provider is wrapped in a TSB wrapper. The wrapper is an executable that integrates with the underlying transfer provider to execute transactions and react to activity in the network. The wrapper exposes common interfaces as defined in the finance ontology. These interfaces decouple business and transaction logic associated with chaining from the specific implementation details of a transaction provider and permit broad reuse of transaction patterns. This advantageously enables transaction logic to be executed independently of the business logic.

Transaction providers/networks vary broadly in implementation and integration patterns. For example, blockchain networks require a client that interacts with the nodes while many payment networks expose APIs. Application Programming Interfaces are implemented using representational state transfer (REST), simple object access protocol (SOAP), remote procedural call (RPC), and other patterns. A majority of corporate accounting systems run on relational databases with no specific pattern for integration. In one embodiment, the transaction service bus module library of the present invention is developed to integrate with a transaction provider implemented in any of these styles to provide a common pattern for interacting with the underlying service, thereby implementing a specific pattern for integration.

In one embodiment, the TSB module libraries connecting to each provider are injected into the chained transfer handler module 2004 using an abstract factory pattern. The abstract factory pattern is a known mechanism for encapsulating a group of individual factories that have a common theme without specifying their concrete classes. For example, client software creates a concrete implementation of the abstract factory and then uses the generic interface of the factory to create the concrete objects that are part of the theme. Factory patterns separate the details of implementation of a set of objects from their general usage.

Interfaces that define the connections are found in the finance ontology. As a provider is initialized, it publishes its support for service interfaces and functions to the calling service. This enables the calling service to identify the services and methods that are supported by the transaction provider. Using this information, the calling service then determines the eligibility of a provider to support a transaction type. In one embodiment, all providers participating in a chained transaction support the IPaymentService abstraction. Frequently used services from the finance ontology include but are not limited to:

IPaymentService: executes all transfers of value. Functions include: estimating costs for a transaction, executing the payment, validating its completion, and obtaining a list of payments from the source IWalletReaderService: identifies account balances (the amount of value available at a particular wallet address) and is used to obtain details about the wallet (e.g., supported currencies, date created)

IWalletValidatorService: determines if a wallet is eligible for transactions, including ownership by the entity claiming it.

IExchangeService: receives and matches orders to convert one form of value into another.

In one embodiment, the IPayment service and IIssuer service layer over any payment system and execute transfers via that provider. Example pseudo code and related data structures for the interfaces include:

```
public interface IIssuerService
{
1.        /// <summary>
2.        /// Issues an amountof newtokens to a designated wallet.
4.        Task<Itransaction>IssueAsync(IwalletIssuerActive wallet,
Iamount amount);
5.        /// <summary>
6.        /// Destroys an amount of new tokens from a designated wallet
7.        //// </summary>
8.      Task<Itransaction> Destroy Async(IwalletIssuerActive wallet,
Iamount amount);
9.        /// <summary>
10.       /// Freezes a token.
11.       /// </summary>
12.       Task<Itransaction> FreezeAsync(IwalletIssuerActive wallet,
Itoken token);
13.       /// <summary>
14.       /// Retrieves token details.
```

-continued

```
15.     ///</summary>
16.     Task<ItokenDetail> GetTokenDetails(IwalletActive wallet, Itoken
token);
}
ii. public interface Ipaymentservice
iii. {
1.      /// <summary>
2.      /// Calculates available routes to deliver amount to designated
wallet.
3.      /// </summary>
Task<List<IpaymentOptio>> PrepareAsync(IwalletActive wallet,
Iwallet destinationWallet, Iamount amount, Ifilter filter = null);
4.      /// <summary>
5.      /// Executes payment using IpaymentOption path using authority of
active wallet
6.      /// </summary>
Task<Itransaction> SubmitAsync(IwalletActive wallet,
IpaymentOption payment);
7.      /// <summary>
8.      /// Cancels ongoing payment transaction using authority of active
wallet
9.      /// </summary>
10.     /// <remarks>
11.     /// Not all providers will support this action
12.     /// </remarks>
13.     Task<Itransaction> CancelAsync(IwalletActive wallet, string uuid);
14.     Event Complete(Itransaction trans);
}
```

To understand the application of the transaction service bus module 2002 to complex cross-ledger transfers, it is helpful to first explore how simple payment systems work in the context of the TSB module 2002.

Figure 5:
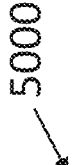
FIG. 5 illustrates a schematic diagram of an example of a simple value transfer according to one embodiment of the present invention.

FIG. 5 is a schematic diagram of an example 5000 of a simple value transfer according to one embodiment of the present invention. User X (sender) sends a value to User Y (recipient) on the same ledger (e.g., a Paypal transfer). First, the sender proposes a transfer by specifying the function (IPaymentService.Prepare) the recipient (by address) and the currency/amount to be sent (usually denoted in the amount the recipient expects to receive). The system checks the validity of the proposed payment (assess fees/gas, policy, valid recipient, sufficient funds) and responds with one or more options regarding the amount which must be sent to achieve the desired delivery. If the transfer terms are acceptable for an option, the sender initiates the transfer (Step 1, PaymentService.Submit) with a signed transaction (login, secret, etc). The system validates the transfer (Step 2, event IPaymentServiceinitiated) and moves value by adjusting account balances (reducing source and increasing destination balances) while extracting a transfer fee (Step 3). On completion of the transaction, notification is sent (event IPaymentService.Completed). In one embodiment, the notification of transaction completion is sent to both the sender and the recipient. In one embodiment, the sender selects the parties who receive a notification of a transaction completion including but not limited to the sender, the recipient, and an administrative party of one or more provider networks. The new balances are reflected in the source and destination wallets upon completion of the transfer.

One of ordinary skill in the art will appreciate that a signed transaction uses the cryptographic signature of the sender, which is a private key associated with the wallet of the sender. The public key associated with the private key is then used to determine the authenticity of the signed transaction. In one embodiment, the present invention only initiates the transaction upon verification of the authenticity of the signature. In one embodiment, a chained transaction in accordance with the present invention is initiated using the functions depicted and described with respect to FIG. 5 in combination with additional elements of the present invention.

Figure 6:
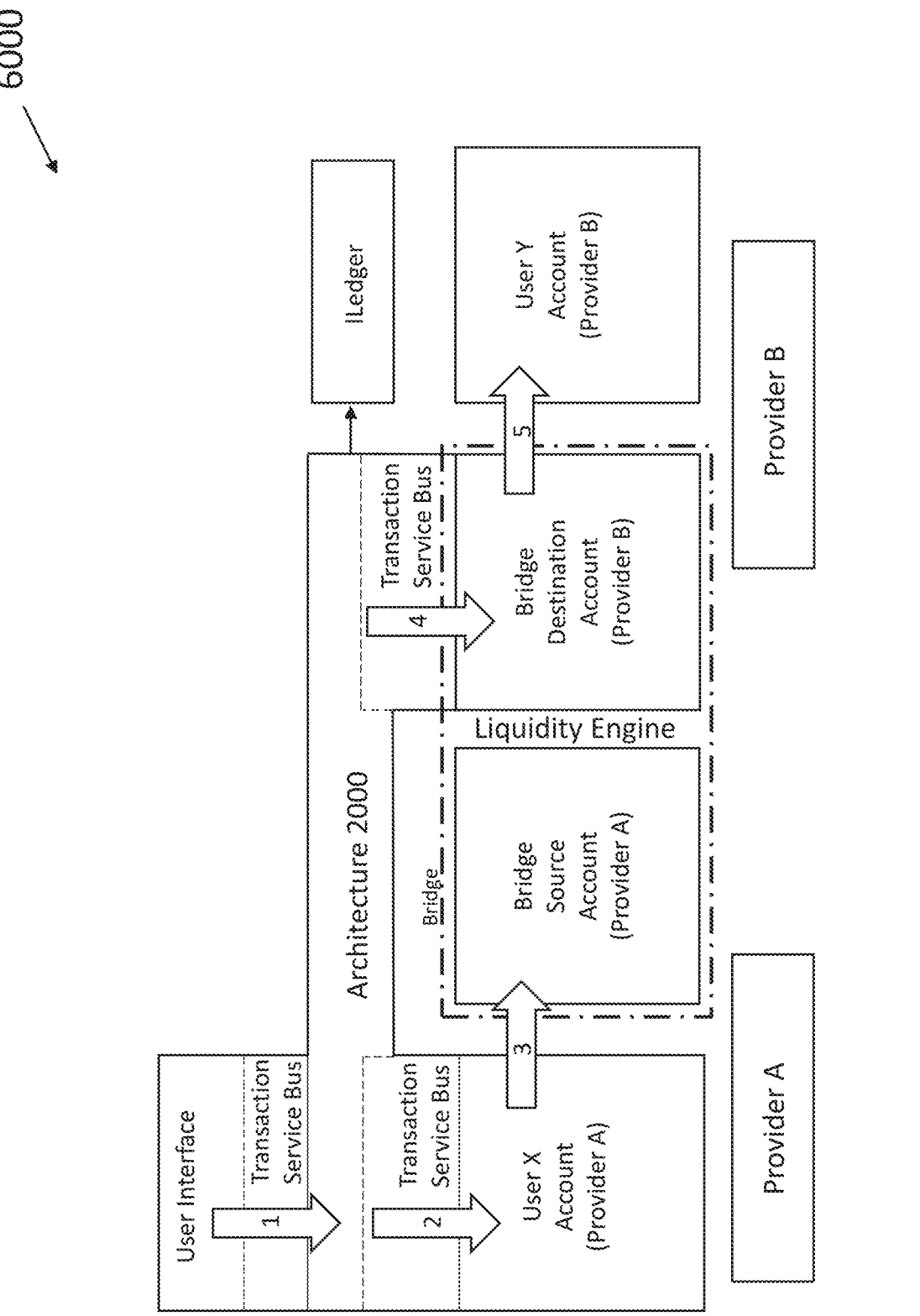
FIG. 6 illustrates a schematic diagram of an example of a chained transaction with an out-of-band replenish path according to one embodiment of the present invention.

FIG. 6 schematically illustrates an example 6000 of a chained transaction (i.e., a chain of multiple sub-transactions to be accomplished in a specified order) according to one embodiment of the present invention. The example 6000 implements architecture 2000 of FIG. 2 to accomplish the transaction. Individual ledger transfers in the chain use methods consistent with a simple payment with coordinating activities managed by chained transfer handler module 2004 of FIG. 2.

As shown in FIG. 6, the sender proposes a transfer (IPaymentService.Prepare) using the TSB interface. In this example, user X desires to transfer value from and account on Provider A (a first DLT Network for example) user Y's account on Provider B (a second DLT network for example). At step 1, the route planning service module 2006 looks for available paths by traversing the node graph (such as node graph 3000 of FIG. 3A) to identify bridges that provide a viable path between the source and destination networks based on the bridge metadata. The route planning service further obtains fees for each leg of the transfer. In one embodiment, there are no paths available for facilitate the transfer. In one embodiment, there are one or more paths available to facilitate the transfer. Various techniques (including artificial intelligence) are used to narrow the list of available options or to prioritize the possible paths. In one embodiment, the paths include all necessary TSB interfaces and business logic derived from the bridge metadata.

The present invention is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The present invention is operable to use any of the aforementioned learning techniques alone or in combination.

Further, the present invention is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The present invention is preferably operable to recommend and/ or perform actions based on historical data, external data sources, ML, AI, NNs, and/or other learning techniques. The present invention is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

In one embodiment, the sender selects the desired path and initiate the desired transfer (IPaymentService.Submit). In one embodiment, the sender is an automated algorithm. The chained transfer handler module 2004 writes the transaction to a ledger of system transaction ledger 2013 (FIG. 2) to ensure auditability and recoverability in the result of system failure. In one embodiment, this record is obfuscated using zero knowledge proof techniques to provide immutability without compromising transaction privacy. One of ordinary skill in the art will appreciate that zero knowledge proofs is an attestation to the verity of information when transferring data between parties without revealing the information to a receiving party. A zero knowledge proof advantageously allows for increased privacy and authentication of data without revealing sensitive information. The chained transfer handler module 2004 also publishes an event (IPaymentService.Initiated) to signal the transfer. At step 2, the chained transfer handler module 2004 conveys the signing authority of the user to execute a child transfer on the source ledger using the planned route by the IPaymentService.Submit function. In one embodiment, this step includes the traversal of dissimilar networks via one or more bridges. At step 3, transfer to the source bridge account from the user account is initiated. On initiation of the sub transfer, an event is thrown (IPaymentService.Initiated) as this transfer is linked to the parent transaction in the external transaction ledger. On completion of the transfer to the source bridge account (IPaymentService.Completed), an event is thrown to mark the completion of the transfer signaling the handler to initiate the next part of the transaction. A transfer is initiated via the bridge (IBridgeService. Submit). At step 3, upon completion of the bridge transfer (IBridgeService-.Completed), chained transfer handler module 2004 initiates the transfer on the outbound ledger using IPaymentService. Submit to deliver to the value to the destination account or another leg in the chain depending on the route. An event is thrown on the initiation of this transaction (IPaymentService.Initiated). This transaction is linked to the parent transaction in the external transaction ledger of independent transaction ledger module 2012. The value is delivered to the destination account and an event is thrown (IPayment-Service.Completed) at Step 5. As the last step in the chained sequence, an event is thrown signaling the completion of all transactions. All sub-transactions are recorded to the ledger of system transaction ledger 2012.

In one embodiment, a chained transfer is initiated from an external system, skipping Step 1 and Step 2 of FIG. 6, by delivering value to a bridge source account with instructions for delivery to the destination. On receipt, the bridge account issues an IPaymentService.Completed transfer. The chained transfer handler module 2004 reads this event and determines if there is a legitimate payment route. If a route is available, the chain is initiated with the funds held in escrow at the bridge source account. If the transfer succeeds, these funds are released. If the transfer fails, the funds are returned to the source. In one embodiment, if the source ledger supports smart contracts, the initiating transaction leverages on-chain escrow methods to ensure atomicity of the transaction.

One of ordinary skill in the art will appreciate that the terms "parent transaction" and "child transaction" as used herein refer to the processes wherein a child process is created using the parent process, with similar and/or identical functionality. In one embodiment, the parent transaction is a transaction that is initiated within the system before the initiation of the child transaction. In one embodiment, the initiation of the parent transaction executes the initiation of the child transaction.

Figure 7A:
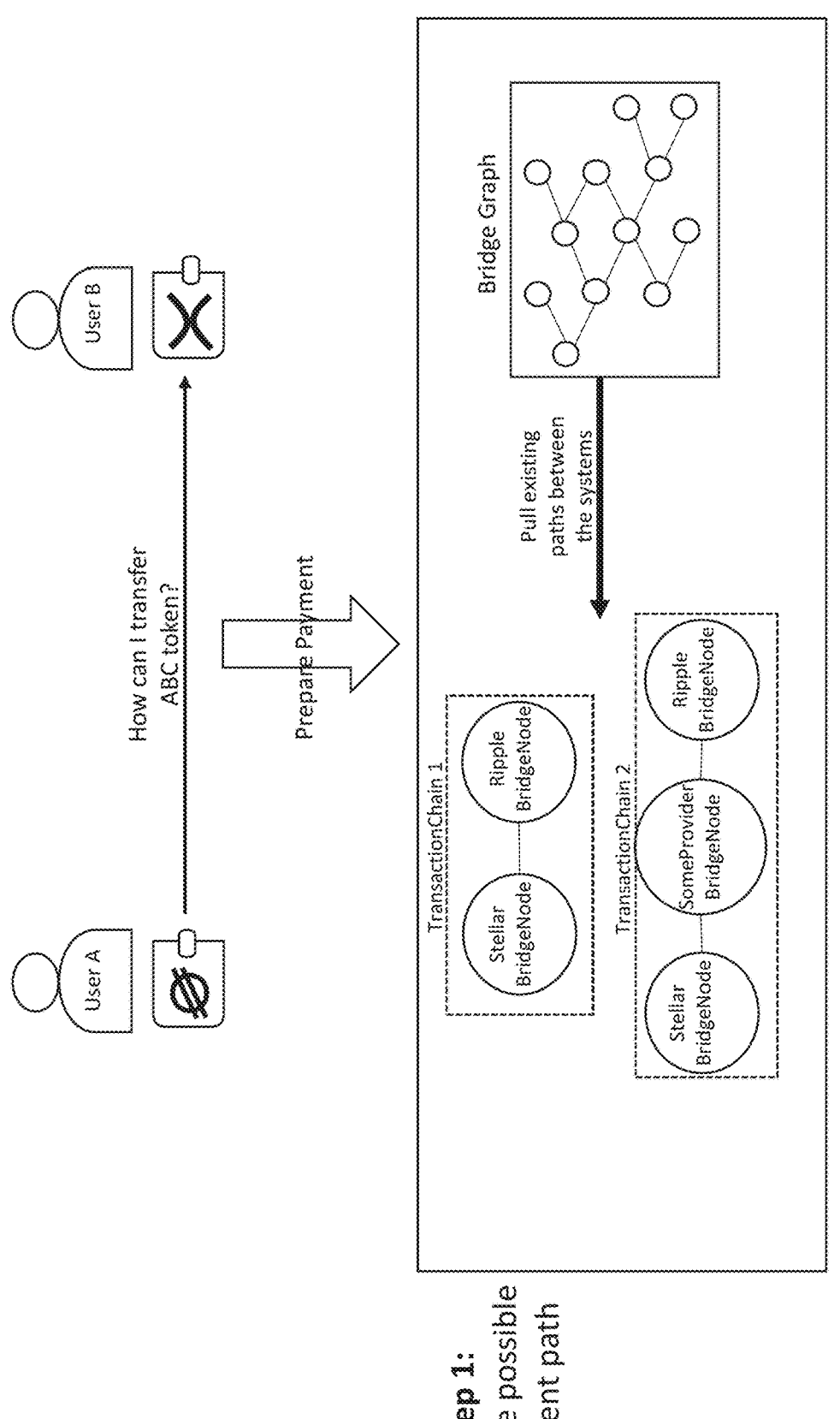
FIG. 7A illustrates the steps of a transaction chain building process according to one embodiment of the present invention.
Figure 7B:
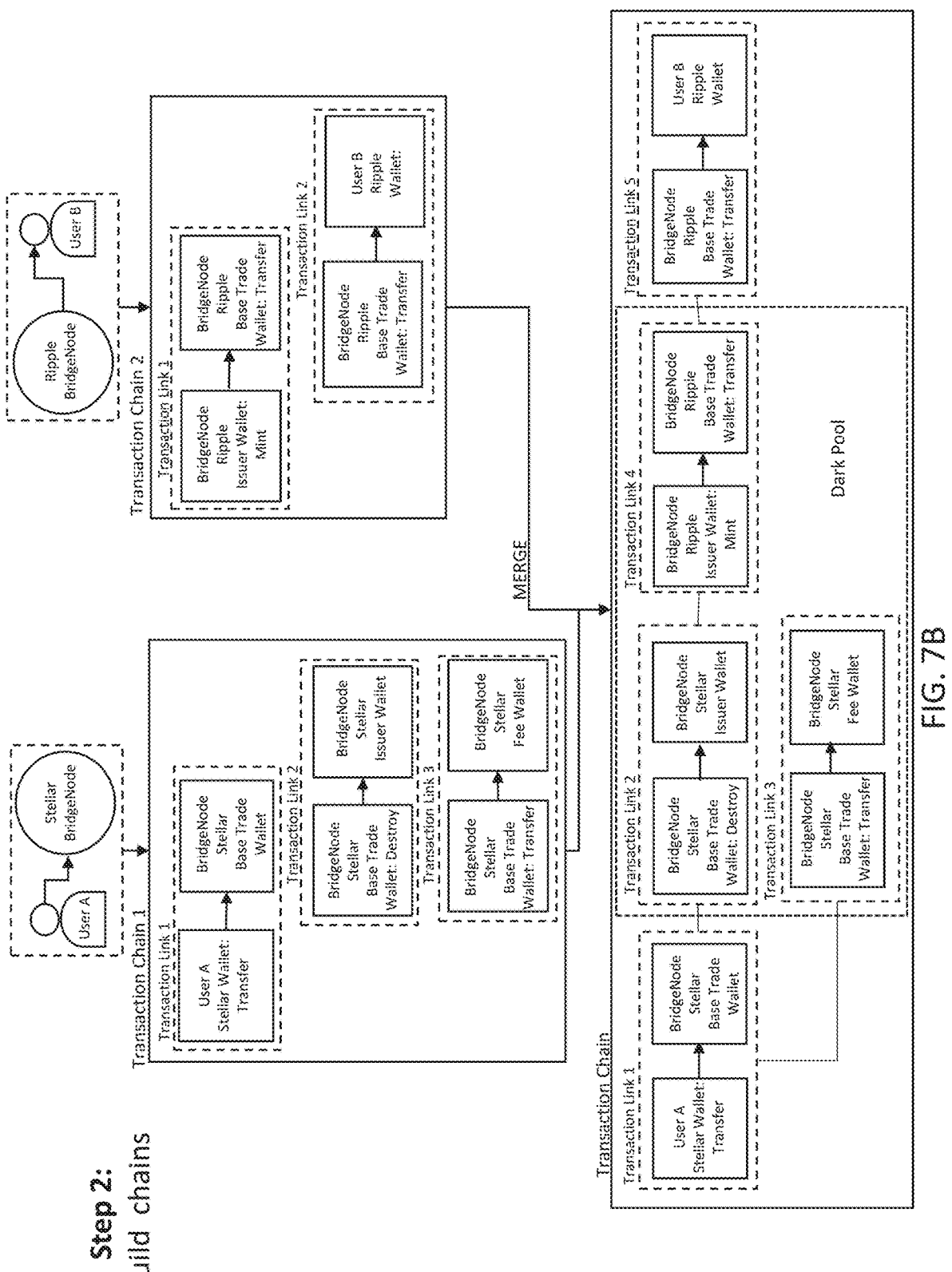
FIG. 7B illustrates the steps of a transaction chain building process according to one embodiment of the present invention.

FIGS. 7A-7C illustrate the steps of a transaction chain building process according to one embodiment of the present invention. In one embodiment, the illustrated process is accomplished by the architecture 2000 of FIG. 2 and modules depicted therein. A route planning service module 2006 in combination with TSB wrappers is used to identify optimal transmission paths across network nodes, given the transaction specified in a transaction data structure. In this example, the specified transaction is "transfer ABC token from User A node on Stellar DLT Systems to User B node on Ripple DLT System". A set of all available options, such as price, and expected delivery time can be specified by the transaction data structure. At Step 1, the route planning service module 2006 evaluates all possible routes and available bridges to execute the transfer by traversing the graph of all nodes and bridges. Possible transaction paths are analyzed by reading bridge metadata for the relevant networks and builds a bridge graph that represents all connections between the source ledger (Steller, in this example) and destination ledger (Ripple, in this example) providers and tokens. In one embodiment, the bridge graph includes all relevant bridge metadata of the bridges for the identified connections.

In one embodiment, the route planning service module 2006 applies a Breadth First Search (BFS) algorithm (a known graph traversal algorithm that traverses a graph layer-wise from a selected node) to find all paths and return a list of BridgeNodeChains (i.e., a list of possible paths for accomplishing the transaction). One of ordinary skill in the art will appreciate that a Breadth First Search (BFS) algorithm is a known graph traversal algorithm that traverses a graph layer-wise from a selected node. It is used herein to traverse and identify possible paths from the node of a source ledger to the node of a destination ledger. In this example, two possible paths are identified: TransactionChain 1 and TransactionChain 2.

At Step 2, as depicted in FIG. 7B, the route planning service module 2006 constructs the ultimate transaction path based on the list and transactional requirements and conditions. In one example, wherein the chain must deliver 1 ABC token to destination wallet and the sum of associated transmission fees equal 0.1 ABC token, the source must transfer 1.1 ABC tokens to cover both the token transfer and the associated fees. The ultimate transaction path is be constructed to consider various preferences and attributes, including but not limited to transaction fees, time for transaction confirmation, and the like.

In one embodiment, the ability to move value from one network or ledger to another involves one or more potential paths and mechanisms. In one embodiment, the ability to move value from one network or ledger to another has no viable path. When a user requests payment delivery, a set of all available options, their price, and expected delivery time are generated in substantially real time. At Step 2 of FIG. 7B, the route planning service module 2004 gathers all possible routes by evaluating all available bridges that provide a path from a source node to a destination node.

When all abstract paths have been calculated, the route planning service module 2006 builds one or more transaction chains based on abstract paths. In one embodiment, chains are built beginning at the destination. In one embodiment, building chains beginning at the destination is the default of the program of the present invention. When starting from destination to source, the route planning service module 2006 begins with destination conditions as the fixed point. In one embodiment, chains are built beginning from the source. When starting with the source node as the fixed parameter, the route planning service module 2006 determines the value the destination node will receive if the transfer begins with 1 ABC token. The route planning service module 2006 starts building transaction links from source and accumulates all fees and exchanges through the path. For example, if all fees equal 0.1 ABC token, the receiver will get 0.9 ABC token in the end. The route planning service module 2006 then builds an abstract path to the real chain based on, for example, the following rules:

validation service validates that the transaction paths are executed. In one embodiment, the transaction validation service validates that the transaction paths are executed by checking whether each link source wallet in a path has sufficient balance to submit the transaction and/or checking for self-referencing chains (i.e., a chain where the same node occurs more than once). Each viable transaction chain will have an estimated delivery time. In one embodiment, each viable transaction chain involves fees and/or exchanges. In one embodiment, the price of a proposed transfer and the delivery time are calculated. In one embodiment, the price of a proposed transfer and the delivery time are displayed to a user device implementing the architecture 2000 of FIG. 2 (which includes the route planning service as described with respect to FIGS. 7A-7C) prior to authorization of a transfer action. In one embodiment, a policy engine verifies regulatory compliance at each transfer node. An example of a policy engine is found in U.S. Published patent application Ser. No. 16/143,058, incorporated herein by reference in its entirety.

During a transfer in the chain of sub-transactions, it is possible that a network failure occurs, or an allowed transfer is cancelled prior to completion. In this case, the use of a rollback is advantageous. A rollback allows the transaction

| | | |
|---|---|---|
| Bridge node -> Bridge node | based on bridge node configuration, the builder may return either zero link or several.<br>If bridge node currencies are different, and bridge node contains issuer wallet, transaction builder adds 2 links: issue token 1 from issuer to base trade, exchange token, destroy token 2 to issuer. | Link 1: Bridge Issuer wallet → Bridge Base Trade wallet (hidden for user)<br>Link 2: Bridge Base Trade wallet → Bridge Issuer wallet (hidden for user) |
| Bridge node -> Destination wallet | based on bridge node configuration, the builder may return either one link or several.<br>The first link is a transfer from Bridge Base trade wallet to destination wallet.<br>If bridge node contains Issuer wallet, transaction chain builder adds a link issue tokens. This link goes as a Dark Pool and hidden for user<br>If bridge node contains fee account, transaction chain builder adds a link with transfer fee from bridge base trade account to the fee account. This link goes as a Dark Pool and hidden for user | Link 1: Bridge Base Trade wallet → Destination wallet<br>Link 2: Bridge Issuer wallet → Bridge Base Trade wallet (hidden for user)<br>Link 3: Bridge Base Trade wallet → Bridge Fee wallet (hidden for user) |
| Source wallet -> Bridge node | based on Bridge node configuration, the builder may return either one link or several.<br>The first link is a transfer from user to Bridge Base trade wallet.<br>If Bridge node contains Issuer wallet, transaction chain builder adds a link to the chain to destroy tokens. This link goes as a Dark Pool and hidden for user<br>If Bridge node contains Fee account, transaction chain builder adds a link with transfer fee from base trade account to the fee account. This link goes as a Dark Pool and hidden for user | Link 1: Source wallet → Bridge Base Trade wallet<br>Link 2: Bridge Base Trade wallet → Bridge Issuer wallet (hidden for user)<br>Link 3: Bridge Base Trade wallet → Bridge Fee wallet (hidden for user) |
| Source wallet -> Destination wallet | This is a case (empty bridge node chain) when the transfer goes within one ledger, so this transfer doesn't require bridges. Adds single link in a chain. | Source wallet → Destination wallet |

As used herein, "builder" refers to the route planning service module 2006 or a subcomponent thereof responsible for construction of transaction paths from one node to another node. Upon construction of the transaction chains, the route planning service module 2006 then selects all path chains and merges them into the single final transaction chain by removing duplicate links. As shown in FIG. 7B, the transaction chain includes TransactionLink 1, Transaction-Link 2, TransactionLink 3, TransactionLink 4, and Trans-actionLink 5. At Step 3 as depicted in FIG. 7C, a smart contract (TransactionValidationService) of a transaction to be saved at a point (i.e., the start point or an intermediate save point). In the case of network failure or cancellation, the transaction is saved at the save point, even if data is lost from the save point to the location of the data at the time of the failure or cancellation. In cases where intermediate fees are charged or exchanges are performed between the save point and the location of the data at the time of the failure or cancellation, it may not be possible to reverse the transaction without a loss in value. For this reason, a user device accessing the architecture 2000 of FIG. 2 is operable to execute a command to proceed to completion, restart the transfer from the source, rollback the transfer to a save point in the chain, or abandon the transaction by claiming the value in its current state.

Figure 8:
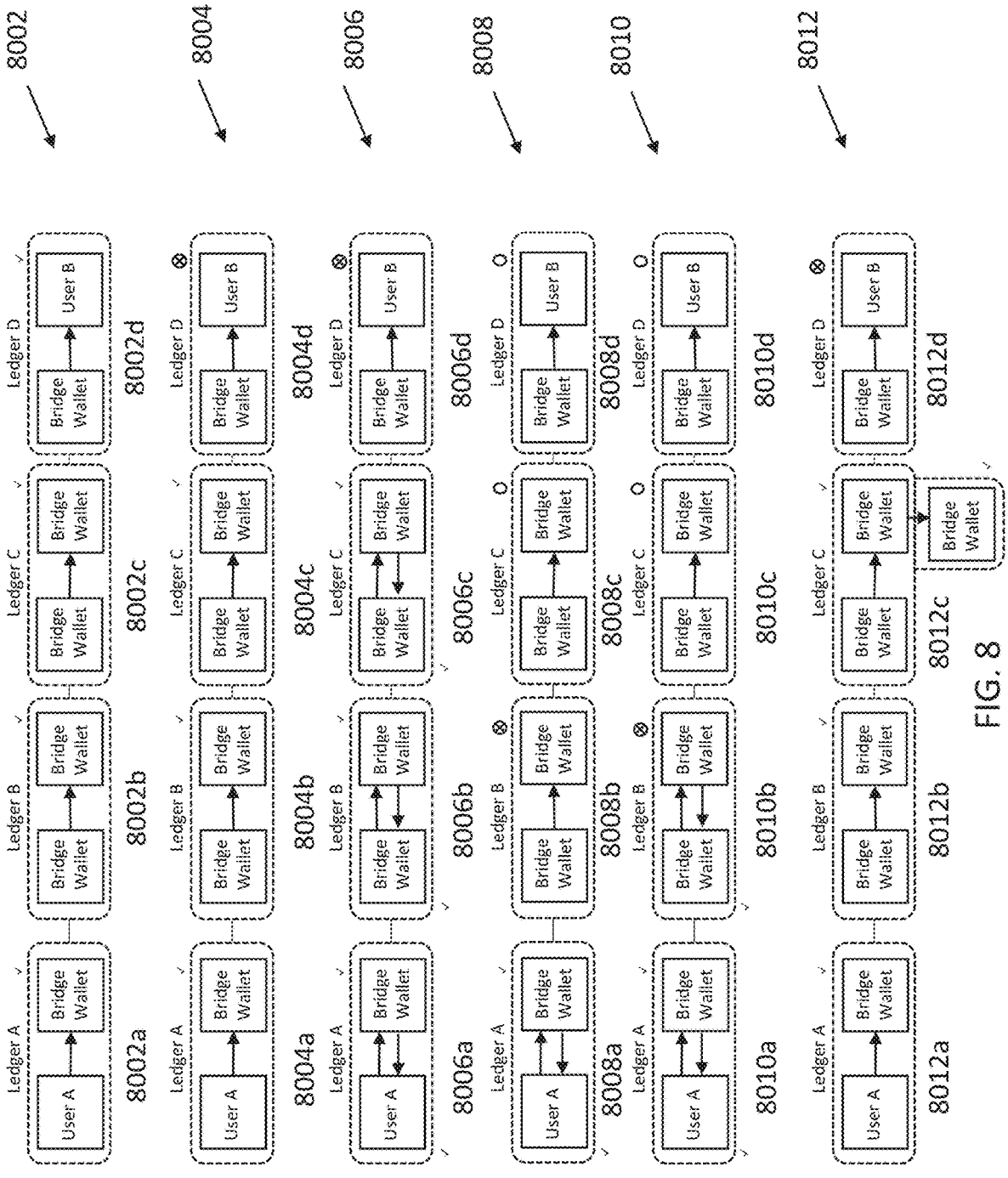
FIG. 8 illustrates a schematic diagram of chained transfers according to one embodiment of the present invention.

FIG. 8 is a schematic diagram of several transaction chains and sub-transactions therein according to one embodiment of the present invention. Transaction chain 8002 illustrates a chained transaction including sub-transactions 8002*a*, 8002*b*, 8002*c*, and 8002*d*, in a desired transfer transaction. Transaction chain 8004 includes sub-transactions 8004*a*, 8004*b*, 8004*c*, and 8004*d*. Transaction chain 8006 includes sub-transactions 8006*a*, 8006*b*, 8006*c*, and 8006*d*. Transaction chain 8008 includes sub-transactions 8008*a*, 8008*b*, 8008*c*, and 8008*d*. Transaction chain 8010 includes sub-transactions 8010*a*, 8010*b*, 8010*c*, and 8010*d*. Transaction chain 8012 includes sub-transactions 8012*a*, 8012*b*, 8012*c*, and 8012*d*.

All four sub-transactions in transaction chain 8002 are successful, resulting in a transfer between User A and User B. However, cancellation or failure of any one of the subs-transactions of the transaction chain results in an unsuccessful transfer between User A and User B, as in the case of transaction chain 8004, wherein sub-transaction 8004*d* has failed. In one embodiment, the system of the present invention automatically conducts a restart to deliver the value in the event of a transaction failure or cancellation. In one embodiment, the chain automatically initiates a rollback transaction in the event of a transaction failure or cancellation. In one embodiment, the system halts and await user input in the event of a transaction failure or cancellation. Determination of automatic delivery, awaiting user input, or execution of a rollback depends at least in part on the configuration of the chain. Rollback transactions are only possible if each bridge used in a route are two-way bridges capable of supporting transactions in both directions. In one embodiment, all bridges formed by the route planning service are bilateral bridges.

Figure 9A:
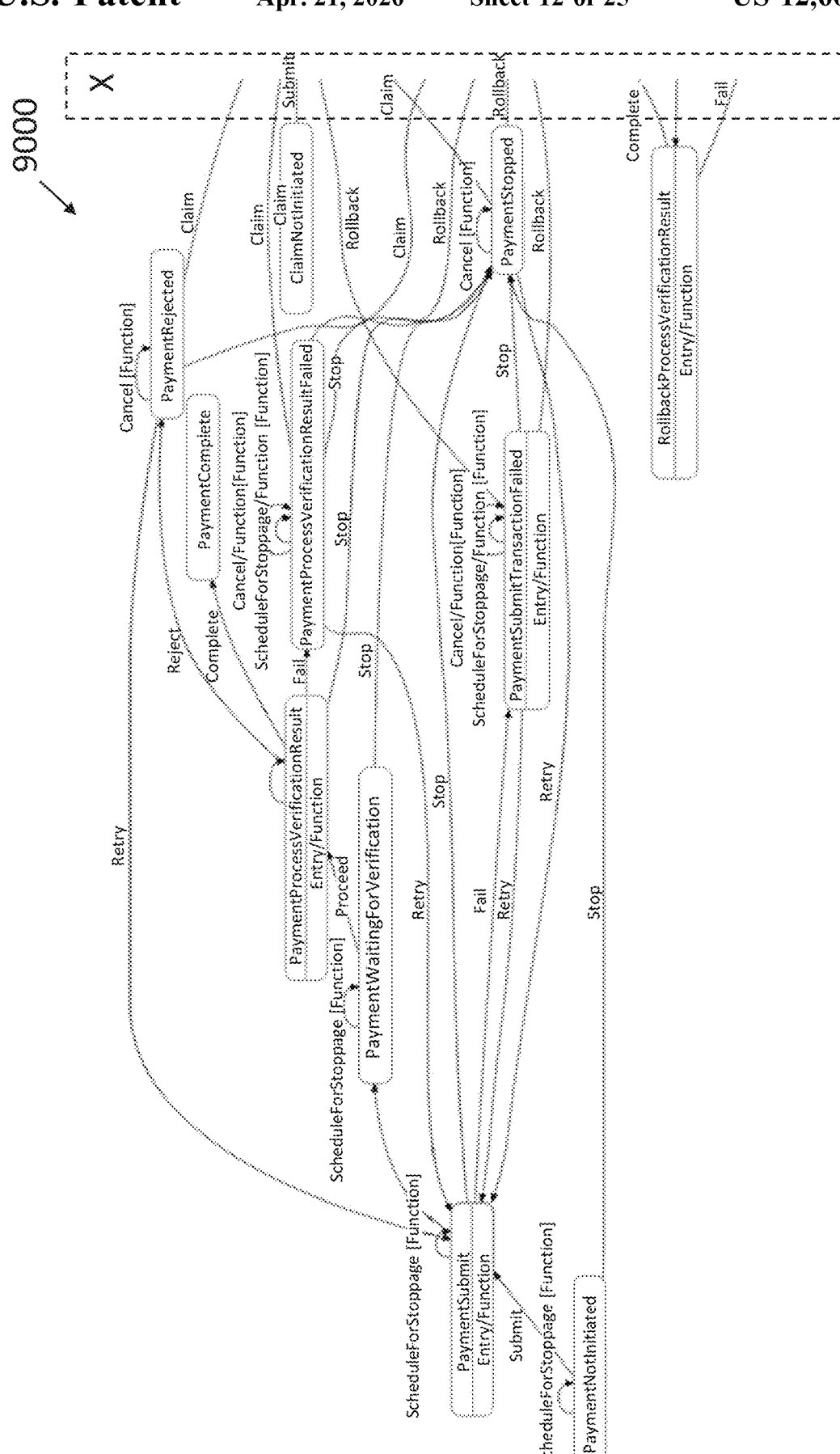
FIG. 9A illustrates an example of a state diagram for chained transfers according to one embodiment of the present invention.

Transaction chain 8006 illustrates a rollback transaction upon failure of sub-transaction 8006*d*. As a result of the failure, sub-transactions 8006*a*, 8006*b*, and 8006*c* are reversed by accomplishing a reverse sub-transaction for each of these sub-transactions. As previously mentioned, rollback transactions are only possible through the use of bilateral bridges. Such bilateral bridges allow the transaction to occur in the reverse direct in addition to the forward direct, thus allowing the reversal of sub-transactions 8006*a*, 8006*b*, and 8006*c*. Transaction chain 8008 and transaction chain 8010 depict chains wherein a transaction is cancelled while the transaction is taking place (i.e., "en route"). In transaction chain 8008, sub-transaction 8008*b* has been cancelled prior to execution and thus sub-transaction 8008*a* has been reversed. Alternatively, at 8010, sub-transaction 8010*b* has been cancelled after execution of the sub-transaction, and sub-transactions 8010*a* and 8010*b* are both reversed. Alternatively, if a user has the means to receive value via an intermediate ledger, the value may be claimed directly from a halted transaction as shown at 8012. In one embodiment, the wallet associated with the transaction initiator reclaims the value directly from a halted transaction. In one embodiment, the wallet associated with the transaction recipient claims the value directly from a halted transaction. All sub-transactions, including reversal transactions, are recorded on independent transaction ledger module 2012. FIGS. 9A and B, in combination, illustrate an example of state diagram 9000 for chained transfers.

Each viable route will have an estimated delivery time. In one embodiment, each viable route involves fees and/or exchanges. The price of a proposed transfer is calculated and transmitted to a device associated with the source of the transfer to enable transfer initiation action. The chained transfer handler module 2004 orchestrates cross-ledger payments by providing ledger interoperability, route planning, price and fee discovery, transaction management, transaction state, and logging. Additionally, the chained transfer handler module 2004 ensures high reliability end-to-end transfer across networks by: (1) publishing the proposed end-to-end transaction and all sub-transactions to a ledger (such as the independent transaction ledger 2012), with zero knowledge proofs for traceability and reliability; (2) sequencing transfers using an interoperability framework that leverages transfer capabilities in each network the transaction traverses; and (3) ensuring each transaction is executed successfully to deliver value or rolled back to preserve value. The chained transfer handler module 2004 is designed to provide and/or manage Atomicity, Consistency, Isolation, and Durability (ACID) properties. One of ordinary skill in the art will appreciate that ACID properties used as guiding principles in computer software ensure reliability of transactions.

Isolation, the third ACID property, is provided via the common IPaymentService plugin which isolates each individual ledger transaction as a component in a larger flow. This plugin framework provides a common model for processing transactions across dissimilar ledgers. Transaction management provides durability, the fourth ACID property, of chained payments. The chained transfer handler module 2004 manages each step of a complex payment sequence to ensure it is executed, even in the event of a power outage or payment network failure. In one embodiment, the chained transfer handler module handles transactions in parallel. In one embodiment, the chained transfer handler module handles transactions in series. Additionally, the chained transfer handler module executes payment and bridging transactions.

In one embodiment, the present invention provides plugins for atomicity. However, due to irreversibility of certain transactions (because of fees), long delivery timeframes and frequently changing market conditions that characterize certain chained payments, atomicity, the first ACID quality, cannot be guaranteed. To provide for slippage (i.e., changes in exchange rates or fees from the initiation of a transaction until its completion), the chained transfer handler module freezes a transaction in the event of a significant change to receive authorization from a user device to allow the transaction to continue. In one embodiment, the user device communicates an order to rollback the transaction. In one embodiment, the user device communicates an order to claim the value in its existing form. In one embodiment, the user device communicates an order to restart the transaction to proceed to completion. In one embodiment, the user device receives authorization accepting a set of changed terms associated with the transaction.

Since chained transactions may involve more than one ledger, none of the individual ledgers involved will contain end-to-end traceability of the transaction. To ensure consistency, the second ACID property, an overarching ledger is maintained by the independent transaction ledger module 2012 to track the overall transaction as well as links to each of the sub-transactions. In one embodiment, bridge configuration determined if a chained transfer occurs in-series or in parallel. Parallel payments are faster in comparison to in-series payments. However, parallel payments may require rollback locks and hedging due to risks in time latency of inbound deliveries. Series deliveries are slower in comparison to parallel payments, and require significant use of slippage management and locking of outbound funds to support delays in inbound transactions.

In one embodiment, the verification of the completion of the initiating transaction is the inbound and the initiation of the chained transaction is the outbound variable. When operating in series, bridges await verification of the completion of the initiating transaction (i.e., emission of the event IPayment.Complete) prior to initiating the chained transaction. When operating in parallel, outbound transactions initiate immediately after verification of initiation (i.e., emission of the event IPayment.Initiated) of an inbound transaction. For parallel operations, there is a delivery risk associated with the possibility that the inbound and all intermediate transactions are cancelled or rolled back. In one embodiment, a bridge operator only allows parallel operations if the inbound network does not allow cancellation or rollback. In one embodiment, the bridge operator requires collateral or charges a large fee to compensate for the delivery risk. For series operations, the initiator may experience slippage risk (i.e., a change in price for delivery from the initial terms presented on the initiation of the transaction). For example, downstream networks fees or exchange rates may have changed from the time the transaction is initiated. In one embodiment, the bridge operator provides a price guarantee, ensure that no slippage occurs. In one embodiment, the bridge operator builds in a fee to compensate for market changes or hedging strategies.

In addition to providing a path for transactions across dissimilar network, bridges have various logical functions. One example of a bridging function is a deposit function. It involves a peg (i.e., a fixed ratio) linking deposited funds to an equivalent amount of tokens which are delivered to the internal account of the user. In one embodiment, the tokens which are delivered to the internal account of the user are hypothecated assets. In one embodiment, the tokens which are delivered to the internal account of the user are IOUs (i.e., digital versions of a value amount). In one embodiment, the IOUs are transferred to other users or traded for assets via centralized or decentralized exchanges. These tokens are redeemed for the value in the counterparty account by using the opposite flow (i.e., a withdrawal).

In one embodiment, the present invention includes a function to verify the counterparty account balances exactly match the total number of internal tokens in circulation. In one embodiment, both balances (the balance of the counterparty account and the total number of internal tokens in circulation) are published to users. One of ordinary skill in the art will appreciate that some networks support token creation and destruction, whereas others require movement in and out circulation via cold wallets. Thus, the present invention is advantageously operable to facilitate movement of value between systems by creating tokens, destroying tokens, moving tokens into circulation, and moving tokens out of circulation. This functionality is further depicted by FIG. 20.

Figure 10:
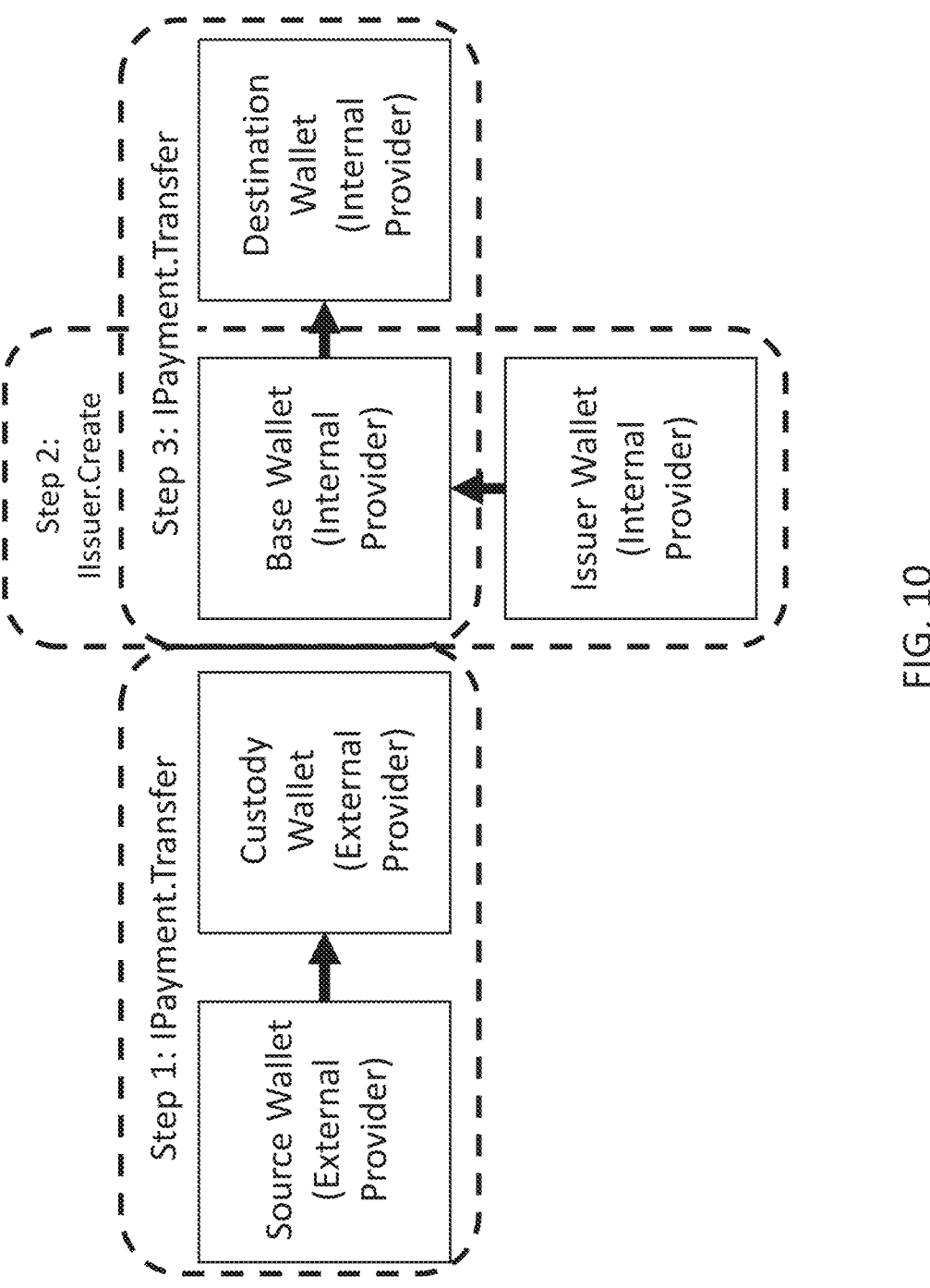
FIG. 10 illustrates an example of the operations for a bridge accomplishing a hypothecation transfer according to one embodiment of the present invention.

FIG. 10 schematically illustrates an example of the operations for a bridge accomplishing a hypothecation transfer according to one embodiment of the present invention. At Step 1, value is sent from the source wallet to the custody wallet using an external provider (e.g., OOB, Cascade, PayPal, Ethereum). This is the inbound of the bridge, initiated by execution of the IPayment.Transfer function. At Step 2, an equivalent number of IOUs (i.e., a digital version of the deposited amount) are issued from the issuer wallet of an internal provider using an IIssuer.Create function. The IOUs are sent to the base wallet of an internal provider. At Step 3, the base wallet of the internal provider (i.e., the outbound of the bridge) enacts IPayment.Transfer to send value to the destination wallet of an internal provider. This pattern requires the chained transfer handler module 2004 to have the means to detect and attribute transactions on the source ledger and execute transactions from the issuer wallet and base wallet. Access to this authority can be granted at Bridge setup. Note that it is possible to skip Step 2 and send directly from the issuer wallet to the destination wallet. In one embodiment, access to this authority is granted upon creation of the bridge. In one embodiment, the present invention facilitates direct transfer of value from the issuer wallet to the destination wallet.

Figure 11:
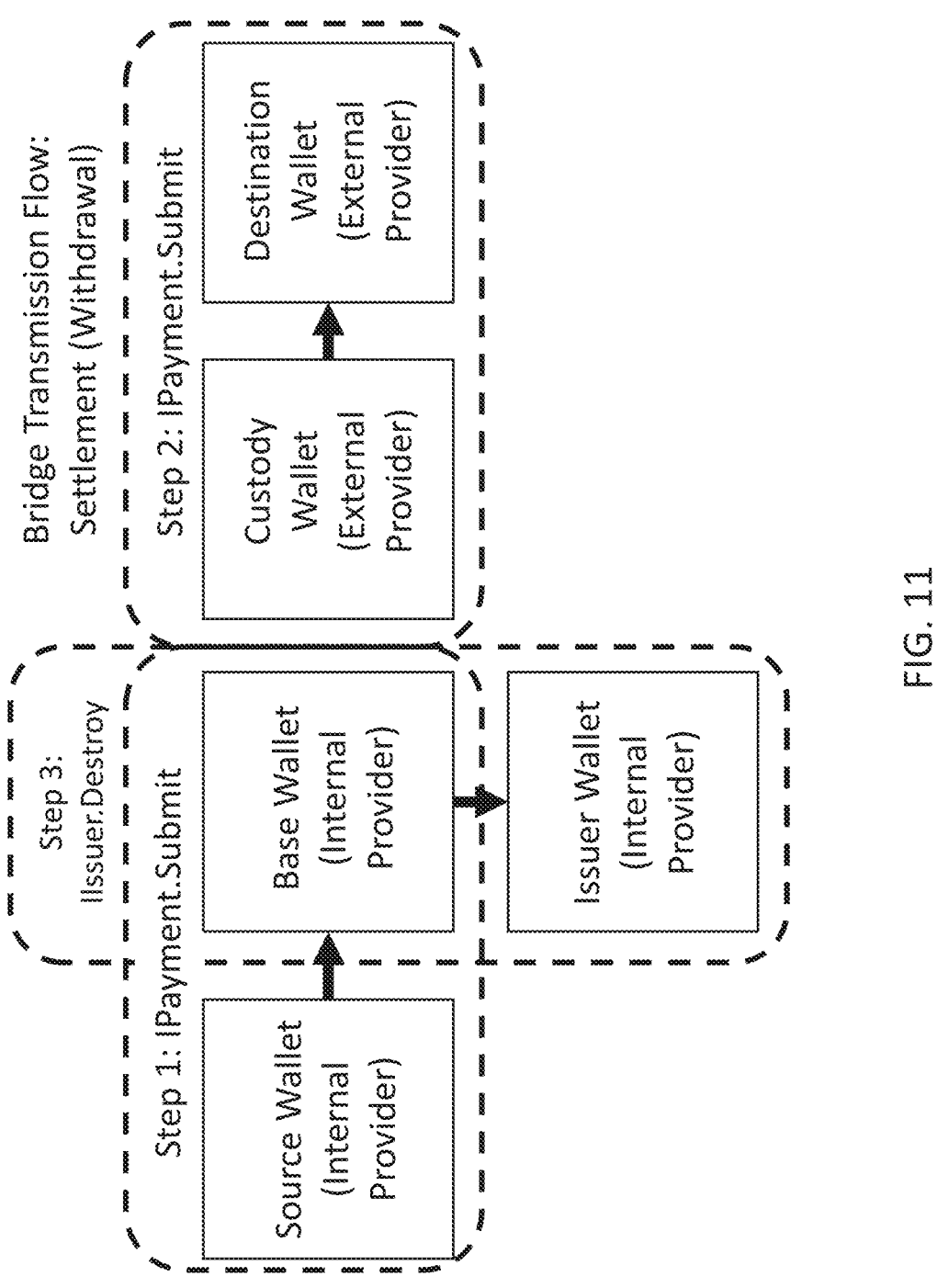
FIG. 11 illustrates an example of the operations for a bridge accomplishing a settlement transfer according to one embodiment of the present invention.

FIG. 11 is a schematic diagram of a settlement transfer according to one embodiment of the present invention. Settlement is the reverse of a hypothecation transfer. When the user desires to remove value from a ledger and return the value to its original form, a transfer is initiated that traverses a settlement bridge. At Step 1, value is sent from the source wallet to the base account using an external provider (e.g., OOB, Cascade, PayPal). This is the inbound received by the bridge. At Step 2, the custody wallet (i.e., the bridge outbound wallet) enacts IGateway Payment to send value to the destination wallet. At Step 3, in response to completion of the previous step, an equivalent number of IOUs (i.e., the digital version of the settlement amount) are burned and/or escrowed from the base wallet. This pattern requires the chained transfer handler module 2004 to have the means to detect and attribute transactions on the source ledger, execute transactions from the custody wallet, and burn tokens from the base wallet. In one embodiment, access to this authority is granted as part of the bridge setup. In one embodiment, the present invention omits Step 3 and value is received directly by the issuer wallet from the source wallet. In one embodiment, value is only received directly by the issuer wallet from the source wallet if the authority exists to reverse the burn if the transaction fails.

In one embodiment, the cross ledger transmutation is used for multi-ledger issuances. For example, cross ledger transmutation is used when the official record of ownership is separate from the ledgers being used for transfer, or when the official record is the sum of ownership records on affected ledgers. With a summing mechanism utilized by the transaction service bus that exists above specific ledgers, transmutation permits tokens to be issued on multiple ledgers and/or provides a means by which tokens issued on one ledger can "flow" to another. As tokens move from ledger to ledger, the total number of tokens in circulation remains constant while the ownership record moves from ledger to ledger. This type of bridge couples a withdrawal function with a deposit function. By removing tokens from one ledger at the same time tokens are introduced into circulation in another, the total number of tokens remains constant. Funds exiting a ledger are sent to the base wallet of the source ledger. In one embodiment, this transfer is an escrow transaction wherein a hold is placed on the tokens without moving them. An equivalent number of tokens are issued into circulation on the destination ledger from the issuer (i.e., the issuer wallet, issuer account, or issuer smart contract) or the cold wallet to the outbound wallet on Provider B for delivery to the destination. On successful delivery, the IIssuer.Destroy function called on the source ledger removing the tokens from circulation.

The out-of-band transfer module 2104 provides out-of-band (OOB) processing in cases where value transfer path legs cannot be fully automated within the system. The present invention advantageously provides interfaces to enable third parties to signal and provide data to the computer platform of the present invention to facilitate processing execution. For example, in the case in which bridges only support a one-way flow of funds across networks, a fund imbalance may accumulate. Out-of-band transactions are advantageous in restoring the balance of the funds. Managing out-of-band time lags and proper prepositioning of funds in the outbound account is a logistics problem with firmly established mathematical models for control. The price discovery is facilitated through the operation of the price and liquidity module 2010 of FIG. 2. In one embodiment, this module adjusts price through market functions to maintain a balance between inbound and outbound account levels. In one embodiment, the external markets are used to replenish liquidity. Darkpool owners (i.e., those who contribute assets to the dark pool) receive income from fees linked to pool usage. The price and liquidity module 2010 is designed to manage liquidity between ecosystems, currencies, and asset exchanges. The price and liquidity module 2010 applies market making algorithms to manage liquidity. In one embodiment, the price and liquidity module 2010 manages the cost of transfer based on the balance of resources on both sides of the darkpool. The price and liquidity module 2010 drives up the cost of sustained imbalance in the flow of capital. A sustained imbalance in resource flow between A and B will result in an increase in price to move from A to B and decrease in price to move from B to A. The bigger the mismatch, the greater the revenue of the model. In one embodiment, the present invention enables users to invest in mismatch to bring liquidity where needed.

In one embodiment, liquidity darkpools are used to facilitate transfers between or within ecosystems when currency exchanges are involved. In one embodiment, the chained flow is repeated across many providers including available currency exchanges to provide a path for any flow of value and use external liquidity. In one embodiment, currency exchange occurs via price and liquidity module 2010. The process is operable to be repeated and use counterparty exchange accounts to maximize liquidity.

As used herein, the terms "liquidity pool" and "lending pool" refer, in one embodiment, to a liquidity pool and, in one embodiment, to a liquidity dark pool. One of ordinary skill in the art will appreciate that a liquidity pool is a digital compilation of asset tokens locked in a smart contract. Liquidity pools are designed to incentivize users of different distributed ledger networks to contribute assets to a conversion mechanism for trading between the networks. Wallets associated with assets contributed to the liquidity pool receive a fraction of fees and incentives. Similarly, a liquidity darkpool is a liquidity pool wherein transactions and wallet addresses are not publicly viewable on the network. In one embodiment, liquidity dark pool transactions are transacted with prepositioned value. As used herein, the term "liquidity provider" refers to a party owning assets that have been contributed to the liquidity pool. In one embodiment, liquidity providers receive a fee proportional to the amount of the contributed asset in the pool.

Figure 12:
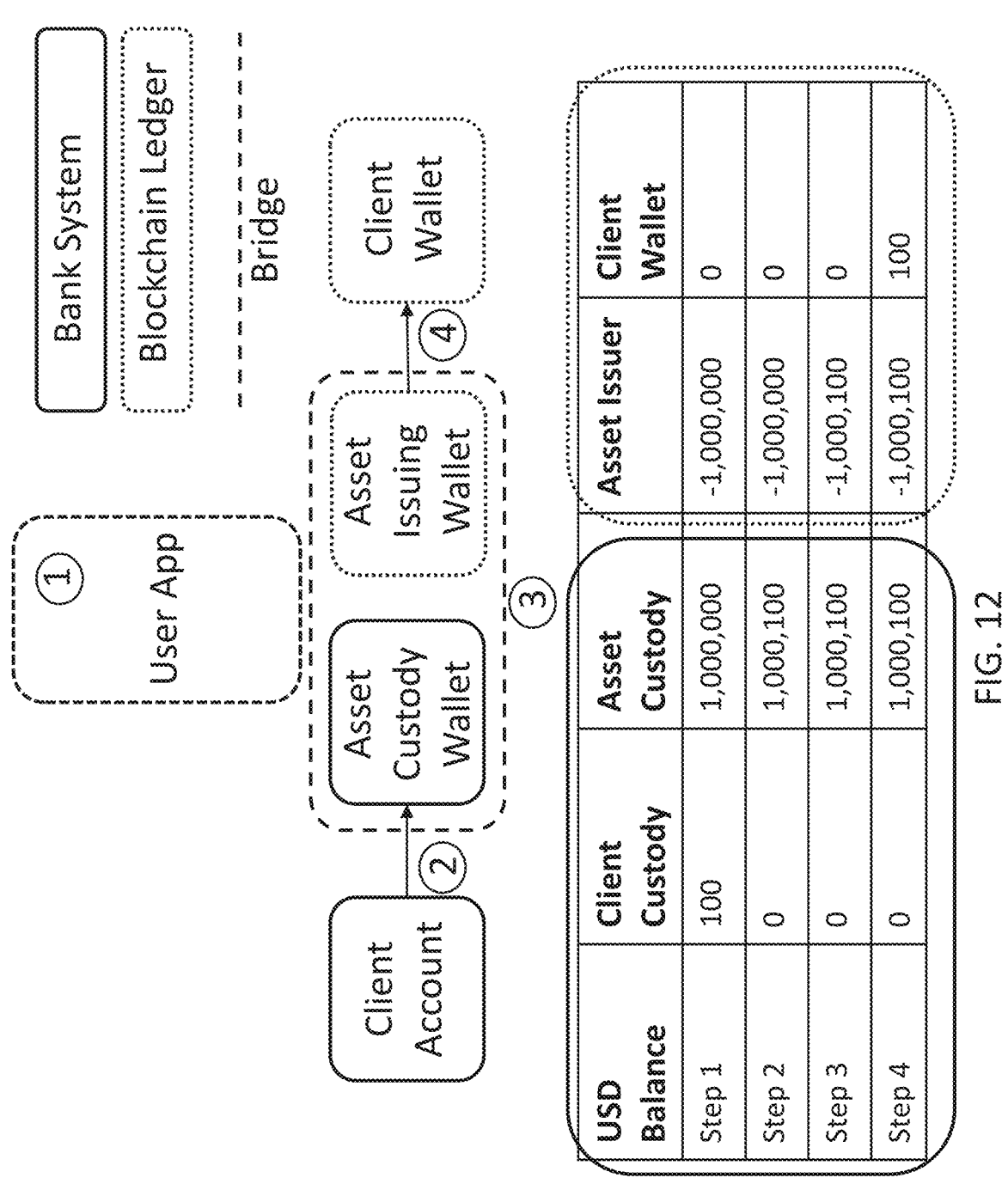
FIG. 12 illustrates balance sheet implications of a deposit bridging transaction creating the template for an anchoring transaction according to one embodiment of the present invention.

FIG. 12 is a schematic illustration of balance sheet implications of a deposit (also known as hypothecation) bridging transaction creating the template for an anchoring transaction according to one embodiment of the present invention. At step 1, the client (i.e., the client user application, client wallet, or client interface of a user device) with a United States Dollar (USD) custody account containing 100 USD in the banking system initiates a hypothecation (also referred to herein as a "deposit") to convert value in the banking network to value in tokens on the blockchain ledger.

At step 2, the 100 USD is transferred from the custody account of the client to the custody account of the asset. The custody account of the asset is the omnibus account holding deposited assets that underpin the value represented on the connected network. At step 3, corresponding USD tokens are minted and added to the issuing wallet of the asset. In one embodiment, corresponding USD tokens are only minted upon confirmation of the receipt of the 100 USD to the custody account of the asset. At step 4, the minted USD tokens are transferred from the issuing wallet of the asset to the account wallet of the client. In one embodiment, the hypothecation is entirely automated and carried out by a chain of smart contracts automatically executing the transfer of value from a custody account of a client to a custody wallet of the client.

The hypothecation transaction, along with its inverse, the settlement transaction (also referred to herein as the withdrawal transaction), are depicted as "anchor" transactions as a condensed notation for cross network transactions in FIGS. 15-18 with the corresponding conversion to and from networks shown as a gradient between the gray levels of the traversed networks.

Figure 13:
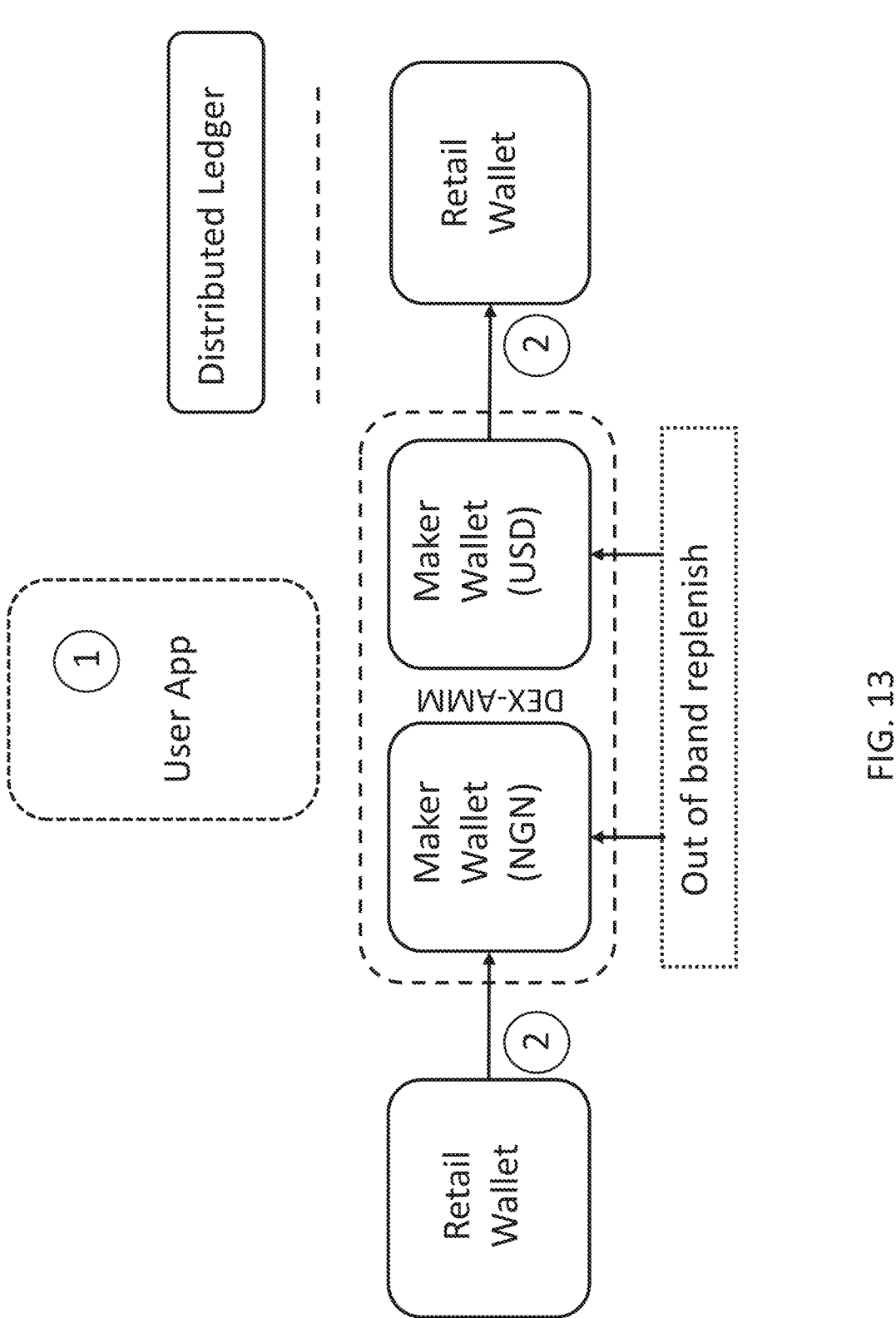
FIG. 13 illustrates a description of a conversion transaction bridging value networks and including an out-of-band mechanism to replenish the bridging nodes according to one embodiment of the present invention.

FIG. 13 is a schematic illustration of an out-of-band replenish structure involving an exchange bridge according to one embodiment of the present invention. The transaction bridging value network replenishes the bridging nodes to maintain the necessary inventory to operate the bridge. In one embodiment, a liquidity darkpool as disclosed herein is used to link liquidity in two networks. At step 1, the client (i.e., the client user application, client wallet, or client interface of a user device) with a retail wallet initiates a transaction to convert value in the distributed ledger from Nigerian Naira (NGN) to value in USD on the distributed ledger. At step 2, the value is transferred from the retail wallet to the maker wallet of an anchor bridge. A decentralized exchange automated market maker (DEX-AMM) converts the value of the NGN tokens to an equivalent value of USD tokens. The USD tokens are then transferred from the maker wallet to the retail wallet of the client.

In one embodiment, the distributed ledger network is linked to a generic out-of-band replenish network. In one embodiment, the linked network includes an implementation that is used to convert the value from the source network to the destination network to replenish the inventory used to support the bridged transaction. In one embodiment, this is accomplished through the use of a centralized exchange bridge.

FIG. 14 illustrates a reference process for a network transaction involving two or more linked paths wherein one path, the out-of-band replenish path supports the liquidity (efficient traversal mechanism) of the principal bridging path. As described previously, one or more conversion transactions occur leveraging the bridging nodes on the source and destination networks, the bridging nodes enabling the principal bridging path in step 1402. The source and destination nodes in the principal bridging path are connected via one or more out-of-band paths, an out-of-band path being a connection between networks separate from the bridging path, the out-of-band path consisting of one or more bridging paths independent of the principal bridging path, the out-of-band path providing the means to increase the throughput, efficiency, and/or speed of the principal bridging path. The source node on the principal bridging path initiates a transaction to replenish the inventory of the destination node in the principal bridging path in step 1404. At step 1406, the replenish transaction is routed via one or more bridges to alternative liquidity sources. In one embodiment, the source node on the principal bridging path automatically initiates a transaction using the alternative path routed via the one or more bridges based on a threshold amount of assets, wherein accumulation of assets due to a large conversion or an aggregation of many smaller transactions exceeds the threshold and thereby initiates the use of the alternate path. The assets from the source bridging node are used to exchange for assets that are deliverable to the destination bridging node in step 1408. To traverse the alternative network to leverage the alternative source of liquidity, the out-of-band path traverses one or more network bridges. The assets are then delivered to the destination bridging node in the principal path to restore path liquidity in step 1410.

Figure 15:
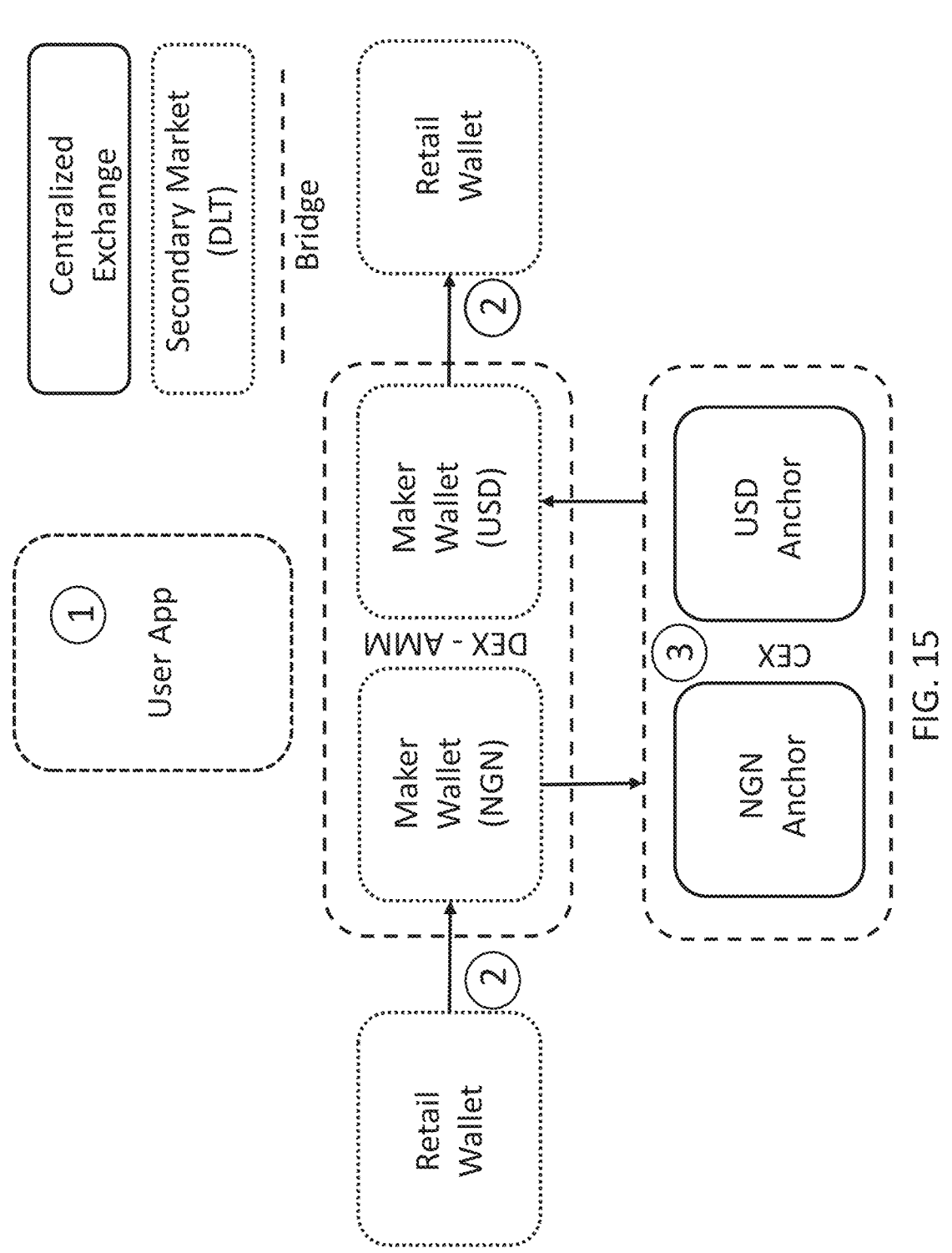
FIG. 15 illustrates a basic implementation of an out-of-band replenish structure involving anchor bridges and an exchange bridge according to one embodiment of the present invention.

FIG. 15 is a schematic diagram of a basic implementation of an out-of-band replenish structure involving anchor bridges and an exchange bridge according to one embodiment of the present invention. Cross network transactions are combined with bridging nodes on the source and destination networks that are connected via one or more out-of-band paths. An "out-of-band path" is a connection between networks separate from the bridging path. In one embodiment, the out-of-band path includes one or more bridging steps. In one embodiment, the inventory needed to sustain the primary bridging network is sustained using automated methods, such as a smart contract or other programmed business logic effecting a liquidity model. In one embodiment, these methods are configured in the bridge data structure by including the bridge path in the replenish instructions of the bridge configuration.

A retail client desires to convert tokens from NGN tokens to USD tokens on the distributed ledger network. This is accomplished by crossing a liquidity darkpool through the use of an exchange bridge. At step 1, the client (i.e., the client user application, client wallet, or client interface of a user device) with a retail wallet initiates a transaction to convert value in Nigerian Naira (NGN) to value in USD using a secondary market. At step 2, the secondary market transaction executes via the bridge as described herein. In this step, the NGN tokens are transferred from the client wallet to the maker wallet, resulting in an accumulation of NGN of the maker wallet. A DEX-AM:NI converts the value of the NGN tokens gained into terms of USD tokens and transfers the USD tokens from the maker wallet to the client wallet, resulting in a depletion of the bridge's USD inventory. In one embodiment, the transfer of the USD tokens from the maker wallet to the client retail wallet occurs simultaneously (i.e., in real-time or near real-time) with the accumulation of NGN tokens in the maker wallet. In one embodiment, the NGN tokens are accumulated in the maker wallet and the USD tokens are subsequently transferred from the maker wallet to the client retail wallet.

After accumulation of NGN tokens (i.e., aggregation of one or more NGN conversions), the bridge operator operating the maker wallet executes an out-of-band replenish transaction at step 3. In one embodiment, the replenishment transaction is initiated manually. In one embodiment, the replenishment transaction is initiated automatically. In one embodiment, automatic initiation and/or manual initiation is determined based on an inventory threshold or another replenishment/liquidity model as disclosed herein. For example, a replenish threshold is based on falling below a predetermined ratio of source and destination value.

The value of the accumulated NGN tokens are then transferred to a centralized exchange (CEX) network. At step 3, some or all of the NGN tokens are deposited on the CEX and converted to USD tokens. As the first step in the replenish transaction, the bridge operator deposits the NGN tokens via an anchor bridge to the centralized exchange using, for example, the process of FIG. 10. Upon conversion of the NGN tokens to USD tokens via the centralized exchange network, the tokens are withdrawn via an anchor transaction to the maker wallet for USD tokens using, for example, the withdrawal process of FIG. 11. One of ordinary skill in the art will appreciate that the use of a centralized exchange network allows for direct conversion of a first asset type to a second asset type by purchasing and/or trading an amount of the second asset type in terms of the first asset type.

To sustain scalable secondary market (i.e., peer-to-peer) operations efficiently and with minimal capital costs, it is beneficial to link and aggregate these transactions with larger scale primary market (i.e., business-to-business) transactions. This is accomplished, in one embodiment, by automating the out-of-band replenish model with one or more bridge transactions to maintain the inventory required to operate the secondary market. For example, if an imbalance occurs in the inventory of the market making pool of the secondary market due to significant demand for the conversion of one asset to another, the asset in excess is converted to its underlying asset using the withdrawal bridge using the method disclosed herein. The resulting asset is then converted via scalable and deep institutional markets of a primary market (business-to-business) transaction to the asset that is in deficit using a conversion bridge as disclosed herein. The resulting asset is then converted to the desired bridge pool asset using the hypothecation bridge disclosed herein. By linking markets (in this case primary and secondary markets) in this way, the liquidity of secondary markets is maintained without the need to maintain substantial and costly bridge inventory even if conversions are imbalanced.

The present invention is a computer platform wherein one or more market or value conversion mechanisms are linked using one or more bridging transactions. Inventory from one bridge is linked to a conversion mechanism including one or more bridge transactions for converting the inventory from a value used in a primary market to a value used on a secondary market. In one embodiment, the inventory of asset tokens is converted from a first asset type to a second asset type. This advantageously enables rapid conversion of assets for transactions in the secondary market where users seek convenient, near-real time transactions. The rapid conversion of assets in a secondary market is sustained according to the present invention by volumetrically larger and temporally slower primary market transactions that generate revenue as a result of a per-transaction based fee.

Figure 16:
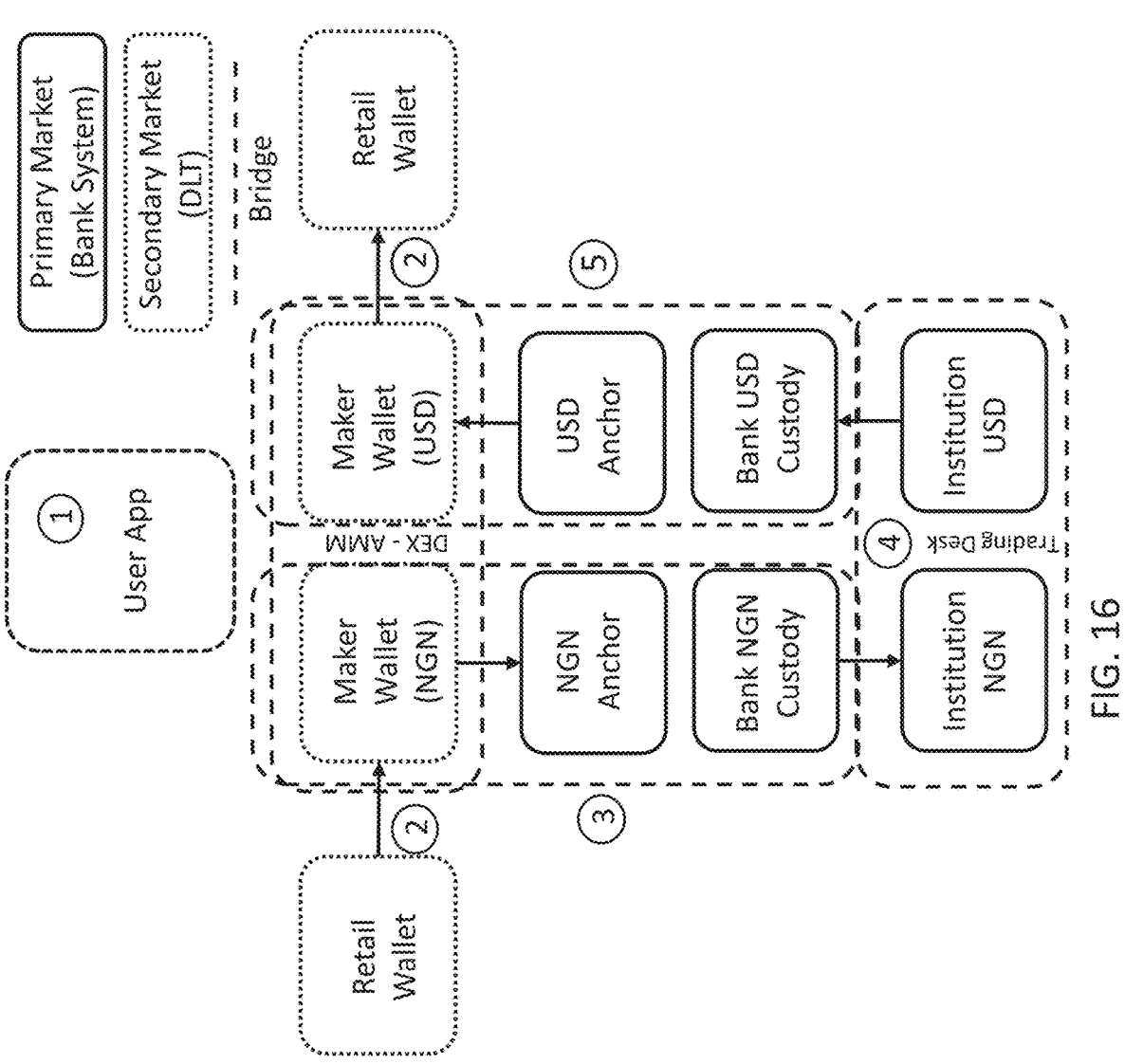
FIG. 16 illustrates a sequence to link primary and secondary markets utilizing a chain of bridged transactions according to one embodiment of the present invention.

FIG. 16 illustrates a sequence to link primary and secondary markets utilizing a chain of bridged transactions according to one embodiment of the present invention. At step 1, the client (i.e., the client user application, client wallet, or client interface of a user device) with a retail wallet issues a sell market order to convert value in Nigerian Naira (NGN) to value in USD via a secondary market. At step 2, the secondary market transaction executes via the bridge as described herein. The NGN interest is transferred from the wallet of the retail client to the wallet of the maker, resulting in an accumulation of NGN in the exchange bridge. A DEX-AMM converts the value of the NGN tokens gained into terms of USD tokens and transfers the USD tokens from the maker wallet to the client wallet, resulting in a depletion of the bridge's USD inventory. In one embodiment, the transfer of the USD tokens from the maker wallet to the client retail wallet occurs simultaneously (i.e., in real-time or near real-time) with the accumulation of NGN tokens in the maker wallet. In one embodiment, the NGN tokens are accumulated in the maker wallet and the USD tokens are subsequently transferred from the maker wallet to the client retail wallet.

After accumulation of NGN tokens (i.e., aggregation of one or more NGN conversions), the bridge operator operating the maker wallet executes an out-of-band replenish transaction. In one embodiment, the replenishment transaction is initiated manually. In one embodiment, the replenishment transaction is initiated automatically. In one embodiment, automatic initiation and/or manual initiation is determined based on an inventory threshold or another replenishment/liquidity model as disclosed herein. For example, a replenish threshold is based on falling below a predetermined ratio of source and destination value.

This transaction is conducted to replenish the USD token inventory by converting the value of the accumulated NGN tokens into a value of USD tokens. At step 3, the bridge operator initiates the replenish transaction is initiated and the value of the NGN tokens is redeemed via an anchor bridge to receive a non-tokenized bank NGN value equivalent to the token NGN value, using for example the withdrawal process of FIG. 11. At step 4, as part of the automated and/or manual linked sequence, a trade is executed in the bank primary market trading the non-tokenized bank NGN via an institutional market to obtain non-tokenized bank USD. At step 5, the resulting non-tokenized bank USD is deposited via an anchor bridge, using for example the deposit process of FIG. 10, to produce USD tokens. The USD tokens are then transferred to the maker wallet, thereby restoring the liquidity of the secondary pool.

The present invention advantageously ensures the previous step is completed before initiating the subsequent step, thereby preventing the loss of value between sequential steps in the out-of-band replenish sequence. In one embodiment, the order of transaction steps 3 through steps 5 are varied to provide a responsive sequence. In one embodiment, the order of transaction steps 3 through steps 5 are varied based on the assurance of delivery. In one embodiment, the order of transaction steps 3 through steps 5 are varied or a tolerance of market slippage (i.e., changing of price between when an action is requested and completed). For example, in one embodiment, the minting and deposit step 4 is executed prior to trade execution if prices are locked in at the trading desk for the trade transaction. By removing the requirement for steps to execute in a sequential order, the delivery path is operable to be conducted asynchronously.

In one embodiment, if the proposed secondary market transaction exceeds the available liquidity of the bridge (i.e., the desired conversion of NGN to USD exceeds the available inventory of USD in the bridge pool in this example), the order is routed using the TSB module 2002 directly through the primary market path instead of traversing the secondary market bridge. In one embodiment, the order is only routed using the TSB module 2002 if a direct path through the primary market is identified via the route planning service module 2006.

Figure 17:
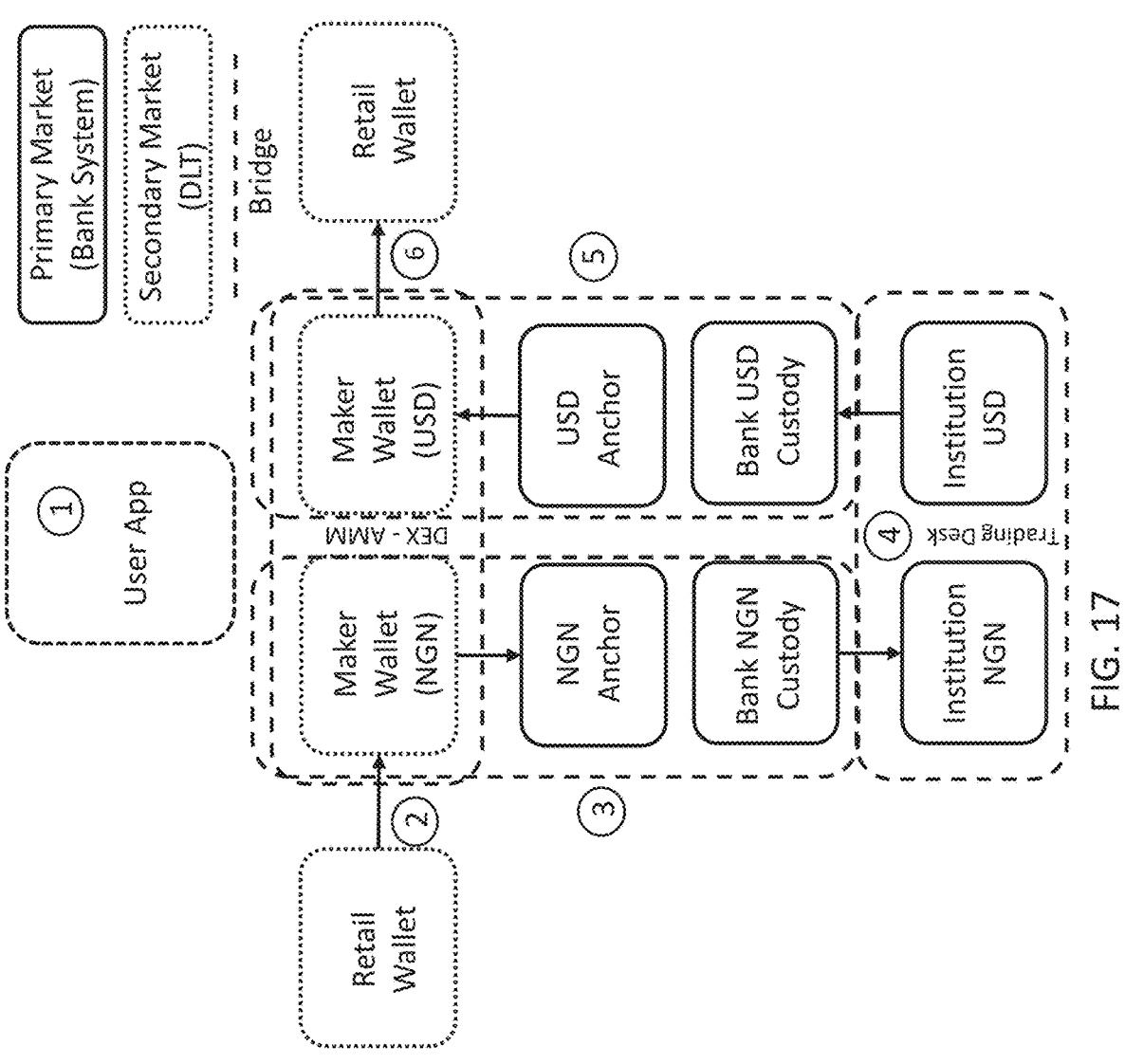
FIG. 17 illustrates a sequence to bypass secondary markets with insufficient liquidity by routing the conversion transaction directly to primary markets utilizing a chain of bridged transactions.

FIG. 17 illustrates a sequence to bypass secondary markets with insufficient liquidity by routing the conversion transaction directly to primary markets utilizing a chain of bridged transactions according to one embodiment of the present invention. At step 1, an institutional client (i.e., the client user application, client wallet, or client interface of a user device) with a retail wallet issues a large sell market order to convert value in Nigerian Naira (NGN) to value in USD via a secondary market. At step 2, the NGN tokens are transferred to the maker wallet of the exchange bridge. The NGN tokens are then processed for transaction. In one embodiment, the NGN tokens are processed for transaction simultaneously (i.e., in real-time or near real-time) upon receipt by the maker wallet of the exchange bridge. In one embodiment, the NGN tokens are received by the maker wallet of the exchange bridge and subsequently processed for transaction.

At step 3, the bridge operator initiates the replenish transaction is initiated and the value of the NGN tokens is redeemed via an anchor bridge to receive a non-tokenized bank NGN value equivalent to the token NGN value, using for example the withdrawal process of FIG. 11. In one embodiment, the replenishment transaction is initiated manually. In one embodiment, the replenishment transaction is initiated automatically. At step 4, as part of the linked replenish transaction sequence, a trade is executed in the bank primary market trading the non-tokenized bank NGN via an institutional market to obtain non-tokenized bank USD. At step 5, the resulting non-tokenized bank USD is deposited via an anchor bridge, using for example the deposit process of FIG. 10, to produce USD tokens. The USD tokens are then transferred to the maker wallet. At step 6, the USD tokens are then transferred to the destination (i.e., the retail wallet of the institutional client).

Transaction steps 3, 4, and 5 depict the process for fulfilling the primary market order. By executing the transactions of step 3, step 4, and step 5 simultaneously in real-time or near real-time, the process for fulfilling the primary market order is conducting simultaneously in real-time or near real-time to the secondary market bridge path. In one embodiment, the primary market order is initiated after the execution of the transaction at 6. In one embodiment, the primary market order is initiated after the execution of the transaction at 2.

Primary market path execution according to traditional mechanisms is expensive and often limited only to very large orders. Therefore, linking a secondary market with an asynchronous execution path for the primary market provides near real-time conversion of assets for both small and large scale transactions with the efficiency of the secondary market and the volume of the primary market. This link results in a convenient, scalable order execution model for all market participants.

To permit the convenient, fast, risk-free delivery of assets via a Liquidity Darkpool, the bridge operator must have an inventory of assets available to meet the liquidity demands of the secondary market. The requirement to maintain an inventory of assets exposes the operator to the volatility of the assets in the liquidity pair. For example, to support the liquidity needs of an NGN-ETH pair (i.e., a pair wherein NGN is traded in terms of Ethereum tokens (ETH) and vice versa) the bridge operator requires a large, readily available supply of NGN and ETH. If the price of either asset dips significantly, the value of the required inventory owned by the bridge is reduced. This leaves the bridge operator exposed to significant risk. Bridge operation losses due to asset volatility are known as divergence or impermanent losses.

The present invention advantageously includes a lending model to enable the bridge to be operated in a long or short position for either asset. The term "lending model" as used herein refers to a lending contract (i.e., a smart contract or set of smart contracts) configured to perform the lending functions as described herein. An asset in a long position is listed on a balance sheet as a balance sheet asset, whereas an asset in a short position is listed on a balance sheet as a balance sheet liability. To avoid exposure to impermanent losses, lending model permits the operator to operate in a risk neutral position.

Figure 18:
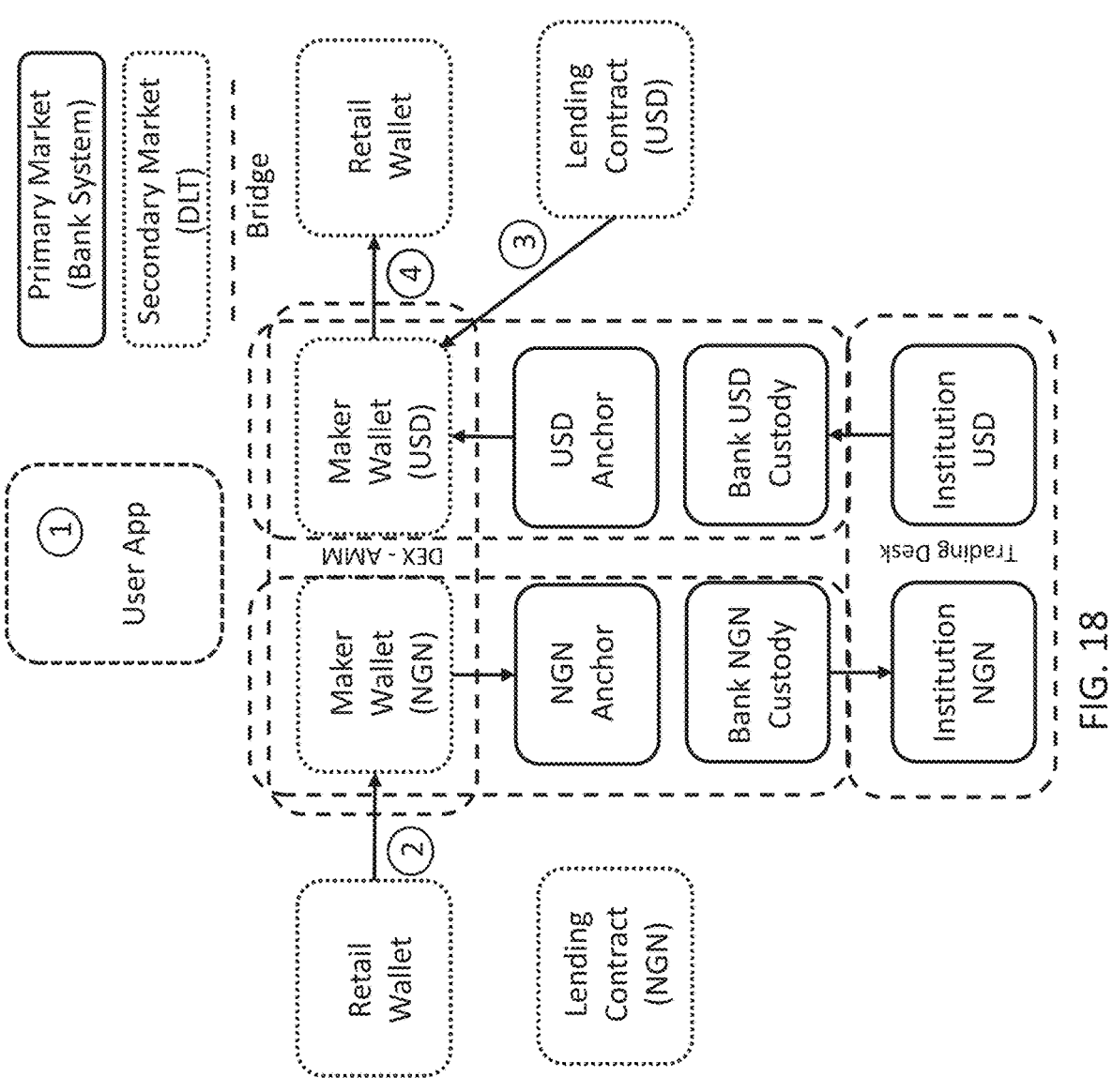
FIG. 18 illustrates a sequence for linked primary and secondary markets utilizing one or more lending pools according to one embodiment of the present invention.

FIG. 18 illustrates a sequence for linked primary and secondary markets utilizing one or more lending pools according to one embodiment of the present invention. At step 1, a retail client (i.e., the client user application, client wallet, or client interface of a user device) with a retail wallet issues a large sell market order to convert value in Nigerian Naira (NGN) to value in USD via a secondary market. At step 2, the NGN tokens are transferred to the maker wallet of the exchange bridge in the secondary market transaction. The NGN tokens are then processed for transaction. In one embodiment, the NGN tokens are processed for transaction simultaneously (i.e., in real-time or near real-time) upon receipt by the maker wallet of the exchange bridge. In one embodiment, the NGN tokens are received by the maker wallet of the exchange bridge and subsequently processed for transaction. The NGN transferred from the client wallet to the maker wallet results in an accumulation of NGN. In one embodiment, this accumulation is converted via an out-of-band replenishment transaction.

At step 3, assets required for the destination inventory are transferred from a lending pool to the maker wallet of the exchange bridge containing USD. At step 4, these transferred assets are delivered to the destination (i.e., the retail wallet of the client). In one embodiment, transactions of step 2, step 3, and step 4 occur simultaneously during a single block in an atomic transaction on a distributed ledger or distributed ledgers using flash lending protocols. In one embodiment, the sequence of step 3 and step 4 are varied. In one embodiment, the sequence of step 3 and step 4 occur in batch. In one embodiment, the sequence of step 3 and step 4 occur asynchronously.

In one embodiment, a fee and/or interest is charged for the loaned assets. Therefore, it is desirable to minimize the number of lending transactions and/or the length of time the total balance for an asset is negative. In one embodiment, to counteract, the bridge operator purchases put options for each asset in the pool to counteract impermanent loss. A put option ("put") is a contract that gives the owner the option, but not the requirement, to sell a specific underlying security at a predetermined price within a certain time period. The value of a put increases as the underlying asset price decreases, and conversely, the value of a put decreases when the underlying value of the asset increases. In one embodiment, the purchase of put options incurs a fee. In one embodiment, if used, put options counter impermanent loss but incur a fee that is recouped via bridge fee management.

In one embodiment, the bridge operator determines the bridge fee. In one embodiment, the bridge operator is an authorized administrator of the computer platform of the present invention. In one embodiment, the bridge operator is an authorized administrator of a distributed ledger implementing the computer platform of the present invention. In one embodiment, an authorized administrator of the computer platform of the present invention who is not the bridge operator determines the bridge fee. In one embodiment, one or more developers of the bridge of the present invention determine the bridge fee.

Convenient, real-time delivery of assets via a bridge depends on a ready supply of available assets in the bridge inventory. Thus, proper inventory management is a primary determining factor in successful bridge operations. The determination of using long or short inventory positions or put options for an asset is made based on optimizations described herein.

In one embodiment, consumers of bridge services pay a fee for the convenience, speed, and efficiency of asset delivery. In one embodiment, bridge management costs, the cost of operations, and the cost of inventory are counteracted through the application of a bridge traversal fee. This fee enables bridge operators to make a profit through bridge operation that, in principle, is proportional to the demand for bridge liquidity. As the demand for bridge operations increases, revenue provided by the bridge traversal fee provides a greater opportunity for revenue and an increased demand for access to available assets for delivery.

To maximize profit, the bridge operator will seek to minimize costs. The primary cost incurred in asset conversion via a bridge is the cost of inventory to operate a bridge. Maintaining the necessary inventory to operate the bridge requires the operator to purchase or borrow the required assets. The interest rate for borrowing the necessary inventory introduces an opportunity cost. Therefore, inventory optimization is an essential component to bridge management. In one embodiment, the optimization process for bridge inventory management borrows from supply chain management practices used in other disciplines (e.g., warehouse inventory management).

The present invention discloses methods for addressing structural liquidity issues with modern peer-to-peer (P2P) (AMM) conversions by optimistically seeking liquidity in capital efficient ways. Within the confines of this described structure is a modular computer model and framework that effectuates this system.

The proposed model is rationalized with established inventory systems management techniques adopted in both financial and non-financial industries. These include but are not limited to the various approaches in system dynamics of inventory management and financial engineering disciplines concerning interest rate, collateral needs, and allocation modelling. The models are stochastic in nature where discrete movement of value are made in a given time series. However, the rate of these movements has a heuristic element and must account for a variable of "noise" in the system. One of ordinary skill in the art will appreciate that the presence of noise (i.e., data that makes the programming language more difficult to read and understand).

The management of value inventory needed to enable efficient conversion of value from one form to another is described herein as financial logistics. While sufficient inventory must be maintained to ensure proper liquidity in the system, maintaining inventory has an opportunity cost During periods of high one-way demand for value conversion, a bridge node may run out of inventory preventing value conversion, and thus sufficient inventory of the asset must be maintained. However, bridge operations incur expenses (e.g., the cost of out-of-band replenishment transactions, gas fees on blockchain networks, hedging fees, and other operating costs must be accounted). To generate revenue, the bridge operator charges a fee for value conversions. In one embodiment, fees are charged as a flat fee. In one embodiment, fees are charged as a percentage of the transaction value. In one embodiment, fees are charged as a percentage of a spread (i.e., the difference between the price of conversion in one direction versus the opposite direction or the difference between the price of conversion via the bridge and the price of the conversion via an out-of-band replenishment channel).

The demand for liquidity is determined by the fee consumers are willing to pay for value conversion. Thus, the demand for liquidity is one factor in determining the potential return on investment in bridge inventory. Liquidity demand will depend on the efficiency and accessibility of other sources of liquidity to parties seeking to convert value. In one embodiment, if value conversion outside of bridge operations if difficult, expensive, and/or inaccessible to users, a higher bridge fee is implemented.

Liquidity supply is determined by the cost of operating the bridge and maintaining its inventory. Liquidity supply is another factor considered when determining the potential return on investment in bridge inventory. Bridge operating costs include but are not limited to the cost of maintaining inventory, the cost to borrow the assets (if lending is used to maintain inventory), the opportunity cost of the capital in the form of the expected ROI for deposits (if lending is used to maintain inventory for long positions), the extent of the mismatch in flows in either direction in the bridge, and the variability in the demand in either direction in the bridge, the cost and time to replenish inventory via the out-of-band path, the volatility of the price of the asset in inventory, the volatility of the price of conversion (i.e., impermanent loss), and the cost of hedging if used.

Figure 9B:
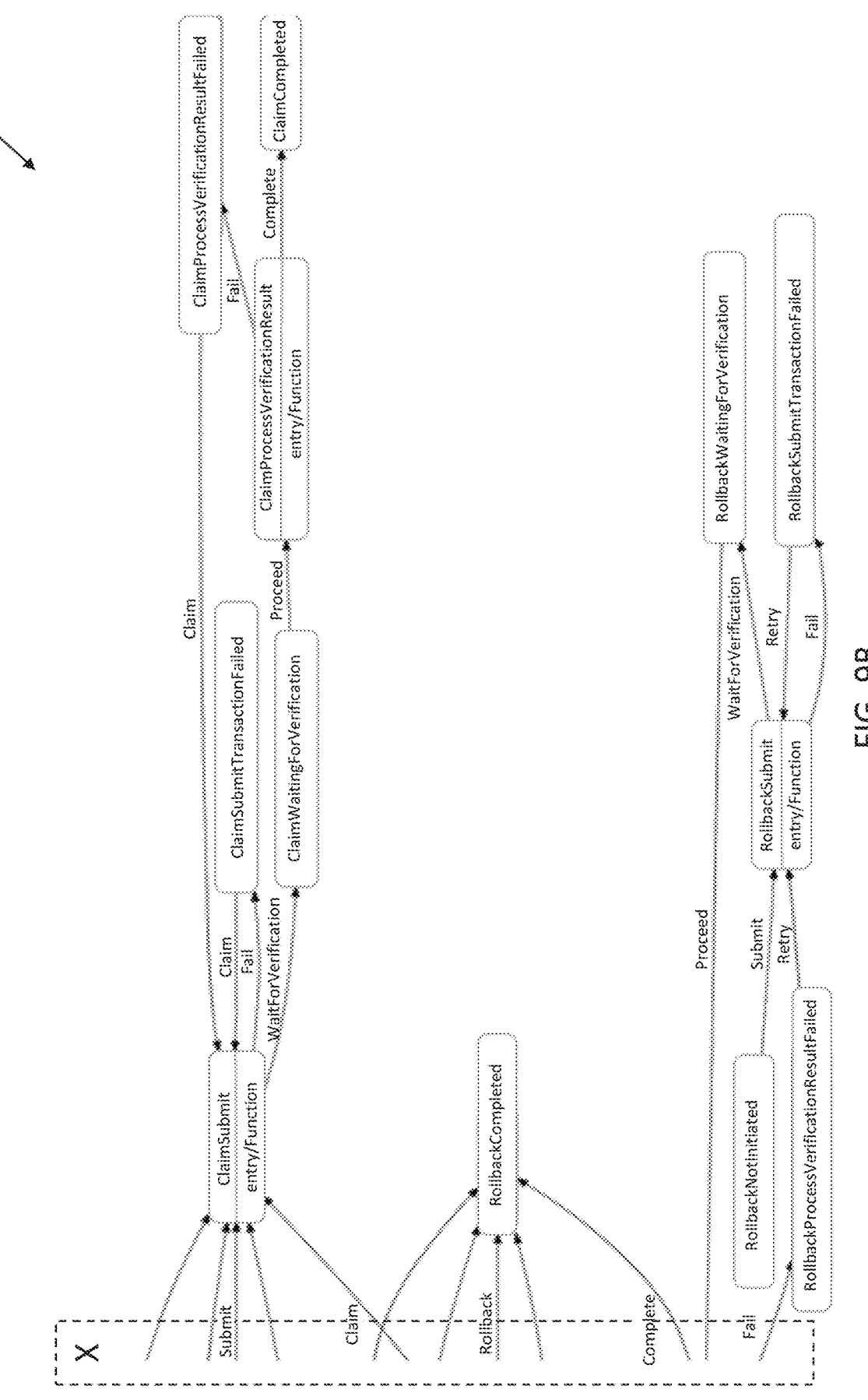
FIG. 9B illustrates an example of a state diagram for chained transfers according to one embodiment of the present invention.
Figure 19:
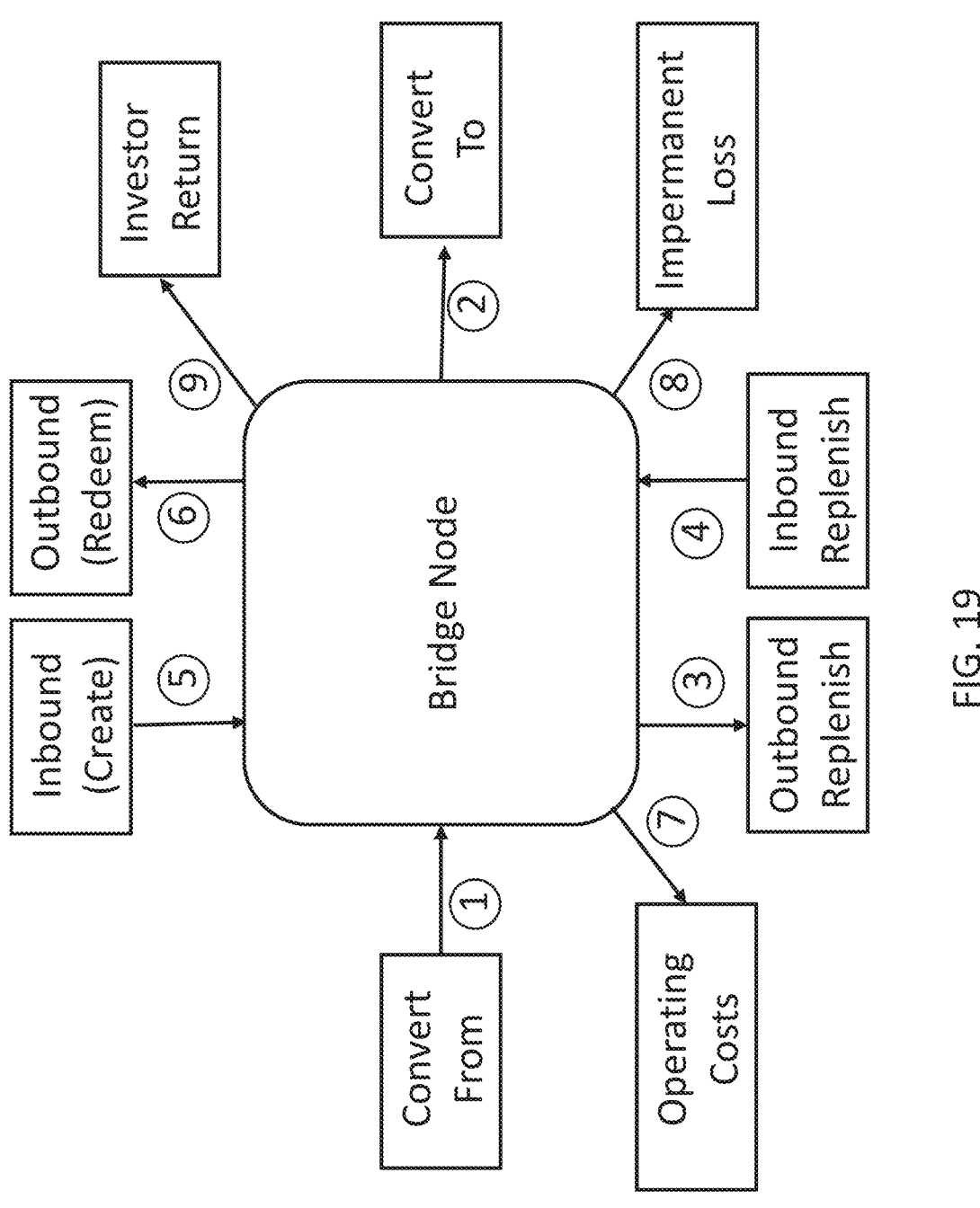
FIG. 19 illustrates the value flows associated with a single node in conversion bridge operations according to one embodiment of the present invention.

FIG. 19 presents a view of the value flows associated with a single node in conversion bridge operations according to one embodiment of the present invention. At flow 1, conversions from the source form of the asset result in an accumulation of value in the node. At flow 2, conversions to the destination form of the asset result in a reduction in the total value of the inventory. At flow 3, the outbound out-of-band replenish operations decrease inventory. At flow 4, inbound replenish operations increase inventory. At flow 5, investors seeking return invest in bridge operations resulting in an influx of value via a creation transaction. At flow 6, investors withdrawing assets from the bridge remove value from the bridge inventory via a redemption. At flow 7, bridge operations and management will incur fees which remove value from the ecosystem. Similarly, at flow 8, impermanent loss resulting from the volatility of the asset pair removes value from the system. At flow 9, investors expect a return on their investment in inventory resulting in an outflow of value from bridge node inventory. Each flow depicted herein is operable to be modeled to develop the required fees to sustain operations and maintain equilibrium in the system. In one embodiment, a bridge node includes less value flows than those depicted in FIG. 9. In one embodiment, one or more value flows are combined. In one embodiment, one or more value flows occur simultaneously in real-time or near-real time.

Inventory management models are centered around minimizing the required inventory and the applied dynamics costs to meet stochastic demand requirements while maximizing available fees to increase inventory return on investment, (e.g., to maximize the difference between the return on asset inventory and the cost to borrow the asset).

Each asset in the pool includes a defined, idealized, normalized ratio comparing the asset to the other assets in the pool. This ratio informs the ideal allocation of the assets within the pool based on a myriad of factors. In one embodiment, the inventory and fee framework works in tandem as a closed loop control system to anticipate movements of the assets in the pool, primarily through the rates of change in withdrawals and deposits, and the availability of counterparties in deep institutional networks or cross-computer networks. This allows the model to anticipate if the normalized quantity of an asset will deviate from its idealized normalized value quantifying both its rate of deviation, acceleration of deviation, and magnitude of deviation. In one embodiment, if the deviation results in excess of an asset, the model monetizes this excess by adjusting the fee structure or lending the asset to deeper counterparties. Similarly, in one embodiment, if the deviation results in a shortage of liquidity, the model anticipates this and requests ahead of time the appropriate amount of an asset necessary to rebalance the pool. The appropriate amount of the asset is the quickest available amount at the cheapest borrow rate from a variety of counterparties. In one embodiment, if an order exceeds the set normalized boundaries of liquidity, the model optimizes the fee structure to charge a higher premium and tranche the order (using bulk, iceberg, and other types of segregated large bulk order techniques) so as not to compromise its own liquidity levels outright. This ability to orchestrate transactions of significant liquidity size is advantageous in comparison to the prior art, which lacks the coordination of asset acquisition, conversion, and primary and secondary market replenishment.

Figure 20:
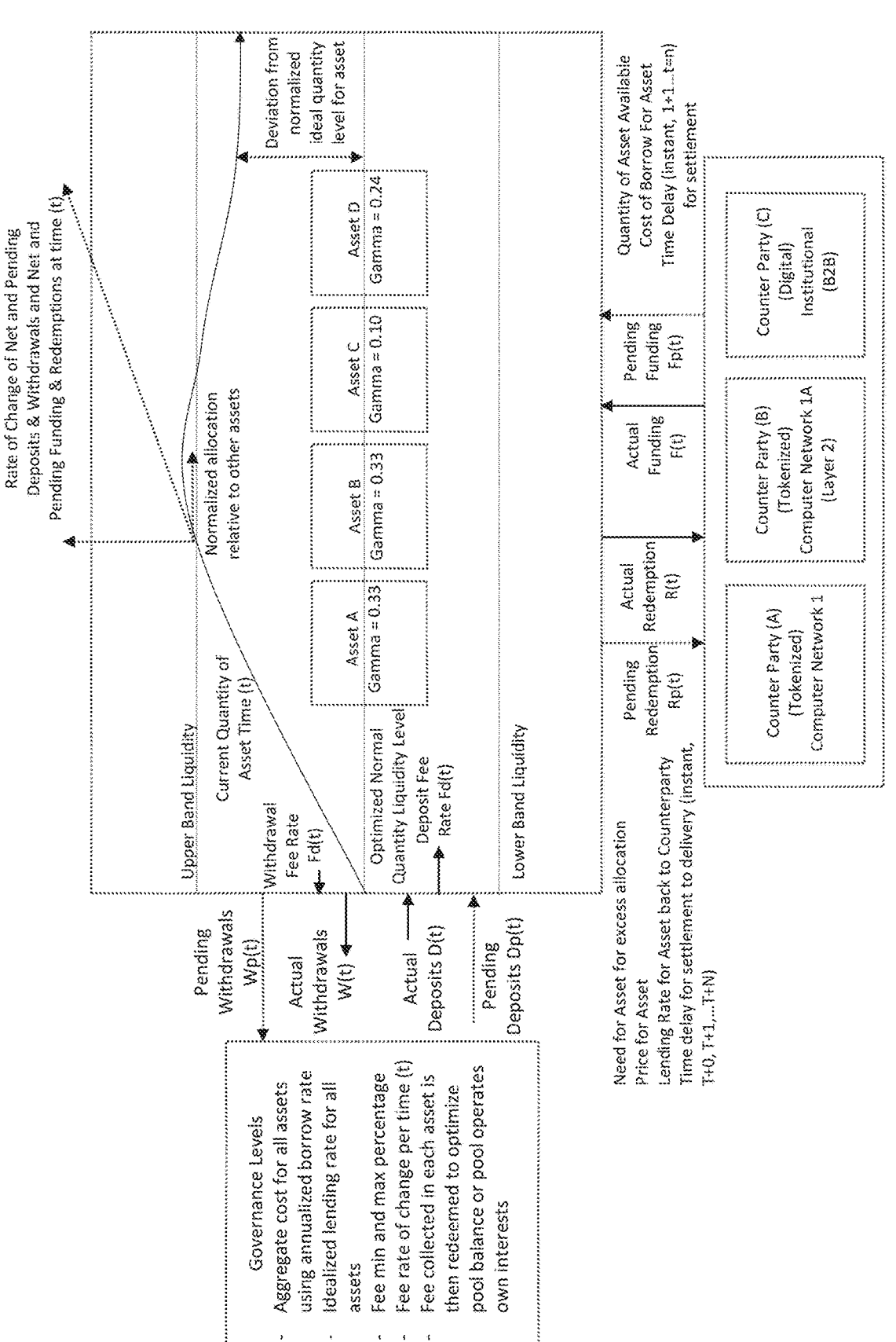
FIG. 20 illustrates a schematic diagram of the mechanism used to optimize economic incentive and manage inventory for asset pairing across a multitude of intermediaries according to one embodiment of the present invention.

FIG. 20 is a schematic diagram of the mechanism used to optimize economic incentive and manage inventory according to one embodiment of the present invention. In one embodiment, inventory of simplistic single asset pairing is managed across a multitude of intermediaries to an eventual anchor source. In one embodiment, inventory of multiple asset pairings or managed across a multitude of intermediaries to an eventual anchor source.

| Description | Symbol | Invariance |
|---|---|---|
| Quantity of Asset A | $Q_A$ | N |
| Quantity of Asset B | $Q_B$ | N |
| Min Quantity of Asset | $Q_{Amin}, Q_{Bmin}$ | Y |
| Max or Ideal Quantity of Asset | $Q_{Amax}, Q_{Bmax}$ | Y |
| Price of Asset A at a given time (t) in terms of Asset B | $P_{AB}(t)$ | N |
| Annualized Variable Borrow Rate at a given time (t) of an asset | $R_A(t), R_B(t)$ | N |
| Annualized Variable Lending Rate at a given time (t) of an asset | $L_A(t), L_B(t)$ | N |
| Annualized Cost of Carry for a given time (t) (does it cost more to lend or borrow at current rates) | $C_A(t) = (Q_A * P_A)[(1 + R_A(t))^t - (1 + R_A(t))^t]$ | N |
| Annualized Variable Inflation Rate of asset at a given time (t) | $Ir(t)_A, Ir(t)_B$ | N |
| Current Ratio or balance of assets in a pool at a given time (t) | $Cr_{AB}(t) = |Q_A/Q_B|$ | N |
| Rate of Withdrawal of a given asset in pool at a given time (t) (Demand Rate) | $\Delta W_A(t), \Delta W_B(t)$ | N |
| Pending Withdrawal of a given asset at a given time (t) | $W^P_A(t), W^P_B(t)$ | N |
| Rate of Deposit of a given asset in a pool at given time (t) (Supply Rate) | $\Delta D_A(t), \Delta D_B(t)$ | N |

-continued

| Description | Symbol | Invariance |
|---|---|---|
| Pending Deposits of a given asset at a given time (t) | $D^P_A(t)$, $D^P_B(t)$ | N |
| Net Rate Movement of a given asset in pool at a given time (t) | $\Delta M_A(t) = |\Delta W_A(t) - \Delta D_A(t)|$ | N |
| Normalized Quantity value tolerance at time (t) for a given asset | $\pm Y_A$, $\pm Y_B$ | Y |
| Target Quantity value for a given asset (normalized from 0 to 1) | $\lambda_A$, $\lambda_B$ | Y |
| Fee paid per transaction in given Asset currency or pricing terms | $|a|$ | N |
| Amortized Annualized Cost of Deployment and Operations of pool for given time (t) | $|\beta(t)|$ | N |

Fees are primarily a function of the demand rate, supply rate, amortized cost of operations, the combined borrow rate, inflation rate, and asset quantity of the transaction itself from the pool.

$$\theta^A{}_{Fee}(t) = (\Delta W_A(t) - \Delta D_A(t) + Ir(t)_A + |\beta(t)|)^* Q_A$$

Similarly, the inventory optimization is always $\pm\gamma$ the normalized target pool quantity $\lambda$, as the pool will determine if it has excess or deficit of a given asset considering the current quantity values, the rate of withdrawals, rate of deposits, the pending withdrawals, pending deposits and other factors.

Leveraging different inventory management methodologies will determine how the pool will engage the institutional liquidity providers in digitized form or how the pool will engage across heterogenous computer networks. This includes the determination of how much to request of a given pool asset, when to make the request in anticipation of tolerance violation, and if it the request is dynamically scalable based on the magnitude of the tolerance violation.

Further research is being done to model this phenomenon to ultimately reduce the amount requested at the latest possible point as to avoid overly greedy and ultimately costly refilling of pools. Other factors such as a waterfall method for requesting from multiple institutional providers, price volatility, demand volatility, and even catastrophic demand destruction will also be considered. One example of a waterfall and associated logic is disclosed U.S. patent application Ser. No. 16/861,769, incorporated herein by reference in its entirety. Waterfall methods will be considered as shown:

$$\lambda_A = 1/Q_A(t) \pm \gamma_A + \Delta M_A(t) + \Delta Vol(P_A)(t) + \{ \dots \}$$

Additional alternative structural and functional designs may be implemented for conducting cross ledger transfers, linking markets using bridges, and/or managing inventories and fees of the associated markets. Additional network implementations such as blockchain Layer Two Computer Network performance optimizations are also considered. These methodologies include side-chains, roll-ups and batching, channels, and zk-snark proof optimizations. Critically this expands the definition of Heterogenous Computing Network to include any interlinked optimization layer or Layer 2 technology that may be used to host a bridge node for Cross Network transactions. Thus, while implementations and examples have been illustrated and described, it is to be understood that the invention is not limited to the precise construction and components disclosed herein. Various modifications, changes and variations may be made in the arrangement, operation and details of the method and apparatus disclosed herein without departing from the spirit and scope of the invention defined in the appended claims.

Figure 21:
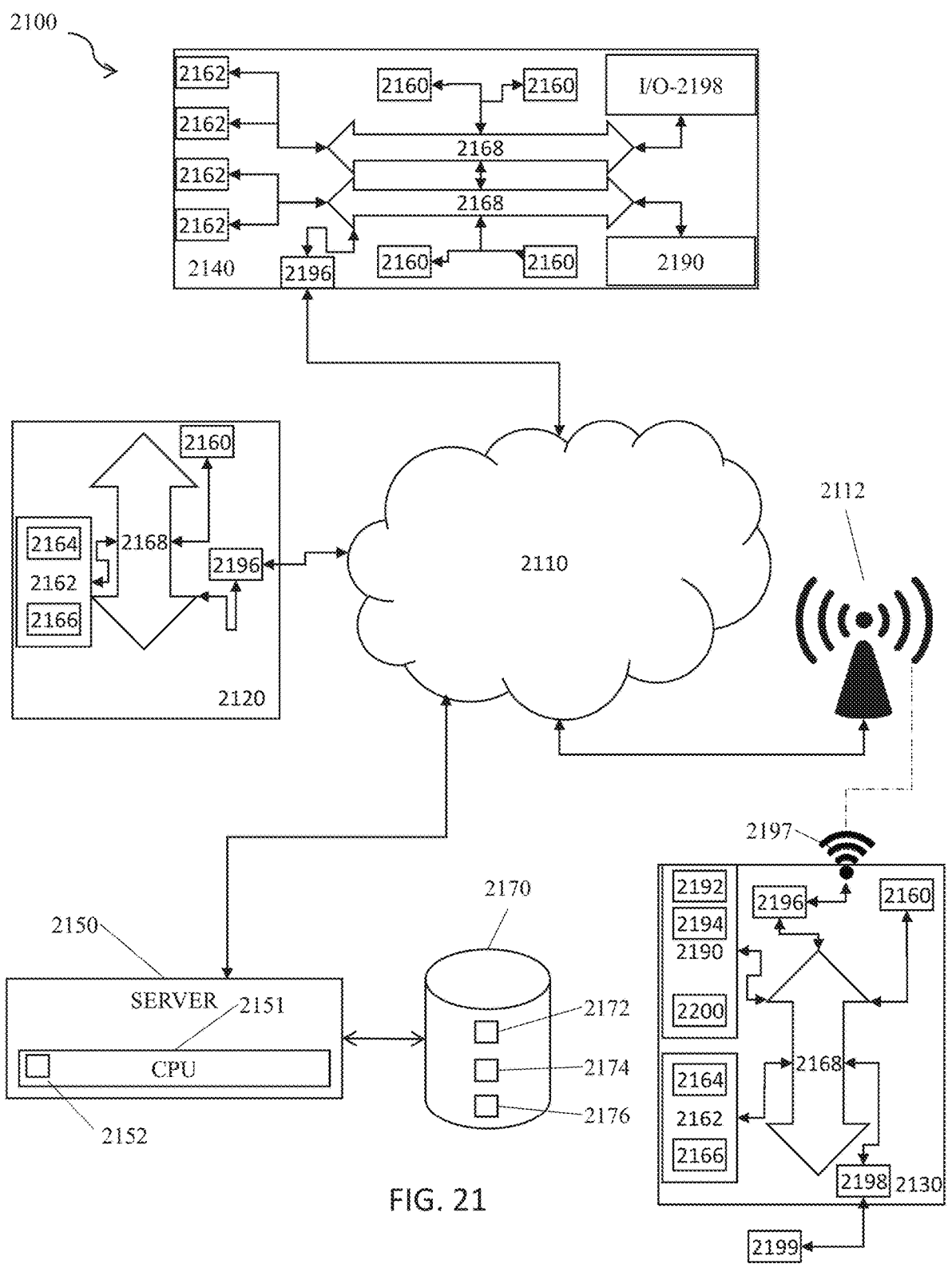
FIG. 21 is a schematic diagram of a system of the present invention.

FIG. 21 is a schematic diagram of an embodiment of the invention illustrating a computer system, generally described as 2100, having a network 2110, a plurality of computing devices 2120, 2130, 2140, a server 2150, and a database 2170.

The server 2150 is constructed, configured, and coupled to enable communication over a network 2110 with a plurality of computing devices 2120, 2130, 2140. The server 2150 includes a processing unit 2151 with an operating system 2152. The operating system 2152 enables the server 2150 to communicate through network 2110 with the remote, distributed user devices. Database 2170 is operable to house an operating system 2172, memory 2174, and programs 2176.

In one embodiment of the invention, the system 2100 includes a network 2110 for distributed communication via a wireless communication antenna 2112 and processing by at least one mobile communication computing device 2130. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 2100 is a virtualized computing system capable of executing any or all aspects of software and/or application components presented herein on the computing devices 2120, 2130, 2140. In certain aspects, the computer system 2100 is operable to be implemented using hardware or a combination of software and hardware, either in a dedicated computing device, or integrated into another entity, or distributed across multiple entities or computing devices.

By way of example, and not limitation, the computing devices 2120, 2130, 2140 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 2120 includes components such as a processor 2160, a system memory 2162 having a random access memory (RAM) 2164 and a read-only memory (ROM) 2166, and a system bus 2168 that couples the memory 2162 to the processor 2160. In another embodiment, the computing device 2130 is operable to additionally include components such as a storage device 2190 for storing the operating system 2192 and one or more application programs 2194, a network interface unit 2196, and/or an input/output controller 2198. Each of the components is operable to be coupled to each other through at least one bus 2168. The input/output controller 2198 is operable to receive and process input from, or provide output to, a number of other devices 2199, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 2160 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 2140 in FIG. 21, multiple processors 2160 and/or multiple buses 2168 are operable to be used, as appropriate, along with multiple memories 2162 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 2100 is operable to operate in a networked environment using logical connections to local and/or remote computing devices 2120, 2130, 2140 through a network 2110. A computing device 2130 is operable to connect to a network 2110 through a network interface unit 2196 connected to a bus 2168. Computing devices are operable to communicate communication media through wired networks, direct-wired connections or wirelessly, such as acoustic, RF, or infrared, through an antenna 2197 in communication with the network antenna 2112 and the network interface unit 2196, which are operable to include digital signal processing circuitry when necessary. The network interface unit 2196 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 2162, the processor 2160, and/or the storage media 2190 and is operable be a single medium or multiple media (e.g., a centralized or distributed computer system) that store the one or more sets of instructions 2200. Non-transitory computer readable media includes all computer readable media, with the sole exception being a transitory, propagating signal per se. The instructions 2200 are further operable to be transmitted or received over the network 2110 via the network interface unit 2196 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 2190 and memory 2162 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 2100.

In one embodiment, the computer system 2100 is within a cloud-based network. In one embodiment, the server 2150 is a designated physical server for distributed computing devices 2120, 2130, and 2140. In one embodiment, the server 2150 is a cloud-based server platform. In one embodiment, the cloud-based server platform hosts serverless functions for distributed computing devices 2120, 2130, and 2140.

In another embodiment, the computer system 2100 is within an edge computing network. The server 2150 is an edge server, and the database 2170 is an edge database. The edge server 2150 and the edge database 2170 are part of an edge computing platform. In one embodiment, the edge server 2150 and the edge database 2170 are designated to distributed computing devices 2120, 2130, and 2140. In one embodiment, the edge server 2150 and the edge database 2170 are not designated for distributed computing devices 2120, 2130, and 2140. The distributed computing devices 2120, 2130, and 2140 connect to an edge server in the edge computing network based on proximity, availability, latency, bandwidth, and/or other factors.

It is also contemplated that the computer system 2100 is operable to not include all of the components shown in FIG. 21, is operable to include other components that are not explicitly shown in FIG. 21, or is operable to utilize an architecture completely different than that shown in FIG. 21. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Data Stored on a Distributed Ledger

In a preferred embodiment, the platform is operable to store data on a distributed ledger, e.g., a blockchain. Distributed ledger technology refers to an infrastructure of replicated, shared, and synchronized digital data that is decentralized and distributed across a plurality of machines, or nodes. The nodes include but are not limited to a mobile device, a computer, a server, and/or any combination thereof. Data is replicated and synchronized across a network of nodes such that each node has a complete copy of the distributed ledger. The replication and synchronization of data across a distributed set of devices provides increased transparency over traditional data storage systems, as multiple devices have access to the same set of records and/or database. Additionally, the use of distributed ledgers eliminates the need for third party and/or administrative authorities because each of the nodes in the network is operable to receive, validate, and store additional data, thus creating a truly decentralized system. Eliminating the third party and/or administrative authorities saves time and cost. A decentralized database is also more secure than traditional databases, which are stored on a single device and/or server because the decentralized data is replicated and spread out over both physical and digital space to segregated and independent nodes, making it more difficult to attack and/or irreparably tamper with the data. Tampering with the data at one location does not automatically affect the identical data stored at other nodes, thus providing greater data security.

In addition to the decentralized storage of the distributed ledger, which requires a plurality of nodes, the distributed ledger has further advantages in the way that data is received, validated, communicated, and added to the ledger. When new data is added to the distributed ledger, it must be validated by a portion of the nodes (e.g., 51%) involved in maintaining the ledger in a process called consensus. Proof of work, proof of stake, delegated proof of stake, proof of space, proof of capacity, proof of activity, proof of elapsed time, and/or proof of authority consensus are all compatible with the present invention, as are other forms of consensus known in the art. In one embodiment, the present invention uses fault-tolerant consensus systems. Each node in the system is operable to participate in consensus, e.g., by performing at least one calculation, performing at least one function, allocating compute resources, allocating at least one token, and/or storing data. It is necessary for a portion of the nodes in the system (e.g., 51% of the nodes) to participate in consensus in order for new data to be added to the distributed ledger. Advantageously, requiring that the portion of the nodes participate in consensus while all nodes are operable to participate in consensus means that authority to modify the ledger is not allocated to one node or even a group of nodes but rather is equally distributed across all of the nodes in the system. In one embodiment, a node that participates in consensus is rewarded, e.g., with a digital token, in a process called mining.

The blockchain is a commonly used implementation of a distributed ledger and was described in Satoshi Nakamoto's whitepaper Bitcoin: A Peer-to-Peer Electronic Cash System, which was published in October 2008 and which is incorporated herein by reference in its entirety. In the blockchain, additional data is added to the ledger in the form of a block. Each block is linked to its preceding block with a cryptographic hash, which is a one-way mapping function of the data in the preceding block that cannot practically be computed in reverse. In one embodiment, a timestamp is also included in the hash. The computation of the cryptographic hash based on data in a preceding block is a computationally intensive task that could not practically be conducted as a mental process. The use of cryptographic hashes means that each block is sequentially related to the block before it and the block after it, making the chain as a whole immutable. Data in a block in a preferred embodiment cannot be retroactively altered after it is added to the chain because doing so changes the associated hash, which affects all subsequent blocks in the chain and which breaks the mapping of the preceding block. The blockchain is an improvement on existing methods of data storage because it connects blocks of data in an immutable fashion. Additionally, the blockchain is then replicated and synchronized across all nodes in the system, ensuring a distributed ledger. Any attempted changes to the blockchain are propagated across a decentralized network, which increases the responsiveness of the system to detect and eliminate fraudulent behavior compared to non-distributed data storage systems. The blockchain and the distributed ledger solve problems inherent to computer networking technology by providing a secure and decentralized way of storing data that is immutable and has high fault tolerance. The distributed ledger stores digital data and is thus inextricably tied to computer technology. Additional information about the blockchain is included in The Business of Blockchain by William Mougavar published in April 2016, which is incorporated herein by reference in its entirety.

In one embodiment, the data added to the distributed ledger of the present invention include digital signatures. A digital signature links a piece of data (e.g., a block) to a digital identity (e.g., a user account). In one embodiment, the digital signature is created using a cryptographic hash and at least one private key for a user. The content of the piece of data is used to produce a cryptographic hash. The cryptographic hash and the at least one private key are used to create the digital signature using a signature algorithm. The digital signature is only operable to be created using a private key. However, the digital signature is operable to be decoded and/or verified using a public key also corresponding to the user. The separation of public keys and private keys means that external parties can verify a digital signature of a user using a public key but cannot replicate the digital signature since they do not have a private key. Digital signatures are not merely electronic analogs of traditional physical signatures. Physical signatures are easily accessible and easily replicable by hand. In addition, there is no standard algorithm to verify a physical signature except comparing a first signature with a second signature from the same person via visual inspection, which is not always possible. In one embodiment, the digital signatures are created using the data that is being linked to the digital identity whereas physical signatures are only related to the identity of the signer and are agnostic of what is being signed. Furthermore, digital signatures are transformed into a cryptographic hash using a private key, which is a proof of identity of which there is no physical or pre-electronic analog. Digital signatures, and cryptographic hashes in general, are of sufficient data size and complexity to not be understood by human mental work, let alone verified through the use of keys and corresponding algorithms by human mental work. Therefore, creating, decoding, and/or verifying digital signatures with the human mind is highly impractical.

Public, private, consortium, and hybrid blockchains are compatible with the present invention. In one embodiment, the blockchain system used by the present invention includes sidechains wherein the sidechains run parallel to a primary chain. Implementations of distributed ledger and/or blockchain technology including, but not limited to, BIT-COIN, ETHEREUM, HASHGRAPH, BINANCE, FLOW, TRON, TEZOS, COSMOS, and/or RIPPLE are compatible with the present invention. In one embodiment, the platform includes at least one acyclic graph ledger (e.g., at least one tangle and/or at least one hashgraph). In one embodiment, the platform includes at least one quantum computing ledger.

In one embodiment, the present invention further includes the use of at least one smart contract, wherein a smart contract includes a set of automatically executable steps and/or instructions that are dependent on agreed-upon terms. The smart contract includes information including, but not limited to, at least one contracting party, at least one contract address, contract data, and/or at least one contract term. In one embodiment, the at least one smart contract is deployed on a blockchain such that the at least one smart contract is also stored on a distributed node infrastructure. In one embodiment, the terms of the at least one smart contract are dependent on changes to the blockchain. For example, a provision of the at least one smart contract executes when a new block is added to the blockchain that meets the terms of the at least one smart contract. The smart contract is preferably executed automatically when the new block is added to the blockchain. In one embodiment, a first smart contract is operable to invoke a second smart contract when executed. A smart contract is operable to capture and store state information about the current state of the blockchain and/or the distributed ledger at any point in time. Advantageously, a smart contract is more transparent than traditional coded contracts because it is stored on a distributed ledger. Additionally, all executions of the smart contract are immutably stored and accessible on the distributed ledger, which is an improvement over non-distributed, stateless coded contracts. In one embodiment, the state information is also stored on a distributed ledger.

Cryptocurrency Transactions

Distributed ledger technology further enables the use of cryptocurrencies. A cryptocurrency is a digital asset wherein ownership records and transaction records of a unit of cryptocurrency (typically a token) are stored in a digital ledger using cryptography. Use of centralized cryptocurrencies and decentralized cryptocurrencies are both compatible with the present invention. Centralized cryptocurrencies are minted prior to issuance and/or are issued by a single body. Records of a decentralized cryptocurrency are stored on a distributed ledger (e.g., a blockchain), and any node participating in the distributed ledger is operable to mint the decentralized cryptocurrency. The distributed ledger thus serves as a public record of financial transactions. Cryptocurrencies are typically fungible in that each token of a given cryptocurrency is interchangeable. The present invention is operable to facilitate transactions of at least one cryptocurrency, including, but not limited to, BITCOIN, LITECOIN, RIPPLE, NXT, DASH, STELLAR, BINANCE COIN, and/or ETHEREUM. In one embodiment, the present invention is operable to facilitate transactions of stablecoins, NEO Enhancement Protocol (NEP) tokens, and/or BINANCE Chain Evolution Proposal (BEP) tokens. In one embodiment, the present invention is operable to support tokens created using the ETHEREUM Request for Comment (ERC) standards as described by the Ethereum Improvement Proposals (EIP). For example, the present invention is operable to support ERC-20-compatible tokens, which are created using the EIP-20: ERC-20 Token Standard, published by Vogelsteller, et al., on Nov. 19, 2015, which is incorporated herein by reference in its entirety.

A cryptocurrency wallet stores keys for cryptocurrency transactions. As cryptocurrency is a virtual currency, the ability to access and transfer cryptocurrency must be protected through physical and/or virtual means such that such actions are only operable to be performed by the rightful owner and/or parties with permission. In one embodiment, a cryptocurrency wallet stores a private key and a public key. In another embodiment, the cryptocurrency wallet is operable to create the private key and/or the public key, encrypt data, and/or sign data (e.g., with a digital signature). In one embodiment, the private key is generated via a first cryptographic algorithm wherein the input to the first cryptographic algorithm is random. Alternatively, the input to the first cryptographic algorithm is non-random. In one embodiment, the public key is generated from the private key using a second cryptographic algorithm. In one embodiment, the first cryptographic algorithm and the second cryptographic algorithm are the same. The private key is only accessible to the owner of the cryptocurrency wallet, while the public key is accessible to the owner of the cryptocurrency wallet as well as a receiving party receiving cryptocurrency from the owner of the cryptocurrency wallet. Deterministic and non-deterministic cryptocurrency wallets are compatible with the present invention.

As a non-limiting example, a cryptocurrency transaction between a first party and a second party involves the first party using a private key to sign a transaction wherein the transaction includes data on a first cryptocurrency wallet belonging to the first party, the amount of the transaction, and a second cryptocurrency wallet belonging to the second party. In one embodiment, the second cryptocurrency wallet is identified by a public key. The transaction is then populated to a distributed network wherein a proportion (e.g., 51%) of the nodes of the distributed network verify the transaction. Verifying the transaction includes verifying that the private key corresponds to the first cryptocurrency wallet and that the amount of the transaction is available in the first cryptocurrency wallet. The nodes then record the transaction on the distributed ledger, e.g., by adding a block to a blockchain. Fulfilling the cryptocurrency transaction is a computationally intensive process due to key cryptography and the consensus necessary for adding data to the distributed ledger that could not practically be performed in the human mind. In one embodiment, a node is operable to verify a block of transactions rather than a single transaction.

Desktop wallets, mobile wallets, hardware wallets, and web wallets are compatible with the present invention. A software wallet (e.g., a desktop wallet, a mobile wallet, a web wallet) stores private and/or public keys in software. A hardware wallet stores and isolates private and/or public keys in a physical unit, e.g., a universal serial bus (USB) flash drive. The hardware wallet is not connected to the internet or any form of wireless communication, thus the data stored on the hardware wallet is not accessible unless the hardware wallet is connected to an external device with network connection, e.g., a computer. In one embodiment, the data on the hardware wallet is not operable to be transferred out of the hardware wallet. In one embodiment, the hardware wallet includes further data security measures, e.g., a password requirement and/or a biometric identifier requirement. In one embodiment, the present invention is operable to integrate a third-party cryptocurrency wallet. Alternatively, the present invention is operable to integrate a payments platform that is compatible with cryptocurrency, including, but not limited to, VENMO, PAYPAL, COIN-BASE, and/or payments platforms associated with financial institutions.

Tokenization

In one embodiment, the platform is operable to tokenize assets. A token is a piece of data that is stored on the distributed digital ledger and that can be used to represent a physical and/or a digital asset, e.g., in a transaction, in an inventory. The token is not the asset itself; however, possession and transfer of the token are stored on the distributed digital ledger, thus creating an immutable record of ownership. In one embodiment, the token includes cryptographic hashes of asset data, wherein the asset data is related to the asset. In one embodiment, the asset data is a chain of data blocks. For example, the asset is a work of digital art, and the asset data includes data about the work such as information about an artist, a subject matter, a file type, color data, etc. The corresponding token includes a cryptographic hash of the asset data, which describes the work. Alternative mappings of the asset data to the token are also compatible with the present invention. In one embodiment, the token is a non-fungible token (NFT). A first non-fungible token is not directly interchangeable with a second non-fungible token; rather, the value of the first token and the second token are determined in terms of a fungible unit (e.g., a currency). In one embodiment, the platform is operable to support ETHEREUM standards for tokenization, including, but not limited to, HP-721: ERC-721 Non-Fungible Token Standard by Entriken, et al., which was published Jan. 24, 2018 and which is incorporated herein by reference in its entirety. In one embodiment, the platform is operable to create fractional NFTs (f-NFTs), wherein each f-NFT represents a portion of the asset. Ownership of an f-NFT corresponds to partial ownership of the asset.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A method of transferring tokenized assets over heterogenous computer networks, the method comprising:

a user device implementing a computer platform, the user device including a processor and a memory with a database;

the computer platform executing an in-band transfer process, the method comprising:

routing, by the computer platform, a path between a first bridge node of a first distributed ledger and a second bridge node of a second distributed ledger;

creating, by the computer platform, an exchange bridge between the first bridge node and the second bridge node along the routed path, wherein the exchange bridge includes an inbound bridge wallet and outbound bridge wallet;

executing, by the computer platform, a command to transfer at least one asset token of a first asset type from a client wallet on the first distributed ledger to the inbound bridge wallet;

transferring, by the exchange bridge, the at least one asset token of a first asset type from the inbound bridge wallet to the outbound bridge wallet;

equating, by a decentralized exchange conversion algorithm (DEX-AMM), the at least one asset token of the first asset type to at least one asset token of a second asset type;

converting, by the exchange bridge, the at least one asset token of the first asset type to the at least one asset token of the second asset type and simultaneously transferring the at least one asset token of the second asset type to the outbound bridge wallet of the exchange bridge;

executing, by the exchange bridge, a command to transfer at least one asset token of the second asset type from an outbound bridge wallet to a client wallet on the second distributed ledger;

the computer platform executing an out-of-band replenish process, the method comprising:

transferring the at least one asset token of the first asset type from the inbound bridge wallet of the exchange bridge to a first custody wallet;

redeeming a value of the at least one asset token of the first asset type, wherein the value is converted into at least one additional asset token of the second asset type, wherein the at least one additional asset token of the second asset type is assigned to a second custody wallet; and transferring the at least one additional asset token of the second asset type from a second custody wallet to the outbound bridge wallet.

2. The method of claim 1, further comprising executing, by the computer platform, the method of the in-band transfer process simultaneously in real time or near real time.

3. The method of claim 1, further comprising executing, by the computer platform, the out-of-band replenish process in real time or near real time.

4. The method of claim 1, further comprising initiating, by the computer platform, the out-of-band replenish process automatically based on a predetermined threshold of accumulation of asset tokens of the first asset type and/or a predetermined threshold of deficit of the second asset type.

5. The method of claim 1, further comprising rolling back one or more steps of the method of the in-band transfer process and/or the out-of-band replenish process to a save point in the event of a network failure or cancellation.

6. The method of claim 1, further comprising publishing a record of at least one transfer to a third distributed ledger.

7. The method of claim 6, further comprising implementing a zero knowledge proof on the third distributed ledger, the zero knowledge proof attesting to accuracy of the record disclosed on the third distributed ledger while preventing the record from being physically viewable.

8. A system for transmutation of tokenized assets using peer-to-peer secondary transactions and business-to-business primary transactions comprising:

a computer platform and a remote server including a remote memory with a remote database;

wherein the computer platform is stored on the remote database;

wherein the server is in network communication with at least one user device including a processor and a memory with a database, wherein the computer platform is implemented by the at least one user device;

wherein the client account of the computer platform initiates a transfer of a first asset token from a client wallet on a first distributed ledger to a client wallet on a second distributed ledger;

wherein a route planning service of the computer platform graphs at least one route between a bridge node of the first distributed ledger and a bridge node of the second distributed ledger, wherein the route planning service builds an exchange bridge along the at least one route;

wherein the computer platform transfers the first asset token from the client wallet on the first distributed ledger to an inbound wallet on the exchange bridge;

wherein a decentralized exchange conversion algorithm (DEX-AMM) of the exchange bridge equates a value of the first asset token from a value in terms of a first asset type to a value in terms of a second asset type;

wherein the exchange bridge accesses at least one lending pool containing an accumulation of assets of the second asset type;

wherein the exchange bridge withdraws a second asset of the second asset type from the accumulation of assets of the second asset type, wherein the value of the second asset is equivalent to the value of the first asset;

wherein the second asset is transferred from the at least one lending pool to an outbound wallet on the exchange bridge; and wherein the exchange bridge transfers the second asset to the client wallet on the second distributed ledger.

9. The system of claim 8, further comprising:

a first anchor bridge, an institutional bridge, and a second anchor bridge;

wherein the exchange bridge transfers the first asset token to an anchor wallet of the first anchor bridge;

wherein the anchor wallet of the first anchor bridge deposits the first asset token into an inbound custody wallet of the institutional bridge;

wherein the institutional bridge converts a non-tokenized value of the first asset token in terms of the first asset type to a non-tokenized value of the first asset token in terms of the second asset type;

wherein the institutional bridge issues a third asset token, wherein the third asset token is a tokenized value of the first asset token in terms of the second asset type; wherein the institutional bridge transfers the third asset token to an outbound custody wallet of the institutional bridge;

wherein the second anchor bridge withdraws the third asset token from the outbound custody wallet of the institutional bridge, wherein the second anchor bridge transfers the third asset token to an anchor wallet of the second anchor bridge;

wherein the second anchor bridge transfers the third asset token from the anchor wallet of the second anchor bridge to the outbound wallet of the exchange bridge.

10. The system of claim 9, wherein the transfer of the first asset token to the anchor wallet of the first anchor bridge, the deposit of the first asset token to the inbound custody wallet of the institutional bridge, the transfer of the third asset to the outbound custody wallet of the institutional bridge, the withdrawal of the third asset token from the outbound custody wallet of the institutional bridge, and/or the transfer of the third asset token to the outbound wallet of the exchange bridge occurs simultaneously in real-time or near real-time.

11. The system of claim 8, wherein the transfer of the first asset token to the inbound wallet, the withdrawal of the second asset from the lending pool, and/or the transfer of the second asset token to the client wallet occurs simultaneously in real-time or near real-time.

12. The system of claim 8, wherein the transfer of the first asset token to the inbound wallet, the withdrawal of the second asset token from the lending pool, and/or the transfer of the second asset token to the client wallet is rolled back to a save point in the event of a network failure or cancellation.

13. The system of claim 8, wherein the computer platform publishes a record of at least one transfer, wherein the record is published on a third distributed ledger.

14. The system of claim 13, wherein a zero knowledge proof is implemented with the record on the third distributed ledger, wherein the zero knowledge proof attests to the record disclosed on the ledger, wherein the zero knowledge proof prevents the record from being physically viewable.

15. A method of transmutation of tokenized assets using peer-to-peer secondary transactions and business-to-business primary transactions, the method comprising:

a user device implementing a computer platform, the user device including a processor and a memory with a database;

the computer platform executing an in-band transfer process, the method comprising:

routing, by the computer platform, at least one potential path between a first bridge node of a first distributed ledger and a second bridge node of a second distributed ledger;

displaying, by the computer platform, the at least one potential path to a graphic user interface of the device (GUI), the GUI receiving a selection of a path;

creating, by the computer platform, an exchange bridge between the first bridge node and the second bridge node along the path, wherein the exchange bridge includes an inbound bridge wallet and outbound bridge wallet;

executing, by the computer platform, a command to transfer a first asset token from a client wallet on the first distributed ledger to the inbound bridge wallet, wherein the first asset token is a first asset type;

equating, by a decentralized exchange conversion algorithm (DEX-AMM), a value of the first asset token from a value in terms of a first asset type to a value in terms of a second asset type;

accessing, by the exchange bridge, an asset pool, the exchange bridge withdrawing a second asset token from the asset pool, wherein the second asset token is a second asset type, wherein the value of the second token is equivalent to the value of the first asset token;

transferring, by the exchange bridge, the second asset token from the asset pool to the outbound bridge wallet of the exchange bridge;

executing, by the computer platform, an out-of-band replenish process, the method comprising:

transferring, by the computer platform, the second asset token from the outbound bridge wallet of the exchange bridge to the client wallet on the distributed ledger;

depositing the first token to an inbound custody wallet of an institutional bridge, the institutional bridge converting the value of the first asset token into a value in terms of the second asset type;

issuing, by the institutional bridge, a third token, wherein the third asset token is a second asset type, wherein the third asset token is assigned to an outbound custody wallet; and withdrawing, by the exchange bridge, the third asset token from the outbound custody wallet, wherein the third asset token is transferred to the outbound bridge wallet of the exchange bridge.

16. The method of claim 15, further comprising executing, by the computer platform, the method of the in-band transfer process and/or the out-of-band replenish process simultaneously in real time or near real time.

17. The method of claim 15, the asset pool comprising at least one asset of the first asset type and at least one asset of the second asset type.

18. The method of claim 15, further comprising implementing, by the exchange bridge a fee on the client wallet on the first distributed ledger and/or the client wallet on the second distributed ledger.

19. The method of claim 15, further comprising initiating, by the computer platform, the out-of-band replenish process automatically based on a predetermined threshold of accumulation of asset tokens of the first asset type and/or a predetermined threshold of deficit of the second asset type.

20. The method of claim 15, further comprising rolling back one or more steps of the method of the in-band transfer process and/or the out-of-band replenish process to a save point in the event of a network failure or cancellation.

* * * * *